United States Patent
Hawkins

(12) 
(10) Patent No.: US 7,822,592 B2
(45) Date of Patent: Oct. 26, 2010

(54) ACTING ON A SUBJECT SYSTEM

(75) Inventor: Peter Hawkins, Milton Keynes (GB)

(73) Assignee: Manthatron-IP Limited, Central Milton Keynes (GB)

( * ) Notice: Subject to any disclaimer, the term of this patent is extended or adjusted under 35 U.S.C. 154(b) by 1318 days.

(21) Appl. No.: 11/252,432

(22) Filed: Oct. 17, 2005

(65) Prior Publication Data

US 2006/0149582 A1 Jul. 6, 2006

Related U.S. Application Data

(60) Provisional application No. 60/622,229, filed on Oct. 26, 2004.

(30) Foreign Application Priority Data

Oct. 18, 2004 (GB) ................................. 0423110.6

(51) Int. Cl.
*G06G 7/62* (2006.01)
*G06F 9/40* (2006.01)
*G06F 15/18* (2006.01)
*G06F 9/44* (2006.01)

(52) U.S. Cl. ............................. 703/17; 712/215; 706/6; 717/104

(58) Field of Classification Search ......... 717/140–167; 704/14, 45–61; 703/2, 17, 21, 22
See application file for complete search history.

(56) References Cited

U.S. PATENT DOCUMENTS 5,021,947 A * 6/1991 Campbell et al. ............. 712/25

(Continued)

FOREIGN PATENT DOCUMENTS

GB 2212949 A * 11/1988

(Continued)

OTHER PUBLICATIONS

Agha, "Actors: A Model of Concurrent Computation in Distributed Systems", Jun. 1985, MIT Artificial Intelligence Laboratory, Technical report 844, Chapter 1-4, and 7.*

(Continued)

*Primary Examiner*—Wei Y Zhen
*Assistant Examiner*—Chung Cheng
(74) *Attorney, Agent, or Firm*—Stroock & Stroock & Lavan LLP

(57) ABSTRACT

In an active system, an actor is able to effect action in a subject system. The actor and the subject system exist in an environment which can impact the subject system. Neither the actor nor the subject system has any control over the environment. The actor includes a model and a processor. The processor is guided by the model. The processor is arranged to effect action in the subject system. The subject system is known by the model. This allows the actor to be guided in its action on the subject system by the model of the subject system. Events can occur in the subject system either through the actions of the actor, as guided by the model, or through actions of other actors, or through a change in state of the subject system itself (e.g. the progression of a chemical reaction) or its environment (e.g. the passage of time). The actor keeps the model updated with its own actions. When the processor is processing according to the model, it updates the model with intermediate actions and with the actions it effects in the subject system.

26 Claims, 46 Drawing Sheets

U.S. PATENT DOCUMENTS

| | | | |
|---|---|---|---|
| 5,596,331 A * | 1/1997 | Bonaffini et al. | |
| 5,875,330 A * | 2/1999 | Goti | 717/104 |
| 5,887,143 A * | 3/1999 | Saito et al. | 709/248 |
| 6,618,856 B2 * | 9/2003 | Coburn et al. | 717/135 |
| 6,718,533 B1 * | 4/2004 | Schneider et al. | 717/100 |
| 7,472,374 B1 * | 12/2008 | Dillman et al. | 717/102 |
| 7,512,531 B1 * | 3/2009 | Shia | 703/16 |
| 2002/0091990 A1 * | 7/2002 | Little et al. | 717/105 |
| 2003/0229407 A1 * | 12/2003 | Yasui et al. | |
| 2004/0098145 A1 * | 5/2004 | Zhenduo et al. | |
| 2004/0103393 A1 * | 5/2004 | Reddy et al. | 717/122 |
| 2004/0128019 A1 * | 7/2004 | Ikeda et al. | |
| 2004/0158442 A1 * | 8/2004 | Kondo | |
| 2005/0034107 A1 * | 2/2005 | Kendall et al. | 717/136 |
| 2005/0216320 A1 * | 9/2005 | Hattaway | 705/7 |
| 2006/0101467 A1 * | 5/2006 | Buco et al. | 718/102 |

FOREIGN PATENT DOCUMENTS

| | | |
|---|---|---|
| WO | WO99/30230 A1 * | 12/1997 |
| WO | WO2004/046835 A2 * | 6/2004 |

OTHER PUBLICATIONS

Richard M. Fujimoto, "Parallel and Distributed Simulation Systems", 2001, Proceedings of the 2001 Winter Simulation Conference, p. 147-157.*

Jeff Friesen, "Java 2 by Example", Dec. 14, 2001, Que, 2nd Edition, Chapter 13.*

Gul Agha et al., "Actors, a conceptual foundation for concurrent object-oriented programming", 1987, MIT Press.*

A Process-Driven, Event-Based Business Object Model; Riemer, K., Enterprise Distributed Object Computing Workshop, 1998 Proceedings, IEEE, USA Nov. 3-5, 1998, pp. 67-74. XP010309713.*

Multi-log Processor—Towards Scalable Event-Driven Multiprocessors; Vinod Viswanath, Euromicro Symposium on Digital Design (DSD '04), 2004. pp. 279-286. XP010723510.*

* cited by examiner

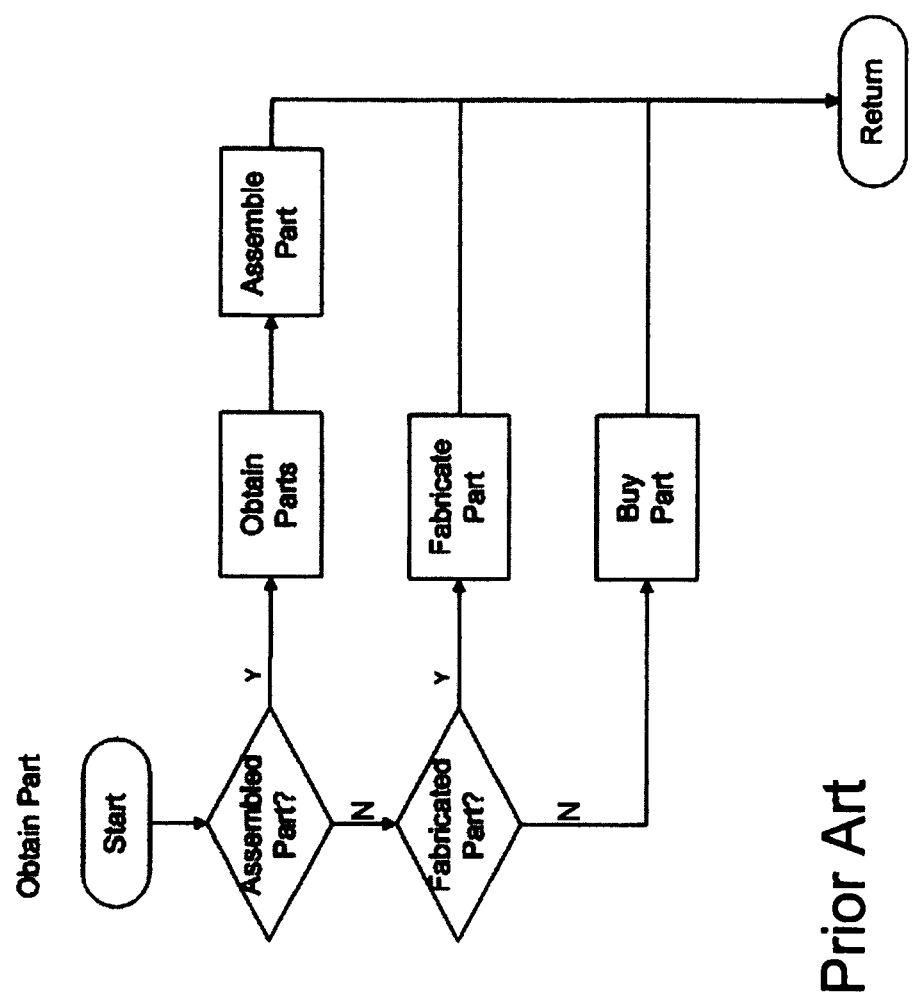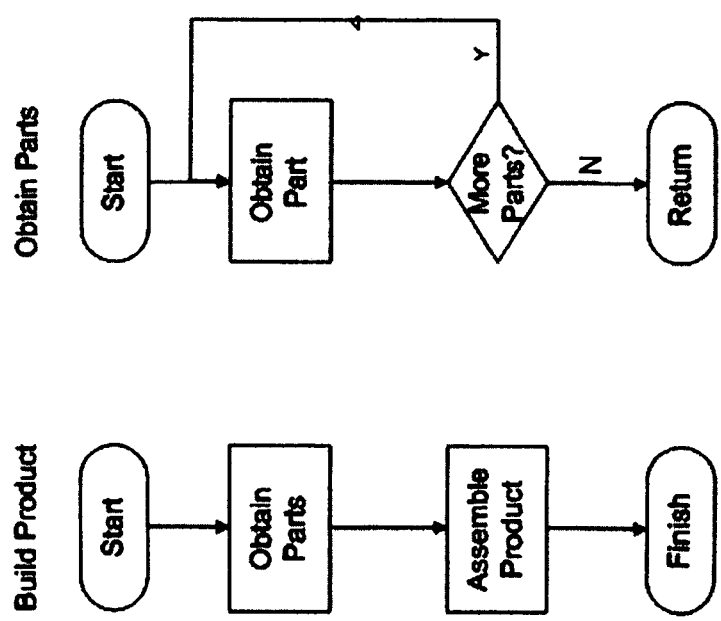
Figure 7
Prior Art

Prior Art

ACTING ON A SUBJECT SYSTEM

FIELD OF THE INVENTION

The invention relates generally to acting on a subject system using a model. In particular, the invention relates in its various aspects to an actor for effecting action in a subject system, to a logic-based computing device including an actor for effecting action in a subject system, to a complier, to methods of effecting action in a subject system, to a method of controlling a complier, and to a method of modelling a subject system.

BACKGROUND TO THE INVENTION

The notion of a system has been around for several decades. For instance, in Ackoff's 1971 paper "Towards a System of Systems Concepts" (Management Science, 17 (July) 661-671), definitions of several key systems concepts are provided. A system is defined as " . . . a set of interrelated elements", the state of a system is defined as " . . . the set of relevant properties which that system has at [a moment of] time" and the environment of a system is defined as " . . . a set of elements and their relevant properties, which elements are not part of the system but a change in any of which can produce a change in the state of the system". Also, an event is defined as " . . . a change in the . . . state of the system (or environment)" and the paper describes the dependency of systems changes on events in the system or its environment, through "reactions", "responses" and "autonomous acts".

One way in which a modern system could be illustrated is given in FIG. 1. At its core is a product 1-2, such as a general purpose computer system or an embedded computer system. The product 1-2, which is also a system within the wider system of FIG. 1, may be employed as an actor in an enterprise 1-1 (which may also be viewed as a kind of system) in the provision of a service 1-3 such as online technical support. The service 1-3 constitutes another system. Products 1-2 and/or services 1-3 can be consumed by other enterprises (not shown) or by consumers 1-4, e.g. a person 1-5, a group 1-6 or a household 1-7. The consumer 1-4 may also be modelled as a system.

Enterprises 1-1 and consumers 1-4 are socio-technical systems, and services 1-3 are usually delivered through a combination of technology and human resources. This means that in analysing, designing, constructing, testing, implementing and operating modern complex, adaptive systems, it is desirable to address more than just the technical requirements of computers and other machinery. For maximum effect, it is important to understand how industrial and other processes interact with applications and how people are organised to execute the processes of these applications.

The tools which have developed over the last fifty or so years are in many ways inadequately equipped to address the challenges of modern systems, such as the system described above. The inventor considers that this is because: their underlying architectures are essentially sequential or serial in nature, whereas most real-world systems are highly parallel or concurrent; they typically have static definitions, which makes them difficult to adapt as real-world systems change over time; they reinforce semantic gaps between different layers of architecture and different stages of development; and because different disciplines use different languages and tools for very similar phenomena, inhibiting the sharing of solutions, particularly in complex, socio-technical systems. It is as a consequence of this last point in particular that prior art concerning the analysis, design, construction, testing, implementation and operation of modern complex, adaptive technical and socio-technical systems of the types described in FIG. 1 comes from many existing fields. These fields include: sequential and parallel computer hardware, including synchronous and asynchronous sequential circuits; computer software, including event-driven software; data (including "triggers") and meta-data; computer operating systems; artificially intelligent agents, including expert systems; system development methodologies, tools and techniques; analytic simulators and digital virtual environments; and business process re-engineering and Organisation design.

FIG. 2 represents a conventional Von Neumann computer. It contains a Central Processing Unit (CPU) 2-3, which contains a Control Unit 2-4 and an Arithmetic & Logic Unit (ALU) 2-5. The computer also contains a Memory 2-6, and an Input/Output (I/O) Controller 2-2. The CPU 2-3, the Memory 2-6 and the I/O Controller 2-2 communicate via an internal Bus 2-1. The fetch, decode, execute cycle of such a computer is operated under the control of a Program Counter 2-7, included in the CPU 2-4. By default, the Program Counter 2-7 increments after each instruction, so the next action obtained is the next instruction in sequence. Exceptions (or jumps) in the flow of sequence can be effected by an instruction over-writing the Program Counter 2-7 with the address of the next instruction to be executed. (This control flow mechanism appears to have several features in common with the Turing Machine, proposed by Alan Turing in 1936. While it is likely that John Von Neumann was aware of Turing's ideas, it is not clear whether he applied them in the Report to the U.S. Army Ordnance Department, entitled "Preliminary Discussion of the Logical Design of an Electronic Computing Instrument", which he presented in 1946 along with A. P. Burks and H. H. Goldstine.)

The resulting "flow & jump" mechanism enables Von Neumann-like computers to support a vast range of computational algorithms. However, most of the applications supported by today's and tomorrow's computers are very different to the computations required a few decades ago to break codes or to predict missile trajectory. Instead, they need to reflect the systems in the world around us, either to help us manage the complexity we experience or to use that complexity to increase the sophistication of our products and services. In these real-world systems, many simultaneous or near simultaneous events may need to be recognised, stored and potentially acted upon. Our models of these systems also change continuously as our understanding of the systems develops.

Similarly, the current proliferation of computing devices was not predicted in Von Neumann's time. At that time, it was expected the potential for such devices would be restricted to scientific and military applications, and that there would perhaps some hundreds of computers at most. However, there are now hundreds of millions Von Neumann type computers, both general purpose (e.g. desktop computers) and embedded (e.g. automotive control systems). Many of these devices also communicate with one another, usually through somewhat rigidly defined computer networks. In the near future, it is envisaged that there will be billions of "computers" cooperating with one another through networks which dynamically configure and reconfigure themselves second-by-second. The inventor considers that the Von Neumann architecture will become a major inhibitor to the development of such massively dynamic computer networks.

The Von Neumann architecture, which is the basis for the vast majority of modern computers, is fundamentally sequential. "Communicating Sequential Process" (CSP), "Dataflow" and "Actor" models have been proposed in attempts at providing concurrency. However, these approaches tend to reinforce semantic gaps, to support only coarse-grained parallelism or to be limited to relatively specialised computational applications.

Communicating Sequential Processes was devised by Professor C. A. R. Hoare ("Communicating Sequential Processes", Communications of the ACM, vol. 21, pages 666-677, 1978), building on the work of Dijkstra (DIJKSTRA, E. W. (1975). "Guarded Commands, Nondeterminacy and Formal Derivation of Programs", Communications of the ACM, vol. 18, pages 453-457). Communicating Sequential Processes introduced parallel sequential processes capable of communicating via synchronised input and output commands. Initial work in this area was targeted at new programming languages, but has since been taken up in hardware designs, for example in Inmos's Transputer.

Another alternative to the Von Neumann architecture is the "Dataflow" machine, which can be contrasted with the Von Neumann "control-flow" approach. In Dataflow machines, the program counter has been eliminated and execution is driven solely by the availability of operands. This enables much more fine-grained parallelism than either the Von Neumann or Communicating Sequential Process models.

FIG. 3 illustrates an early Dataflow processor designed by Dennis and Misunas at MIT in 1975. The MIT Dataflow Machine includes a set of Processing Elements 3-1, which are interconnected through a Communication Network 3-2. Within a Processing Element 3-1, an Activity Store 3-5 holds activity templates. An Instruction Queue 3-4 holds the addresses of fired instructions (i.e. activity templates for which all inputs are available). The first entry in the Instruction Queue 3-4 is removed by a Fetch Unit 3-9, which uses the entry to fetch the corresponding opcode, data, and destination list which constitute the activity template held in the Activity Store 3-5. This is then packed into an operation token, which is forwarded by the Fetch Unit 3-9 to an available Operation Unit 3-3. The operand slot in the template then is cleared. The Operation Unit 3-3 executes the operation specified by the opcode using the corresponding operands, generates result tokens for each destination, and provides them to a Send Unit 3-8, which decides whether the destination of the token is in a local Processing Element 3-1, or is in a remote one. If the destination is determined to be local, the token is sent to a local Receive Unit 3-7 that, in turn, passes it to an Update Unit 3-6. Otherwise, the token is routed to the destination Processing Element 3-1 through the Communication Network 3-2. Instructions are processed in a pipeline fashion since all units operate concurrently.

The Dataflow approach has been described (by AGHA, GUL "Actors: A Model of Concurrent Computation in Distributed Systems", MIT Press, 1986) as having a static interconnection topology, since functions are queued in advance and are initiated based on pre-determined token-matching rules, which are the only events that the Dataflow model recognises. Token matching adds considerably to the complexity of the approach, which has consumed much of the development effort associated with Dataflow machines. This limits the Dataflow model's range of solutions to those involving computation, as well as limiting its capacity to support dynamic execution of models which can be extended or reconfigured.

Dataflow and control-flow approaches have been combined (e.g. in the design for the Intel Pentium Pro (COLWELL, R. P., STECK, R. L. "A 0.6 µm BiCMOS Processor with Dynamic Execution", In: Proceedings of the International Solid State Circuits Conference, February 1995)) in an attempt to tackle the weaknesses of both approaches. However, this has not fundamentally addressed the limitations inherent in either approach.

Yet another alternative to the Von Neumann architecture is the "Actor" model of concurrent computation, originally devised by C. E. Hewitt and others in the late 1970's and described by Gul Agha in "Actors: A Model of Concurrent Computation in Distributed Systems", MIT Press, 1986. In this model, actors are stimulated by the receipt of a "communication" contained within a "task" to enact a pre-defined "behaviour" with which the actor has been associated. Behaviours are defined as collections of, possibly conditional, "commands" which will cause the actor to create other actors and/or send further communications, as well as potentially modifying its own behaviour in response to the next communication it may receive. The only type of event which actor systems recognise is the creation of a new "task" (i.e. "communication"). Hence, all activity within an actor system is driven by the propagation of communications between actors. This is both a strength and a weakness of actor systems. These relatively simple mechanisms can be used to embody a vast range of concurrent computations. It is claimed that the Actor model is powerful enough to implement any system which can be defined within the Communicating Sequential Process or Dataflow models described above. However, it limits the degree of granularity of concurrency to individual behaviours, each of which may include multiple, conditional commands. It can also be said that the Actor model widens the semantic gap between modern systemic applications and the underlying computational environment, such as requiring convoluted mechanisms for handling non-communication related events, thereby limiting its real-world application.

Underlying most Von Neumann and other existing computer architectures are "synchronous sequential" electronic circuits. In such circuits, transitions between states are initiated by pulses from a clock. For example, each step in the fetch-execute cycle described above is triggered by a single clock pulse. This approach is recognised to have certain drawbacks, including inhibiting cycle time reduction, unnecessary power dissipation and unfortunate noise and emission side-effects. As a consequence of these drawbacks, in recent years there has been considerable interest in exploiting asynchronous sequential circuits, despite the more complex design and testing requirements of such circuits. However, this research, carried below the level of the overall computer architecture, has not addressed the underlying sequential nature of the Von Neumann architecture.

The conventional high-level languages in which most software is written developed from the need to make the machine languages which controlled Von Neumann type computers more accessible. As such, these languages embody the limitations of the sequential machines. This has been described by Silc et al (SILC, JURIJ; ROBIC, BORUT; UNGERER, THEO "Processor Architecture: From Dataflow to Superscalar and Beyond", Springer, 1999) who said "... the architectural characteristics of the Von Neumann design are still valid due to the sequential high-level programming languages that are used today and that originate in the Von Neumann architecture paradigm."

As illustrated in FIG. 4, conventional software is written as a program in some programming language (e.g. C, Java, etc.). Every instruction of each program then needs to be translated either into the machine language of the computer on which the program is to be executed, or into some intermediate form (e.g. "bytecode") to be executed on a virtual machine (VM). In this latter case, individual operations then become microprograms (which are also serial) at the next level down.

It should be noted here that much modern software is designed and developed using an "object-oriented" (OO) approach. Having been developed out of the Hewitt Actor approach described above, OO software exploits the sending of messages between "objects" to drive program execution. This is particularly evident in the development of graphical user interface (GUI) software, which is often described as "event-driven". Such "coarse-grained" events initiate the execution of small segments of software, usually referred to as "methods" in the OO prior art. However, such software segments remain firmly rooted in the Von Neumann paradigm—i.e. they are essentially sequential. (The name "actor" employed by Hewitt et al is much more appropriate than "object", since such components effect action within the software. However, it is the term "object" which, although confusing, has gained currency in the prior art.)

Similarly, "triggers" have recently been introduced within the database management system (DBMS) domain, in which a small piece of software is associated with a particular field within the database and is executed whenever the associated field is updated. Again, while this has some elements of coarse-grained event-driven processing, each small piece of software is itself firmly rooted in the Von Neumann paradigm.

Several event-driven, object-oriented approaches are described in the prior art, including Pavilion (WO2001/77872), Cook et al (U.S. Pat. No. 6,178,432) and Mukherjee et al (U.S. Pat. No. 6,195,685), as well as IBM Technical Disclosure Bulletin NN9511431 "Event Data Management in an Object Oriented System". Each of these is a variety of the coarse-grained event-driven approach described above, and as such relies on sequential software (usually OO "methods") for implementation.

Considering how computer hardware and software interact, FIG. 5 shows how a modern layered computer operating system might be designed, similar to that described in TANENBAUM, ANDREW S. "Modern Operating Systems" Prentice Hall, 2001. A computer operating system manages the underlying computer hardware resources (e.g. memory, disks, printers, etc.) and provides a "virtual machine" more suitable to the needs of the users and programmers of the computer system concerned. It comprises seven virtual layers, 5-11 to 5-17 running on a CPU 5-20. The first layer 5-11 hides the underlying hardware, providing a low-level virtual machine on top of which a common operating system can be designed to support several different hardware configurations. The second layer 5-12 provides the basic building blocks of the operating system, including interrupt handling, context switching and memory management. The third layer 5-13 contains the components essential to managing processes, and, more specifically, threads, within the operating system, which is essential to providing a multiprocessing environment on essentially a single, sequential CPU. The fourth layer 5-14 provides the drivers which handle all activity involving each of the specific peripherals or resources which are or which may be connected to the CPU. Above this is the virtual memory management layer 5-15, which enables the computer to offer memory spaces to its users which are apparently significantly in excess of the physical memory available. The sixth layer 5-16 provides the features necessary to support the management of files held on disks and other long term storage media. The seventh and top layer 5-17 handles system calls and thereby provides the interface through which user programs 5-18 can make calls on the system resources.

All these layers of software components reside in layers above the computer's CPU 5-20, requiring the CPU 5-20 to be involved in every operation which the computer performs. Some approaches have been devised to share this workload between multiple CPUs, through multi-processor (tightly coupled), multi-computer and distributed computer (loosely coupled) configurations. However, due to the monolithic, sequential nature of the underlying hardware model, these configurations add significant complexity to the supporting operating system, proportional to the tightness of coupling, particularly in the areas of process scheduling and synchronisation.

In recent years, there has been a considerable increase in the awareness of the importance of understanding meta-data, which can be thought of as "data about data". This increased awareness seems to have come from two main sources, namely: the need to realise the value of data warehousing and business intelligence solutions; and the need to reduce the effort associated with developing, maintaining and exchanging information between websites. Consequently, there has been growing interest in the software communities in technologies such as XML and the Meta-Object Framework (MOF). The value of meta-data in the realm of data interchange is well understood. However, in most cases, the meta-data is not available to users or their applications, being either implicit in the application, or held in analysis and design phase models which have not been translated through to the ultimate application. This inhibits the flexibility of most such applications to adapt as the context in which they are being used changes.

Similarly, there have also been developments in the area of meta-level programming, specifically with the use of Metaobject Protocols (MOPs) employed by the Common LISP Object System (CLOS) and other programming languages and systems. These MOPs involve base level application programming in the context of meta-level programs which describe the objects in the programming language or system itself. However, such MOPs are only available to specialist programmers during development and are not available for modification at run time—i.e. post compilation or interpretation. They also appear to add considerably to the complexity of execution, making it difficult for them to support concurrent execution in particular.

Other meta-data related prior art includes Nye (US2003/0195867). Nye claims to provide "a way to flexibly handle state transitions by using an event model". It defines an event as "a set of actions, possibly empty, which is optionally contingent upon a condition" and states that "during each tick of the internal clock, all computable events are processed in random order." In this way, it uses meta-data to guide the operation of a conventional coarse-grained event-driven system.

Conventional organisation design can begin with either a functional approach (marketing, sales, manufacturing, engineering, finance, IT, etc.), or a process-based approach (e.g. as employed in Activity Based Costing) or a value-chain approach (as described by Porter (PORTER, MICHAEL E. "Competitive Strategy", Free Press, 1980)) or some combination of these approaches (e.g. matrix organisation). More systemic approaches to understanding and/or designing "soft systems" have been described recently (e.g. Peter Checkland "Systems Thinking, Systems Practice", John Wiley & Sons, 1981), and these have sometimes been employed in the process of organisation design. In each case, however, what the organisation has to do is assumed to be fixed once the re-organisation is complete and the result is a static functional, process-based or matrix organisation.

Considerable interest has been given in recent years to learning organisations, but definitions are somewhat imprecise. For example, it has been suggested that a learning organisation is designed as a flat, non-hierarchical structure with minimal formalized controls, but this gives no clues as to what components should be included in the structure.

Stafford Beer in his book "Diagnosing the System for Organizations" (Chichester: John Wiley & Sons, 1985), introduced the concept of a "viable system", which he defined as a system "... able to maintain a separate existence ... [within] a particular sort of environment". In this book, Beer identified the need for organisations (which he saw as systems) to become more adaptable if they are to remain viable, but did not describe the detailed mechanisms by which adaptation occurs and did not pay particular attention to how such viable organisations are enabled.

The concept of an artificial intelligent agent has been around since before the birth of computing. During the 1960's and 1970's, considerable attention was paid to making computers "intelligent". In particular, Expert Systems found a niche within which they had a recognisable technical effect, for example in the configuration of computer hardware such as in Digital Equipment Corporation's "R1" system. However, such agents have found limited sustained commercial value, due to their complexity and to the cost of building them. They also typically have poor run time performance. The mechanisms by which they could become viable (in the sense discussed by Beer) have not been described.

FIG. 6 shows a general model of learning agents, as defined by RUSSELL, STUART AND NORVIG, PETER "Artificial Intelligence: A Modern Approach", Prentice-Hall, 1995. An agent 6-0 takes performance standards and inputs from an environment, and acts on the environment. In the agent 6-0, a performance element 6-1 takes percepts as inputs from sensors 6-2 and decides on actions, which it then outputs to effectors 6-3. A learning element 6-4 takes some knowledge about the performance element 6-1 together with input from a critic 6-5 concerning how the agent is performing, and determines what changes to send to the performance element 6-1 with a view to improving performance for the future. A problem generator 6-6 suggests actions to the performance element 6-1 that will lead to new and informative experiences, based on learning goals provided from the learning element 6-4.

In Expert Systems and other knowledge-based systems, the performance element 6-1 often comprises knowledge in the form of "IF <condition> THEN <inference>" rules, known as "production rules". Such systems use these rules together with "forward-chaining" search algorithms to find inferences from which actions can be initiated and from which, sometimes, new "knowledge" can be generated. While Expert Systems have had some considerable technical effect and commercial success, as did the R1 system described above, production rules were found to have poor performance, due to the resources consumed by forward chaining search algorithms, and limited application. Consequently, designers often had to resort to other methods to capture knowledge, such as frame systems and neural networks. As a result, several different knowledge representation mechanisms, which are difficult to integrate, can be present in modern-day knowledge-based systems.

Some prior art, including Koninklijke KPN (WO2002/054296 & EP1253533) and Ross (U.S. Pat. No. 6,598,033) claim to employ knowledge-based approaches in solving domain-specific problems—telecommunication service provision and alarm correlation respectively. However, these owe more to conventional object-oriented approaches, as described earlier, than to knowledge-based systems.

Several modelling techniques have been used to describe rule systems of different types.

Computer software has been described and/or designed using several graphic techniques from conventional flow charts, such as those shown in FIG. 7, to object-oriented techniques, such as those described in the Unified Modelling Language (UML)—and associated languages, such as the Object Constraint Language (OCL). UML is illustrated by the UML class diagram and the UML activity diagrams of FIGS. 8A and 8B respectively. Mathematical set theory has also been employed, through languages such as "Z".

Computer hardware has traditionally been modelled graphically using block diagrams or electronic circuit diagrams. More recently, the Very High Definition Language (VDHL) has been employed to model, and subsequently simulate, the structure and behaviour of hardware components and systems using software-like rules.

Industrial and other processes have typically been described and/or designed using conventional flow charts, like those used by software designers. These flow charts often form the basis of modern-day workflow solutions. Processes have also been described and/or designed by dedicated process modelling techniques, such as those of IDEF0 and IDEF3 shown in FIGS. 8C and 8D respectively.

The fact that the techniques employed in designing organisations, processes, software and hardware are different is a significant issue since it can be difficult to describe and/or design systems which span these different domains. On the other hand, they do have many features in common. They are also incomplete since not all rules concerned with the behaviour of the system can be captured. For example, it may be noted that OCL was required as an add-on to UML to capture many of the constraints needed to describe a business system adequately. Also, these techniques basically are flow-based or sequential. IDEF0 and UML claim not to be flow-based descriptions of systems, but to get to a complete description of behaviour, flow-based or sequential components are required. Specifically, these components are IDEF3 process flows for IDEF0 and Methods for UML. While Z models are not flow based, they have no mechanisms for describing event-driven systems. Because they are not built into the solution system, these techniques typically are disconnected from the final system. Lastly, these techniques do not allow meta-objects to be modelled easily alongside objects, which limits their ability to support adaptive behaviour.

Several process templates (or "methodologies") have been proposed for developing the technical and/or socio-technical systems described in FIG. 1. These are typically of a "waterfall" style, such as the Information Engineering Methodology shown in FIG. 9A, or of an "iterative" style, which might be employed in an Object-Oriented Methodology, such as that shown in FIG. 9B. In both cases, these methodologies define the sometimes repeated but always sequential order in which the development processes should be executed if such systems are to be defined correctly. Neither approach recognises or adequately reflects the real-world situation in which several activities either can or must proceed in parallel for any such development to complete successfully.

In his book "The Fifth Discipline: The Art & Practice of The Learning Organization" (1990, London, Century Business) Peter Senge distinguishes between two types of complexity associated with systems, namely: "detail complexity" and "dynamic complexity". Detail complexity is the complexity of "many variables" and is well known to software developers and business process modellers who have tried to capture precise rules within their models. Dynamic complexity on the other hand is the complexity of "non-obvious consequences" where unforeseen interactions between elements of a system have unexpected effects, particularly over time. Testing detail complexity is the domain of conventional software testing environments, in which repeatable test cases are created to validate that a particular program or system does what it is expected to do under specific test conditions. The role of simulation is to explore dynamic complexity.

Simulators can be considered to be from one of two classes. These are: analytic simulators, which are used to understand the dynamics of a whole system, usually while it is being designed, constructed or modified; and digital virtual environments, which are used to enable humans to interact with complex virtual systems, typically in a gaming or training situation.

Focusing on analytic simulators, Zeigler et al (ZIEGLER, BERNARD P.; PRAEHOFER, HERBERT; KIM, TAN GON "Theory of Modelling and Simulation: Integrating Discrete Event and Continuous Complex Dynamic Systems", Academic Press, 1999) have shown that there are essentially three ways in which a system can be modelled: as a continuous system described by differential equations (Differential Equation System Specification—DESS); as a collection of equations showing the state of the system after each discrete period of time (Discrete Time System Specification—DTSS); or as a collection of equations describing how the system state changes from one discrete event to another (Discrete Event System Simulation—DEVS). As DEVS simulators can be described for quantised DESS models and for DTSS (see Zeigler et al 1999), DEVS may be considered as the key to the three system modelling methods.

DEVS models system dynamics through sets of equations representing: a set of input values, each associated with an external event; a set of states; a set of output values; an internal state transition function; an external state transition function; an output function; and a resting time function. The only events recognised by such simulations are the passage of a pre-determined period (i.e. the resting time) constituting an internal event, or the arrival of an input, constituting an external event. Although these internal and external events cause activity within such a simulation, this is as a coarse-grained trigger to a state transition function, which typically is implemented as a sequential program or method within an object-oriented programming language. There is no facility within such simulation models to have activity triggered by an internal change of state, other than the passage of time.

In Parallel & Distributed System Simulation (PDES—see FUJIMOTO, RICHARD M. "Parallel and Distributed Simulation Systems", John Wiley & Sons, 2000), parallel and distributed simulation models can be described in terms of collections of DEVS simulators. PDES typically offers coarse-grained parallelism (concurrency is achieved through assigning separate sequential logical processes to different processors). The fundamental difference between parallel and distributed simulations is communication latency between "logical processes" in the simulation. It should be noted that there are different kinds of time involved in a simulation, namely physical time, simulation time and wall-clock time and that these are particularly important for PDES. Physical time is the time in the physical system being simulated. Simulation time is an abstraction of the physical time employed by the simulation, which typically is speeding up (although it may be slowing down) physical time to meet the needs of the simulation. Wall-clock time is the actual time during the execution of the simulation, and is particularly important for distributed simulations.

Although several classes of analytic simulators and digital virtual environments have been defined for both single processor and multi-processor (i.e. parallel and distributed) architectures, such simulations are defined in terms of sequential state transition functions which must be defined separately from the detailed rules of a new or changing system, thereby separating any simulation from the main design stream and constraining it to coarse-grained parallelism at best; this may be one of the reasons why simulation is used relatively infrequently despite the large paybacks often claimed for simulation projects.

The prior art contains applications of such simulators, such as Borschev et al ("Distributed Simulation of Hybrid Systems with AnyLogic and HLA", XP00434823PD), which employs a coarse-grained, event-driven, object-oriented approach, as well as potential solutions to some of the challenges of parallel or distributed simulation described elsewhere (e.g. Steinman—U.S. Pat. No. 6,324,495).

Some of the key constraining characteristics of the above-described prior art follow.

The Von Neumann Architecture has embedded the "flow & jump" mechanism in virtually all current computing solutions. This has helped to reinforce a sequential/serial view of the world. Even some of the more popular attempts at defining a concurrent computation model (e.g. CSP) have been constrained by this viewpoint, limiting the granularity of the parallelism which they have been able to achieve.

As hardware and software designers have worked to make computers more usable, two critical semantic gaps have been introduced. The first is the gap which has developed between high-level languages and the underlying computer hardware as hardware designers have attempted to work around the limitations of the Von Neumann Architecture with techniques such as pipelining. The second is the gap between the problem domain and the software, which has become more acute as the nature of the problem has adapted from being one of computation to one of system representation.

Several schemes described in the prior art have adopted a coarse-grained, event-driven and usually object-oriented approach. However, these are constrained both by the variety of definitions of "events", "states", "actions" and "objects" and by their reliance on Von Neumann-based sequential software segments (usually OO "methods") for implementation.

Most of the tools in use today to understand and design systems tend to be unsatisfactory since they do not allow the designing-in of the ability to adapt as understanding of the subject system changes. Consequently, change is resisted and, when it finally becomes inevitable, it can be traumatic. For example, much money is spent each year on IT projects which fail.

The interactions between different components of systems are often overlooked because they are addressed by people from different disciplines who have different tools (such as different modelling techniques) for looking at their component of the situation. Many IT project failures are caused by failing to recognise the "people change management" implications of a particular technical solution, primarily because application developers and change management specialists lack the tools and language to help them understand others' points of view.

The invention provides several related concepts many of which individually, and in combination, create a common, holistic framework, potentially enabling parallel execution of adaptable rule sets and eliminating the semantic gaps between problem domains and software and hardware solutions. Taken together, these concepts offer a new approach to the analysis, design, construction, testing, implementation and operation of complex technical and socio-technical systems in general and of adaptive, massively micro-parallel computing systems, of self-adaptive viable intelligent agents and of viable enterprises in particular.

SUMMARY OF THE INVENTION

According to a first aspect of the invention, there is provided an actor for effecting action in a subject system, the actor comprising:
a model of the subject system, the model including:
objects which represent objects within the subject system, each object in the model having associated therewith data which define which of two or more states the object is in at a given time, and
rules which define actions which are to be initiated in response to events, an event being the change in the state of an object, and
a processor, arranged:
to respond to an event in the subject system by initiating one or more actions in the subject system which are dependent on the event, as defined by the rules of the model.

There may also be objects in the model which can have only one state, as long as there are objects which can have one of two or more states.

All changes in the state of the objects may be considered as events. However, only rules relating to events which are significant, in so far as they require one or more actions to be initiated, are required to be included in the model.

The processor of an actor constructed according to the invention may not be constrained to an arbitrarily sequential paradigm, such as that created by the Von Neumann Program Counter, so is able to be constructed so as to avoid disadvantages thereof.

The processor of an actor so constructed can be capable of supporting fine-grained parallel operation.

Since the processor executes the model directly, there is no semantic gap between the model and the processor. Furthermore, there are no semantic gaps between stages of development caused by translation of model into a format understood by the processor.

Expressing the model in terms of the subject system it represents can result in there being no semantic gap between the subject system and the model.

The actor according to the invention allows the use of a model which does not depend on programmatic components, such as OO "Methods", to describe detailed actions. The model can be directly capable of driving fine-grained parallel actors (e.g. computers, industrial machinery). The model can be made to be capable of expressing constraints which would normally require additional language (e.g. OCL for UML).

Construction of suitable actors can allow a broad range of subject systems, not just computations, to be supported. This is unlike, and superior to, the Dataflow or Actor paradigms.

All events and actions may be constituted as objects. This contributes to simpler models which are easier to use.

The processor may be arranged to execute the actions initiated in response to a single event directly in a single step. Such actions can be referred to as 'elementary actions'. In the model, a composite action initiated in response to an event may be defined in terms of sub-actions, initiated in response to events directly or indirectly resulting from the execution of the composite action. Each sub-action may be either an elementary action or another composite action, This allows the more accurate representation of certain events in the real world, and can allow simpler modelling, as well as enabling fine-grained parallel execution. It should be noted that an elementary action which can be executed by the processor directly in a single step at one level may require elaboration to multiple lower level actions for the underlying processor on which the higher level processor is elaborated. However, in this case, each of these lower level actions will in turn be event-driven in the same sense.

The model may contain two or more sub-models, each of which is a model of a sub-system of the subject system. Using this feature, one processor can operate multiple models.

Preferably, the actor includes a meta-actor comprising a meta-model and a meta-processor,
the meta-model including:
objects which represent objects within the model, each object in the model having associated therewith data which define which of two or more states the object is in at a given time, and
rules which define actions are to be initiated in response to events, events being changes in states of objects in the model, and
the meta-processor being arranged:
to respond to an event in the model by initiating one or more actions in the model which are dependent on the event, as defined by the meta-model.

Here, since the meta-model is explicit, the model can be modified while being executed, allowing the actor to adapt its behaviour whilst it is in operation, potentially avoiding the requirement of the meta-model being fixed in advance, for example by compiler or toolset providers.

The meta-model may form part of the model, and/or the meta-processor may form part of the processor. These features can allow the actor to take on new types of model while it is in operation.

The meta-model may contain two or more sub-meta-models, each of which is a model of a sub-system of the model. In this way, one meta-processor can operate multiple meta-models.

Preferably, the action of the processor is effected by a root meta-actor, comprising a root meta-model and a root meta-processor,
the root meta-model being a generic model for processing a model of the same type as the model, and including:
objects which represent objects within a generic model execution system, each object in the model having associated therewith data which define which of two or more states the object is in at a given time, and
rules which define actions which are to be initiated in response to events, an event being the change in the state of an object, and
the root meta-processor being arranged to guide the root meta-model:
when an event is triggered, to examine the definition of the event in the model to determine what actions, if any, should be initiated, and to initiate those actions;
when an action is initiated, to examine the definition of the action in the model to determine what objects, if any, should have their state changed, and to change the states of those objects accordingly; and
when the state of an object is changed, to examine the definition of the object in the model to determine what events, if any, should be triggered, and to trigger those events.

This can be said to provide a general purpose realisation of the first actor described above.

Preferably, the actor includes a meta-actor and a root meta-actor. In this case, since the meta-model is explicit, the model can be modified while being executed, allowing the actor to adapt its behaviour whilst it is in operation.

The meta-model may form part of the model. This can also allow the actor to take on new types of model while it is in operation. Alternatively or in addition, the root meta-model may form part of the meta-model. This can allow the root meta-model to be modified while being executed, under certain circumstances. This potentially also avoids the requirement of the meta-model being fixed in advance, for example by compiler or toolset providers.

In any of the above actors, the processor, or one or more of multiple processors, may comprise:

one or more activators, operable in response to the triggering of an event to examine the definition of the event in the model, to determine which actions, if any, to initiate and then to initiate those actions;

one or more executors, arranged to effect the actions and being operable in response to the initiation of an action to examine the definition of the action in the model to determine what objects, if any, in the subject system to change the state of, and then to change the states of those objects accordingly;

one or more recorders, arranged to record the outcomes of actions and being operable in response to recognising the changing of the state of an object to examine the definition of the object in the model to determine therefrom what events in the subject system, if any, should result from the changes in the states of the objects and to trigger those events;

one or more interfaces to external channels via which the actor is connected to other actors or to the outside world; and one or more internal channels, via which the activators, executors, recorders and interfaces are connected.

In any of the above actors which includes a meta-actor, the meta-processor, or one or more of multiple meta-processors, may comprise:

one or more activators, operable in response to the triggering of an event to examine the definition of the event in the meta-model to determine which actions in the model to initiate, and then to initiate those actions;

one or more executors, arranged to effect the actions and operable in response to the initiation of an action to examine the definition of the action in the meta-model to determine what objects, if any, in the model to change the state of, and then to change those objects accordingly;

one or more recorders, arranged to record the outcomes of actions, including the creation, modification or deletion of objects within the meta-model, and operable in response to the changing of the state of an object to examine the definition of the object in the meta-model to determine therefrom what, if any, events in the model should result from the changes in the states of objects, and to trigger those events;

one or more interfaces to external channels via which the actor is connected to other actors or to the outside world; and one or more internal channels, via which the activators, executors, recorders and interfaces are connected.

In any of the above actors which includes a root meta-actor, the root meta-processor, or one or more of a number of multiple root meta-processors, may comprise:

one or more activators, operable in response to the triggering of an event to examine the definition of the event in the root meta-model to determine which actions to initiate;

one or more executors, arranged to effect the actions and operable in response to the initiation of an action to examine the definition of the action in the root meta-model to determine what objects, if any, in the processor to change the state of, and then to change those objects accordingly;

one or more recorders, arranged to record the outcomes of actions, including the creation, modification or deletion of objects within the root meta-model, and operable in response to the changing of the state of an object to examine the definition of the object in the root meta-model and to determine therefrom what events in the processor, if any, should result from the changes in the states of objects, and to trigger those events;

one or more interfaces to external channels via which the actor is connected to other actors or to the outside world; and one or more internal channels, via which the activators, executors, recorders and interfaces are connected.

These features allow for the decomposition of the processor into components which reflect the basic event-driven execution cycle allowable by the above actors. Implementing an event-driven execution cycle in this way allows fine-grained parallelism. Connections may be achieved by a bus, a ring-like channel system, or any other channel topology.

One or more of the activators, executors, recorders, interfaces or channels may be an actor as recited above. This allows for the decomposition of processor components according to the same model.

In any of the above actors, the model may elaborate a processor entity comprising one of a) a processor, b) a meta-processor or c) a root meta-processor of a virtual actor, thereby to enable the processor entity to be directly executed by any of a processor, meta-processor or root meta-processor of the first actor. This provides for the layering of virtual processors on top of physical processors.

Such an actor may be a simulator which initiates actions in a proxy subject system, and in this case the actor may include a model which includes further rules for:

handling the relationships between simulation, physical and wall-clock time;

handling the distribution of internal and external events defined in the detailed model of the first actor;

handling the creation and deletion of simulated actors, and their assignment and reassignment of roles within the model being simulated; and handling the assignment and elaboration of simulated actors to physical actors.

This can enable the simulation of actors within a similar architecture, either for dynamic analysis or for gaming or training.

In either case, the virtual actor may be arranged to elaborate a processor entity of a further virtual actor. This provides for multiple layers of virtual processors, e.g. for use in an operating system.

In any of these actors including an elaborating model, the model may contain two or more sub-models, each of which elaborates the behaviour of a processor entity of one or more other virtual actors. This allows multiple virtual processors to be supported by a single physical processor.

The invention also provides a system comprising two or more actors each as described above and being arranged to effect action in a common subject system, each actor being connected to each of at least one of the other actors via a respective channel. The channels enable the actors to communicate with each other.

Each actor may be connected to its respective channel by a first interface forming part of the actor and by a second interface forming part of the channel. Thus, the channel is provided with an interface to an actor.

Any or all of the channels or interfaces may be actors as described above. Providing some or all of the channels and/or interfaces in this way allows them to have the advantages outlined above in connection with the actor of the invention.

An actor outlined above may comprise a system as outlined above. This allows an actor to comprise a system of actors.

According to a second aspect of the invention, there is provided a logic-based computing device including an actor for effecting action in a subject system, the device comprising:

means for implementing a model of the subject system, the model including:
objects which represent objects within the subject system, each object in the model having associated therewith an indication of which of two or more states the object is in at a given time, and
rules which define actions which are to be initiated in response to events, an event being the change in the state of an object, and
means for implementing a processor, arranged:
to respond to an event in the subject system by initiating one or more actions in the subject system which are dependent on the event, as defined by the rules of the model.

This provides a logic based computing device which can provide in the computing domain all the benefits listed above as deriving from the actor of the invention.

The processor of this logic-based computing device may comprise one or more activators, one or more executors, one or more recorders, one or more internal channels and one or more interfaces. This provides a device which is capable of fine-grained parallel operation. This is unlike the Von Neumann paradigm, which necessarily is sequential. It is also unlike the CSP paradigm, which supports only coarse-grained parallelism. It also is applicable to more general situations than either the Dataflow or Actor paradigms.

Preferably, at least one activator includes: an event queue register, operable to contain a reference to an item in the event queue; an event register, operable to contain a reference to a current event; and an event type register, operable to contain a type of the current event. These features can be considered to replace the program counter of a conventional Von Neumann computer Advantageously, at least one executor includes: an action queue register, operable to contain a reference to an item in the action queue; an action register, operable to contain a reference to a current action; and an action type register, operable to contain a type of the current action. These features can be considered to replace the instruction register and, together with an instruction decoder, the control unit of a conventional Von Neumann computer Any such device may comprise a single activator, a single executor, a single recorder, one or more internal channels and one or more interfaces together provided on a single processing unit or integrated circuit. This allows the device to be implemented using a single processor, equivalently to a conventional computer with a single CPU, but which is capable of processing the model of the actor, which here is a parallel model, directly.

Alternatively, the device may comprise a single activator, a single executor, a single recorder and one or more interfaces, each of these components being provided on a respective processing unit or integrated circuit, the components being connected to each other via one or more channels. This provides a multi-processor implementation, capable of directly processing the same parallel model with no modifications, but with greater throughput. This has no real equivalent in conventional multiple CPU architectures, which tend to add considerable complexity in order to translate the sequential description of the system embodied in a program to allow it to be executed in parallel.

Here, plural activators can be connected via the one or more channels, and at least two of the activators may share a common event queue. This relates to the provision of fine-grained parallel activation.

Also, plural executors can be connected via the one or more channels, and at least two of the executors can share a common action queue. This relates to the provision of fine-grained parallel execution.

Furthermore, plural recorders can be connected via the one or more channels, and at least two of the recorders can share a common object queue. This relates to the provision of fine-grained parallel recording.

The activator or one or more of the activators each may comprise any of the logic-based devices above. The executor or one or more of the executors each may comprise any of the logic-based devices above. The recorder or one or more of the recorders each may comprise any of the logic-based devices above. These features allow massively-parallel processor implementation, with the attendant opportunity for an increase in throughput.

Two or more of the components may be distributed at different locations. This is possible since the invention allows a computing device to be formed of multiple connected components without them needing to be at the same physical location.

In any of the actors above including an elaborating model, a model of the actor may contain rules which enable the elaboration of a processor, a meta-processor or a root meta-processor onto a computer or computer system with Von Neumann-like architecture or onto an operating system which manages the resources of, or provides a simple interface to, a computer or computer system with VonNeumann-like architecture. This allows conventional Von Neumann hardware to operate as a pseudo-root meta-actor-based computing system or device.

Another aspect of the invention provides a computer system having plural resources each resource being managed by, and constituting a subject system of, an actor or a computing device as described above. This allows a configuration providing a tightly- or loosely-coupled integrated computing system, such as a personal computing system. Distributing interface activity to dedicated interface processors can free a primary processor from being involved in such activities (unlike in a conventional Von-Neumann processor), potentially significantly increasing throughput of the primary processor.

Another aspect of the invention provides one of certain of the above actors and a compiler arranged to use a model of a Von Neumann computer or a layered operating system to translate statically the model of the actor into the object or code of a Von Neumann computer or computer system or an operating system which manages the resources of or provides a simpler interface to a Von Neumann computer or computer system. Advantageously the compiler includes a meta-translator and a hardware meta model arranged to translate statically the model of the actor. These features allow an actor-based model, meta-model or root meta-model to be translated statically onto or operated on conventional Von Neumann hardware or using a conventional, for example layered, operating system.

A system comprising plural actors with elaborating models as described above may be arranged together to manage the resources of a computer system and enable the simultaneous execution of one or more models, meta-models or root meta-models on that computer system. This system can constitute an operating system operating according to the advantageous principles described in this specification. The computer system may be a Von Neumann-like computer or computer system, or it may be a root meta-actor logic-based computing device or system of such devices.

With an actor which initiates actions in a proxy subject system and which includes an elaborating model, the processor may comprise a logic based computing device as defined above. This can enable massively parallel simulations. The complexity of managing massively parallel simulation can be considerably reduced compared to the situation if it were performed on conventional Von Neumann hardware, even if parallel.

According to a third aspect of the invention, there is provided a complier arranged to use a model of a Von Neumann-like computer or a model of an operating system which manages the resources of or provides a simpler interface to, a Von Neumann-like computer to translate statically an application model comprising:

objects which represent objects in the application, each object in the application model having associated therewith data which define which of two or more states the object is in at a given time; and rules which define actions which are to be initiated in response to events, an event being the change in the state of an object, into the object or machine or assembler code of a Von Neumann-like computer or computer system or an operating system which manages the resources of, or provides a simpler interface to, a Von Neumann-like computer or computer system.

This provides a compiler which can allow the use of conventional computers or operating systems to implement event-based parallel actions, as with the actors mentioned above. The application model may additionally include any of the other features of models of the actors of the claims.

The invention also provides a system comprising first to fifth actors, each of the actors being an actor as described above, in which the first to fifth actors are respective ones of:

an operating actor, operable to perform an operation or transformation process;

a directing actor operable to determine purpose and performance goals of the system, and to provide the other actors with those goals;

a managing actor operable to control all other actors within the system with the aim of achieving the purpose and performance goals provided by the directing actor;

a learning actor, operable to develop and maintain at least one model forming part of each of the other actors; and an enabling actor, operable to provide sub-actors operable to perform the duties of the first to fifth actors. This provides components with which a viable system (i.e. a system able to maintain a separate existence, such as an artificially intelligent agent or a business enterprise) can be formed.

One or more of the first to fifth actors may each comprises a system as described in the paragraph immediately above. This offers a recursively defined viable system. This is particularly useful when designing complex viable systems, such as viable intelligent agents or viable business enterprises.

In a system comprising first to fifth actors as described above, the operating actor advantageously is arranged to operate a change system comprising:

an investigation sub-system arranged to investigate a problem or opportunity in a target system to determine what needs to be changed, by modelling of rules in terms of objects, actions and events and assignment and elaboration of the roles of actors in one or more of the target system, a problem system and an opportunity system and simulating the resulting model to test the detailed rules and to analyse the dynamics of the resulting system;

a development sub-system responsive to the completion of the investigation sub-system to model and simulate change to the target system by modelling of the objects, rules and actors in the target system and any other system modelled in the investigation system, and simulating the resulting model to test the detailed rules and to analyse the dynamics of the resulting system;

a preparation sub-system responsive to the completion of the investigation sub-system to model and to simulate the temporary system by which the change can be deployed by modelling of the objects, rules and actors in target system and any other system modelled in the investigation system, and simulating the resulting model to test the detailed rules and analyse the dynamics of the resulting system; and a deployment sub-system responsive to the completion of the development sub-system and the preparation sub-system to execute the system modelled and simulated in the preparation sub-system to deploy the change modelled and simulated in the development sub-system.

This applies the root meta-actor based approach to system development, making it possible to establish a systems project as a viable learning system, which is directed, operated, managed, enabled and adapted to create or change a target system using the same mechanism as any other viable learning system.

According to a fourth aspect of the invention, there is provided a method of effecting action in a subject system, the method comprising:

maintaining a model of the subject system, the model including:

objects which represent objects within the subject system, each object in the model having associated therewith data which define which of two or more states the object is in at a given time, and rules which define actions which are to be initiated in response to events, an event being the change in the state of an object, and controlling a processor, to respond to an event in the subject system by initiating one or more actions in the subject system which are dependent on the event, as defined by the rules of the model.

As well as all the benefits outlined above in respect of the actor invention, this method additionally is applicable to many classes of actors, including computers, machinery, people and organisations, and therefore is capable of supporting the design and development of complex socio-technical systems According to a fifth aspect of the invention, there is provided a method of effecting action in a subject system, the method comprising:

maintaining in a logic-based computing device means for implementing a model of the subject system, the model including:

objects which represent objects within the subject system, each object in the model having associated therewith an indication of which of two or more states the object is in at a given time, and rules which define actions which are to be initiated in response to events, an event being the change in the state of an object, and maintaining in the logic-based computing device means for implementing a processor, and controlling the processor to respond to an event in the subject system by initiating one or more actions in the subject system which are dependent on the event, as defined by the rules of the model.

According to a sixth aspect of the invention, there is provided a method of controlling a complier to use a model of a Von Neumann-like computer or a model of an operating system which manages the resources of or provides a simpler interface to, a Von Neumann-like computer to translate statically an application model comprising:

objects which represent objects in the application, each object in the application model having associated therewith data which define which of two or more states the object is in at a given time; and rules which define actions which are to be initiated in response to events, an event being the change in the state of an object, into the object or machine or assembler code of a Von Neumann-like computer or computer system or an operating system which manages the resources of, or provides a simpler interface to, a Von Neumann-like computer or computer system.

According to a seventh aspect of the invention, there is provided a method of modelling a subject system comprising:

maintaining a model of the subject system, the model including:
 objects which represent objects within the subject system, each object in the model having associated therewith data which define which of two or more states the object is in at a given time,
 rules which define actions which are to be initiated in response to events, an event being the change in the state of an object, and
 rules which define a composite action initiated in response to an event in terms of sub-actions each of which is initiated in response to events directly or indirectly resulting from the execution of the composite action.

According to an eighth aspect of the invention, there is provided a method of operating a system, the method comprising:

when an event is triggered, examining a definition of the event to determine what actions, if any, should be initiated, and initiating those actions, when an action is initiated, examining a definition of the action to determine what objects, if any, should be changed in terms of state, and changing those objects accordingly, and when the state of an object is changed, examining a definition of the object state change to determine whether the changed state should trigger any events, and triggering those events.

According to a ninth aspect of the invention, there is provided apparatus for operating a system, the apparatus comprising:

one or more activators responsive to the triggering of an event to examine a definition of the event and to determine therefrom whether any actions should be initiated, and for initiating each of the actions so determined, one or more executors responsive to the initiation of an action to examine a definition of the action and to determine therefrom whether any objects should be changed in terms of state, and for changing the state each of the appropriate objects accordingly, one or more recorders responsive to the changing of the state of an object for examining a definition of the object state change to determine therefrom whether any events should be triggered, for triggering each of the events so determined.

The eighth and ninth aspects can allow truly event-based system operation, and in some implementations can allow the avoidance of flow-jump computing altogether.

In this specification, meanings are given to certain terms as follows:

Processor: something which effects action in a subject system guided by a model.

Subject system: a collection of tangible or conceptual interacting objects which have states, the collection having separate existence within an environment as defined by an observer or modeller, and which is the subject of action effected by one or more actors.

Object in a subject system: a tangible or conceptual thing. Some of the objects in a subject system can have two or more states. An object in a subject system may be a physical, three-dimensional article. In some embodiments, an object in a subject system may be a component of a viable business system, such as a human, technological, financial or other resource.

Object in a model: a thing which represents an object in the subject system and which may have two or more different states.

Event: an instantaneous change in a discrete state of an object.

Activator: a physical or virtual actor or device which responds to events to determine from one or more models which actions to initiate.

Executor: a physical or virtual actor or device which effects actions to change one or more objects in accordance with one or models Recorder: a physical or virtual actor or device which manages objects forming part of one or more models, and recognises when changes of the discrete states of such objects trigger events according to those same models.

Elaborator: a physical or virtual actor or device which interprets the behaviour of a processor in terms which enable the direct execution of that behaviour on another, typically lower level, processor.

Embodiments of the present invention will now be described by way of example only with reference to the accompanying drawings.

BRIEF DESCRIPTION OF THE DRAWINGS

In the drawings:

FIG. 7 shows flow charts, which might form part of a prior art manufacturing process;

DETAILED DESCRIPTION OF THE PREFERRED EMBODIMENTS

Figure 10:
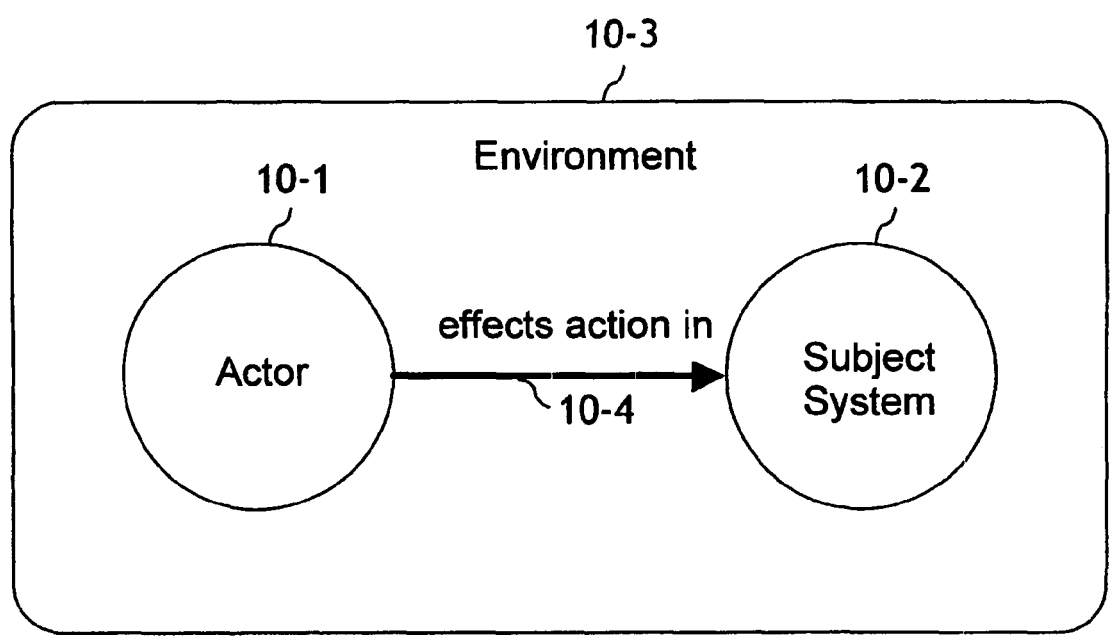
FIG. 10 illustrates an active system including an actor according to one aspect of the present invention.

Referring to FIG. 10, an active system in which the invention is embodied is illustrated. In the system, an actor 10-1 is able to effect action 10-4 in a subject system 10-2. The actor 10-1 and the subject system 10-2 exist in an environment 10-3 which can impact the subject system 10-2. Neither the actor 10-1 nor the subject system 10-2 has any control over the environment 10-3.

Figure 11A:
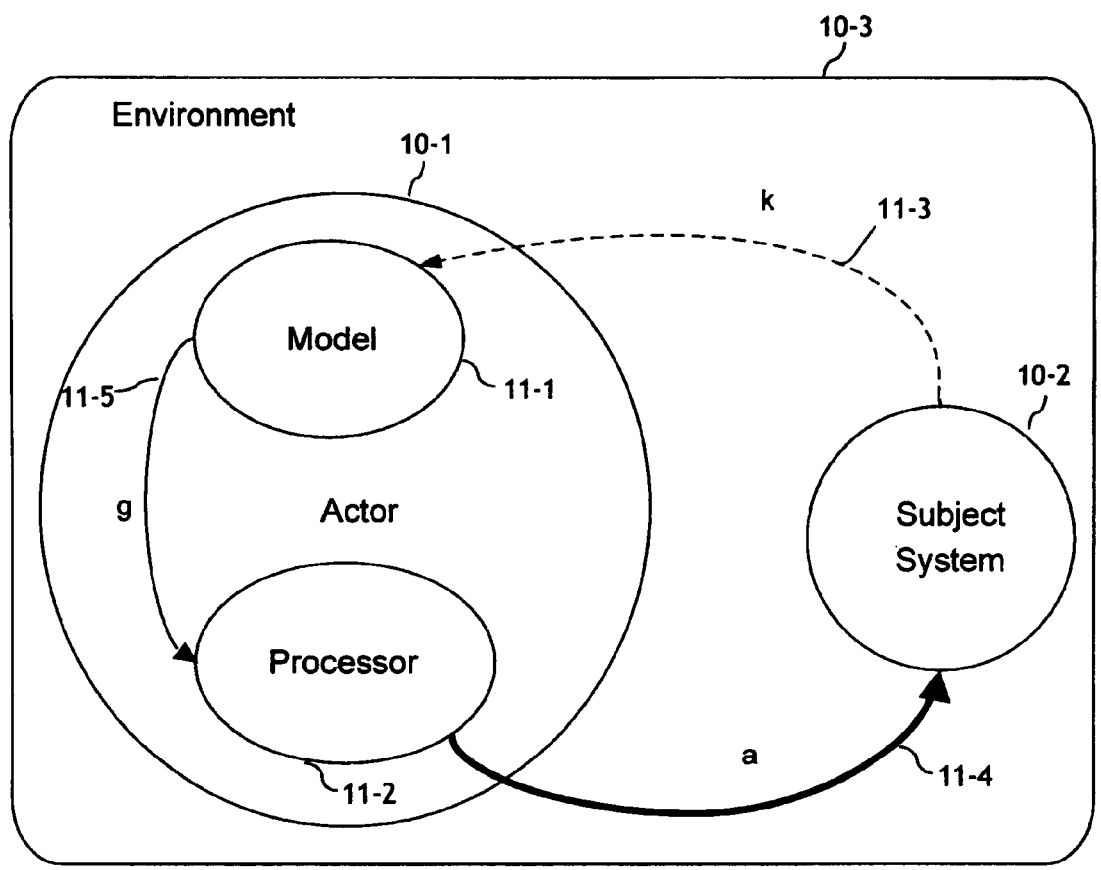
FIGS. 11A and 11B illustrate alternative representations of a model-based actor according to certain aspects of the invention.

The actor 10-1 is elaborated in FIG. 11A. Here, it can be seen that the actor 10-1 includes a model 11-1 and a processor 11-2. The processor 11-2 is guided 11-5 by the model 11-1. The processor 11-2 is arranged to effect action 11-4 in the subject system 10-2. Since the processor 11-2 forms part of the actor 10-1, the effecting 11-4 of action in the subject system 10-2 is the same as the effecting action 10-4 of FIG. 10. The subject system 10-2 is known 11-3 by the model 11-1, forming part of the actor 10-1, which completes a loop including the model 11-1, the processor 11-2 and the subject system 10-2. This allows the actor 10-1 to be guided in its action 11-4 on the subject system 10-2 by the model 11-1 of the subject system 10-2. Consequently, the actor 10-1 can be described as a "model-based actor".

Events can occur in the subject system 10-2 either through the actions of the actor 10-1, as guided by the model 11-1, or through actions of other actors (not shown) which also act on the subject system 10-2, or through a change in state of the subject system itself (e.g. the progression of a chemical reaction) or its environment 10-3 (e.g. the passage of time). The actor 10-1 keeps the model 11-1 updated with its own actions. When the processor 11-2 is processing according to the model 11-1, it updates the model 11-1 with intermediate actions and with the actions it effects in the subject system 10-2. The actor 10-1 is capable of sensing events i.e. changes in the states of objects, in the subject system 10-2 which are caused by the actions of other actors, or by changes in the state of the subject system itself or its environment 10-3.

Figure 11B:
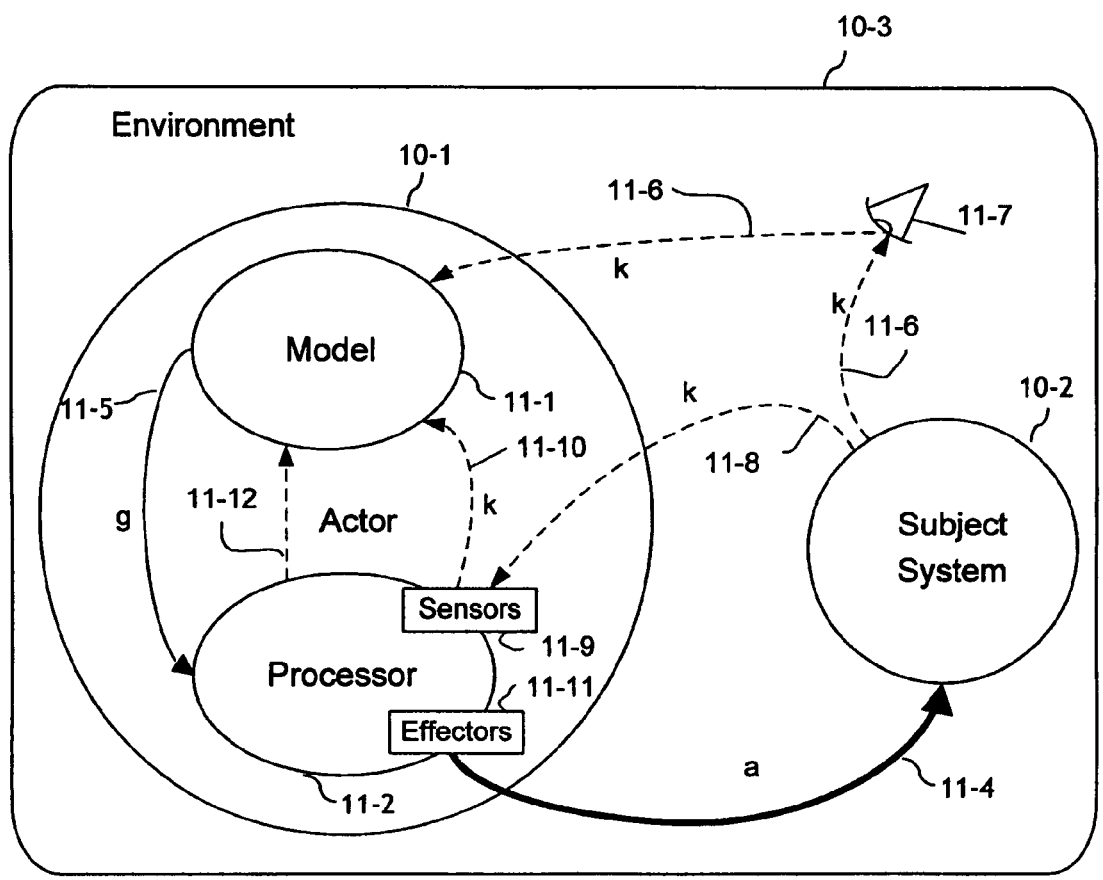

As shown in FIG. 11B, the subject system 10-2 "is known to" the model 11-1 in three ways, via three different routes. A first route 11-6 is via a modeller 11-7, who identifies the subject system 10-2 and builds the model 11-1 of it in terms of the objects, events, actions, and so on which he or she considers significant. This is the mechanism by which the rules which will guide the processor 11-2 in its actions are established in the model 11-1. The modeller 11-7 is shown in FIG. 11B as being in the environment 10-3 of the system and separate to the actor 10-1. However, in some aspects of the invention, the modeller 11-7 is part of the actor 10-1. For instance, any in actor 10-1 which includes a meta-processor, either separately or as part of a processor or root meta-processor, the role of the modeller 11-7 is undertaken by the meta-processor according to rules contained within the meta-model which guides it. This will be understood following the below description relating to the actor of FIG. 15, for instance. A second route 11-8 is via the processor which uses sensors 11-9 to detect events or changes in state of objects in the subject system 10-2. The processor 11-2 updates via route 11-10 the model with the current state of the subject system 10-2 and with events it has recognized in the subject system. A third route 11-12 is the update of the model 11-1 by the processor 11-2 directly, in particular to update the model 11-1 with outcomes of actions, including intermediate actions, which the processor 11-2 will effect in the subject system 10-2 via its effectors 11-11. The routes 11-8, 11-10 and 11-12 together are equivalent to the route 11-3 of FIG. 11A.

Figure 12:
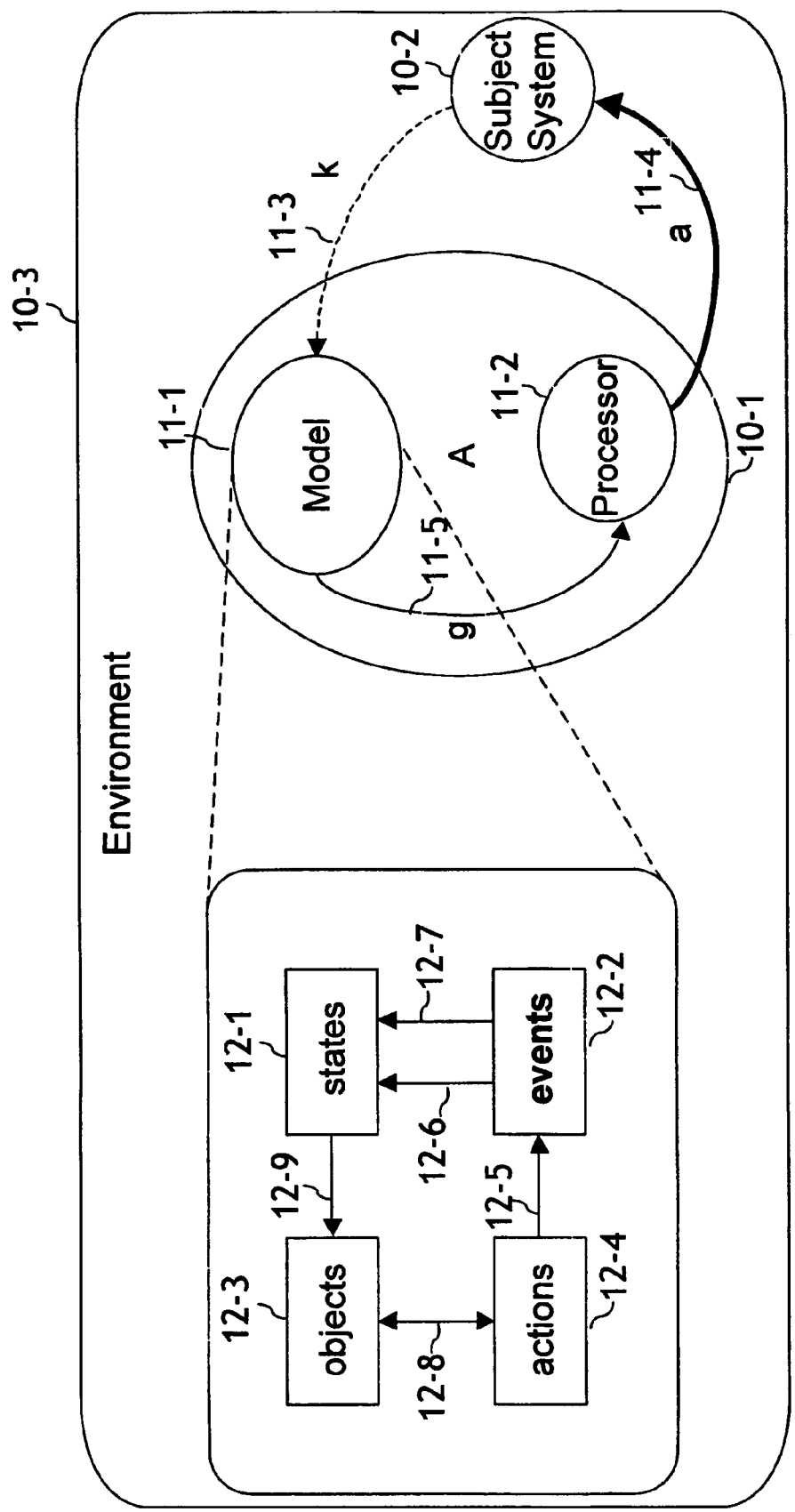
FIG. 12 elaborates on a model forming part of the FIG. 11 actor.

The model 11-1 is elaborated in FIG. 12. The model 11-1 "knows" the subject system 10-2 in the sense that it contains objects 12-3 which represent the significant objects within the subject system 10-2, and has rules which define which changes in the state 12-1 of each object 12-3 should trigger events 12-2 which in turn should cause actions 12-4 to be initiated by the processor 11-2. In FIG. 12, an event 12-2, which reflects a change in the state 12-1 of or the creation or deletion of an object 12-3, initiates an action 12-4. Each action 12-4 can effect change in one or more objects 12-3. No action 12-4 can be initiated without an event 12-2. The model 11-1 can therefore be described as an event-driven model. In this Figure, arrows represent references from each object (state, event or action) to other objects (states, events or actions). So, for instance, an arrow 12-5 between action 12-4 and event 12-2 shows that an action 12-4 is initiated by one and only one event 12-2. On the other hand, one event 12-2 could initiate more than one action 12-4. A double-headed arrow 12-8 between action 12-4 and object 12-3 indicates that each action 12-4 can effect a change in more than one object 12-3, and that each object 12-3 can be changed by more than one action 12-4. An arrow 12-9 shows that a state 12-1 is relevant to only one object 12-3. An event 12-2 is an instantaneous change in the state 12-1 of an object 12-3, from one state, shown by the arrow 12-6, to another state, shown by the arrow 12-7. A creation or deletion of an object 12-3 is considered as a change in state between existing and non-existing.

The outcomes of actions may include the creation, modification or deletion of objects within the model. Each of these outcomes can be considered to be a change in the state of an object. Instead of objects being created or destroyed, they may be activated or deactivated respectively, which could result in easier object handling.

Figure 13:
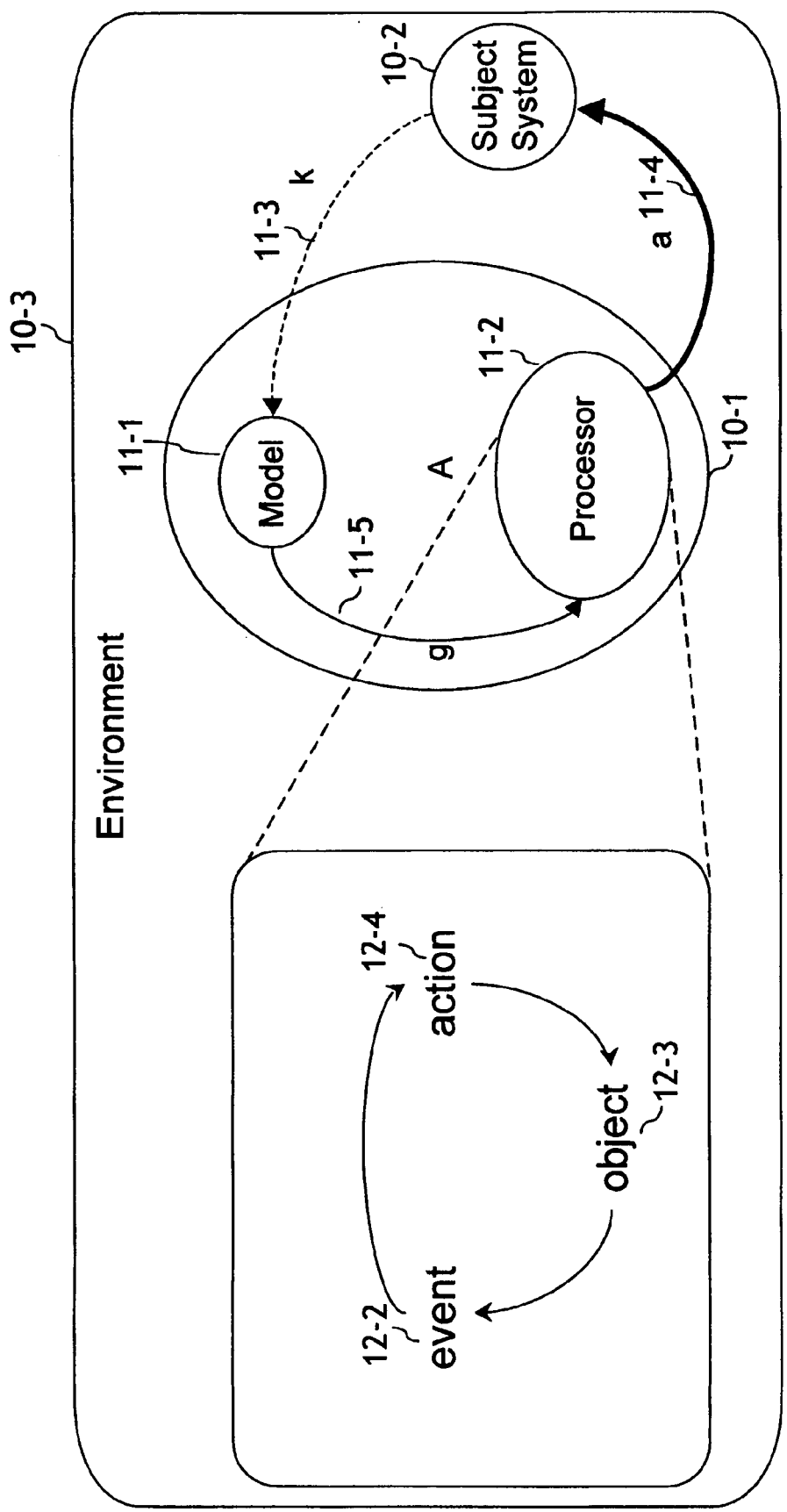
FIG. 13 elaborates on a processor forming part of the FIG. 11 actor.

The processor 11-2 is elaborated in FIG. 13. Here, an event 12-2 is responded to by initiating one or more actions 12-4 which are dependent on it. The actions 12-4 which are dependent on an event 12-2 are defined by the model 11-1. Each action 12-4 can change one or more objects 12-3. The changing of an object 12-3 can trigger one or more further events 12-2. This can be termed an event execution cycle. The event execution cycle continues until no new events 12-2 are generated by actions 12-4 or by changes to objects 12-3 (e.g. from events in the environment 10-3) and all events 12-2 have been processed to completion.

Figure 14A:
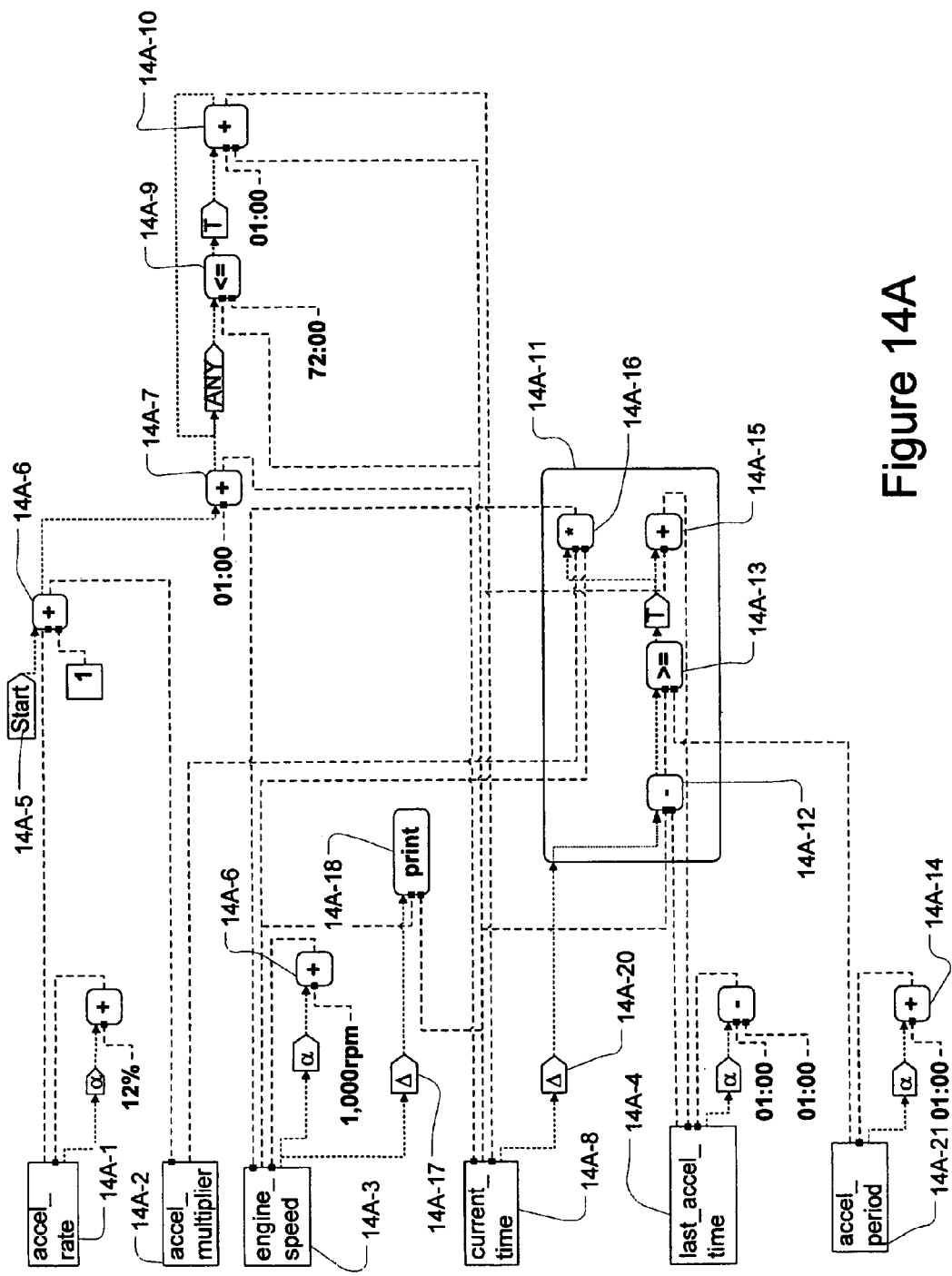
FIG. 14A illustrates a simple event-driven control model according to certain aspects of the invention.
Figure 22A:
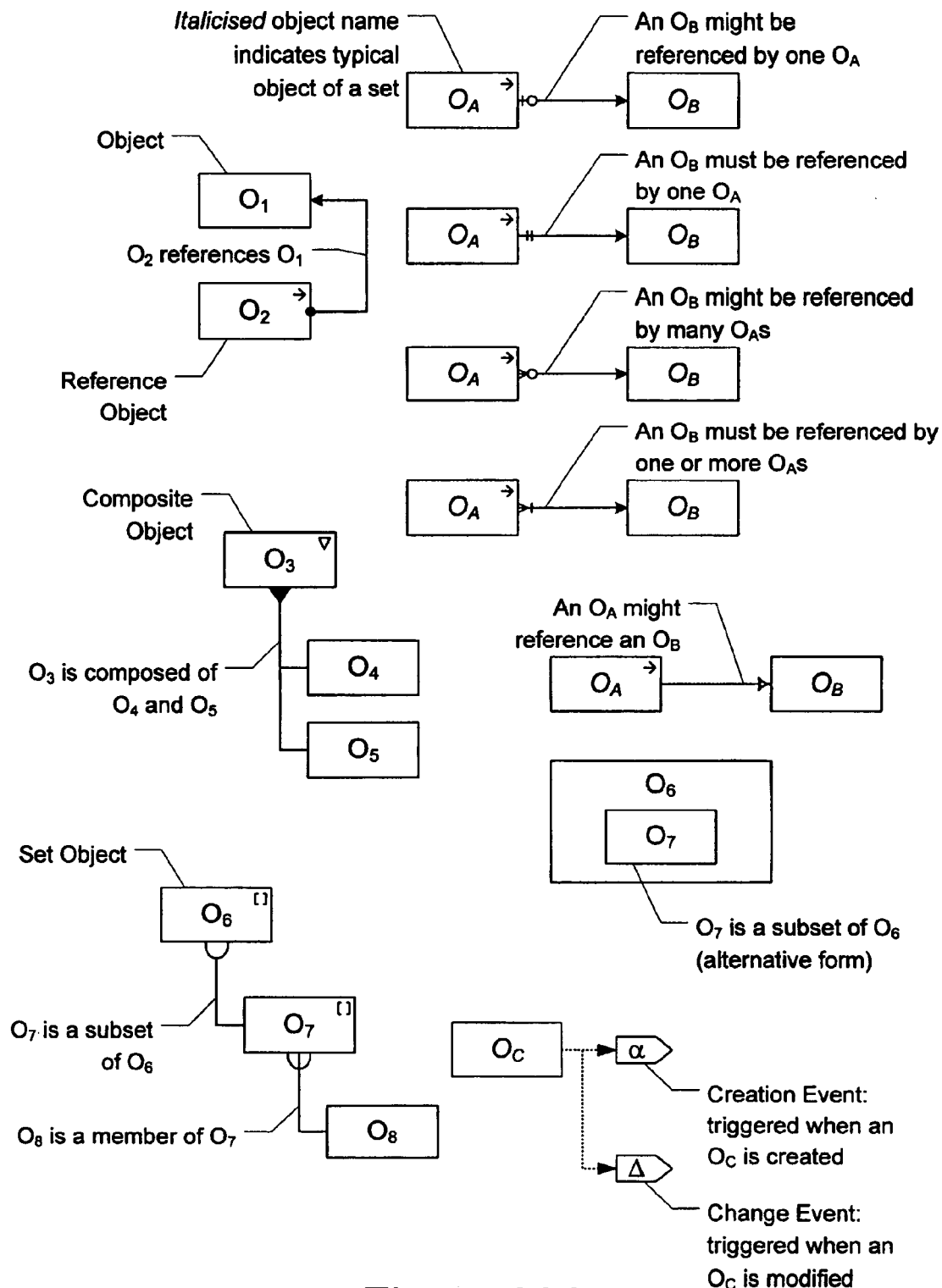
FIGS. 22A and 22B are keys to some of the other Figures.

An event-driven control model, such as might be used in the automated control of an engine dynamometer, for example, illustrating an application of the system of FIGS. 11 to 13 is shown in FIG. 14A. FIG. 22A is a key to FIG. 14A. In the model of FIG. 14A, execution begins with the creation of the six objects which are shown on the left-hand side of the drawing. In the below, 'accel' is used as a short form for 'acceleration'. The creation of each of the objects labelled accel_rate 14A-1, accel_period 14A-12, engine_speed 14A-3 and last_accel_time 14A-4 triggers an event which in turn initiates an action, in this case to set an initial value for each of these objects. Nothing further happens until a Start event 14A-5 of the model initiates certain other remaining activities. A first action 14A-6 calculates a value for accel_multiplier 14A-2. The completion of the action 14A-6 initiates a further action 14A-7 which is to assign a time of 01:00 to a current_time object 14A-8. The assignment of a value to the current_time object 14A-8 triggers a change event 14A-20, as described below. The completion of this time assigning action 14A-7 is also one of two possible events which can then initiate an action 14A-9 which compares the value given by the current_time object 14A-8 with the final time of the model, which in this example is set as 72:00 (i.e. 72 hours), applied as an input of the action 14A-9. If the action 14A-9 completes in a state of "True", the model continues by incrementing the current_time 14A-8 by one hour at action 14A-10. The completion of the incrementing action 14A-10 is the second of the events which may initiate the comparison by the action 14A-9 of the value of the current_time object 14A-8 with the value of the final time.

Examination of the model of FIG. 14A reveals that the primary processing cycle does not proceed by a conventional "flow" of control, but instead proceeds through events which recognise the change of state of an object or action as the initiator of one or more further actions. Actions and events are specialised types of objects. For example, whenever the value of the current_time object 14A-8 is changed, by action 14A-7 or action 14A-10, an event 14A-20 initiates a compound action 14A-11, which in turn finds the difference between the value of the current_time object 14A-8 and the value of the last_accel_time object 14A-4 at action 14A-12, and compares the resultant value with the value of the accel_period object 14A-21 at action 14A-13. The value of an accel_period object 14A-21 here is initially set at 06:00 (i.e. 6 hours) by action 14A-14. If the result of the action 14A-13 is greater than the value of the accel_period object 14A-21, two parallel actions 14A-15, 14A-16 are initiated. The first 14A-15 of these actions sets the value of the last_accel_time object 14A-4 to the value of the current_time object 14A-8, and the second 14A-16 of these actions calculates a new engine_speed using the value of the accel_multiplier object 14A-2 which was calculated at the beginning of the model. Similarly, whenever the value of engine_speed 14A-3 is changed, event 14A-17 is triggered which, in turn initiates action 14A-18, which prints the values of the current_time and engine_speed objects 14A-8, 14A-3; such values would also be available to any automated control system to which the model might be connected. Certain other actions are illustrated in FIG. 14A, the purpose and effect of which will be obvious to a skilled person. In this example, events are sometimes caused by the completion of actions, but may also be caused by the changing of objects.

Figure 14B:
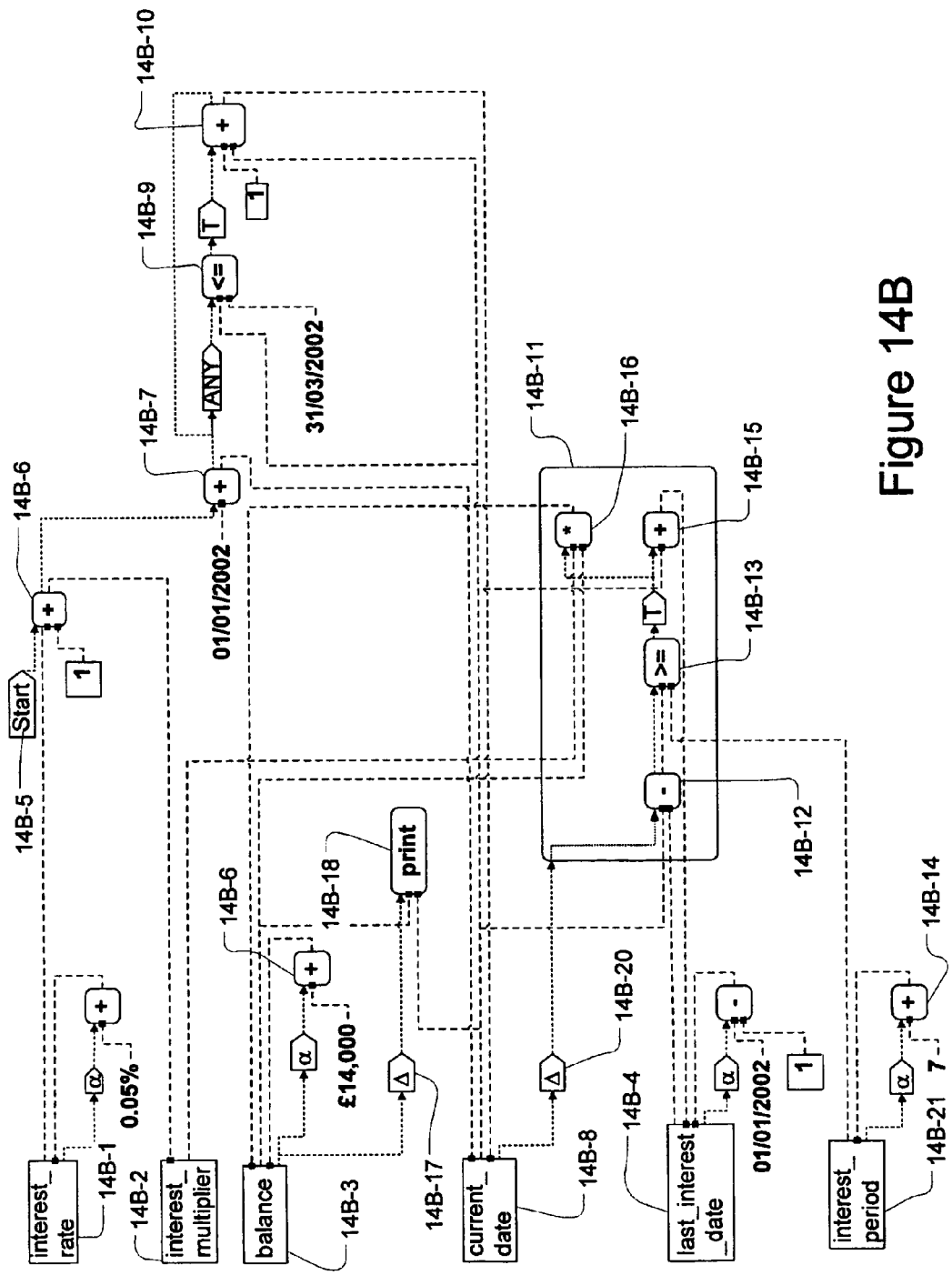
FIG. 14B illustrates a simple event-driven financial model according to certain aspects of the invention.

An event-driven financial model illustrating an application of the system of FIGS. 11 to 13 is shown in FIG. 14B. FIG. 22A is a key to FIG. 14B. In the model of FIG. 14B, execution begins with the creation of the six objects which are shown on the left-hand side of the drawing. The creation of each of the objects labelled interest_rate 14B-1, interest_period 14B-12, balance 14B-3 and last_interest_date 14B-4 triggers an event which in turn initiates an action, in this case to set an initial value for each of these objects. Nothing further happens until a Start event 14B-5 of the model initiates certain other remaining activities. A first action 14B-6 calculates a value for interest_multiplier 14B-2. The completion of the action 14B-6 initiates a further action 14B-7 which is to assign a date of 1 Jan. 2002 to a current_date object 14B-8. The assignment of a value to the current_date object 14B-8 triggers a change event 14B-20, as described below. The completion of this date assigning action 14B-7 is also one of two possible events which can then initiate an action 14B-9 which compares the value given by the current_date object 14B-8 with the final date of the model, which in this example is set as 31 Mar. 2002, applied as an input of the action 14B-9. If the action 14B-9 completes in a state of "True", the model continues by incrementing the current_date 14B-8 by one day at action 14B-10. The completion of the incrementing action 14B-10 is the second of the events which may initiate the comparison by the action 14B-9 of the value of the current_date object 14B-8 with the value of the final date.

Examination of the model of FIG. 14B reveals that the primary processing cycle does not proceed by a conventional "flow" of control, but instead proceeds through events which recognise the change of state of an object or action as the initiator of one or more further actions. Actions and events are specialised types of objects. For example, whenever the value of the current_date object 14B-8 is changed, by action 14B-7 or action 14B-10, an event 14B-20 initiates a compound action 14B-11, which in turn finds the difference between the value of the current_date object 14B-8 and the value of the last_interest_date object 14B-4 at action 14B-12, and compares the resultant value with the value of the interest_period object 14B-21 at action 14B-13. The value of an interest_period object 14B-21 here is initially set at 7 by action 14B-14. If the result of the action 14B-13 is greater than the value of the interest_period object 14B-21, two parallel actions 14B-15, 14B-16 are initiated. The first 14B-15 of these actions sets the value of the last_interest_date object 14B-4 to the value of the current_date object 14B-8, and the second 14B-16 of these actions calculates a new balance using the value of the interest_multiplier object 14B-2 which was calculated at the beginning of the model. Similarly, whenever the value of balance 14B-3 is changed, event 14B-17 is triggered which, in turn initiates action 14B-18, which prints the values of the current_date and balance objects 14B-8, 14B-3. Certain other actions are illustrated in FIG. 14B, the purpose and effect of which will be obvious to a skilled person. In this example, events are sometimes caused by the completion of actions, but may also be caused by the changing of objects.

Figure 15:
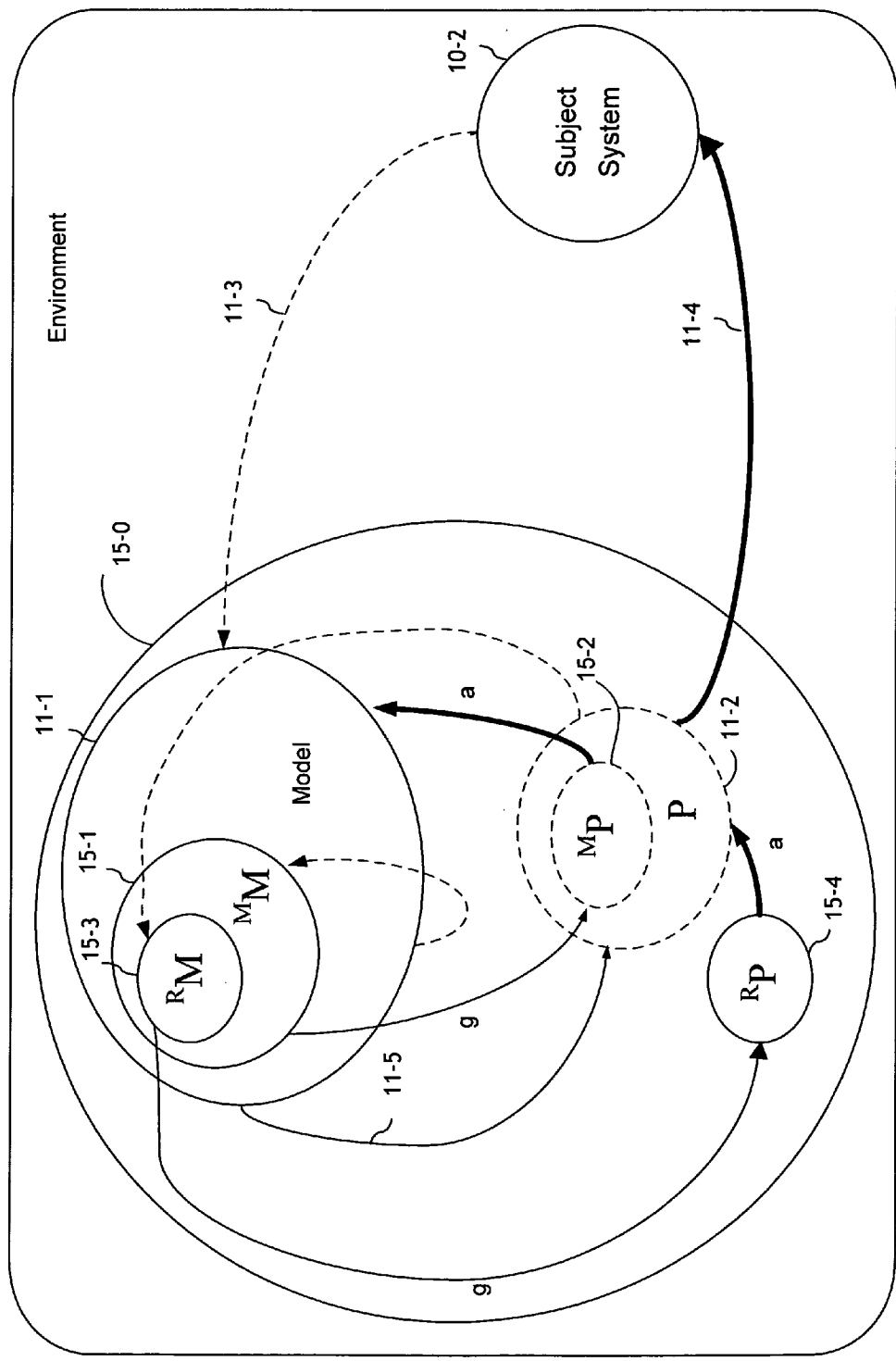
FIG. 15 illustrates a root meta-actor according to certain aspects of the invention.

FIG. 15 illustrates a root meta-actor 15-0 acting on a subject system 10-2 within an environment 10-3. The root meta-actor 15-0 is an extension of the actor 10-1 shown in FIGS. 11 to 13. As with the system shown in FIGS. 11 to 13, the model 11-1 guides 11-5 the processor 11-2. The model 11-1 itself is known by a meta-model ($^M$M) 15-1, which may be included in and form part of the model 11-1. Accordingly, the model 11-1 can be considered as including a model (the meta-model 15-1) of itself. The meta-model 15-1 is a model of a model (the model 11-1); i.e., it is a model whose subject system is another model (the model 11-1). The meta-model 15-1 guides a meta-processor ($^M$P) 15-2, which may be included in and form part of the processor 11-2. The meta-processor 15-2 effects action in the model 11-1. The meta-processor 15-2 may alternatively be external to the processor 11-2.

The meta-model 15-1 shapes the structure of the model 11-1 by defining the types of objects it can contain and the way in which these types of objects can be related. The meta-model 15-1 also shapes behaviour within the model 11-1 by defining the valid combinations of events and actions which can be employed in effecting action within the model 11-1. Control of the model 11-1 by the meta-model 15-1 is exerted via the meta-processor 15-2, through which all action in the model 11-1 is effected. Consequently, the meta-processor 15-2 may also be termed a "model adapter".

If the meta-model 15-1 and the meta-processor 15-2 lie outside the model 11-1 and the processor 11-2 respectively, no action or change can be effected within the meta-model 15-1 itself. However, if the meta-model 15-1 is part of the model 11-1 and the meta-processor 15-2 is one component or function of the processor 11-2, as is shown, the meta-model 15-1 can be adapted by the processor 11-2. In other words, the model 11-1 reflectively contains a model (the meta-model 15-1) of itself and, consequently, the structure of the model 11-1 and the behaviour of the processor 11-2 (as guided by the model 11-1) can be changed while the root meta-actor 15-0 is operating. This contrasts notably with the Meta-Object Framework and Metaobject Protocol approaches described in the prior art above.

The concept of the pairing of meta-model 15-1 and meta-processor 15-2 can be seen to follow a pattern similar to the pairing of the model 11-1 and the processor 11-2 of the actor shown in FIGS. 11 to 13.

The subject system of a meta-actor 15-2, 15-1 is a system of one or more models 11-1. The meta-processor 15-2 also acts as the modeller for the actor 11-1, 11-2 in modelling the primary subject system 10-2. The meta-modeller for the meta-actor 15-2, 15-1 is external to the meta-actor 15-2, 15-1 (and the actor 11-1, 11-2) if the meta-model 15-1 is not part of the model 11-1. However, if the meta-model 15-1 is part of the model 11-1, the meta-processor 15-2 takes on the role of meta-modeller as well as modeller.

The processor 11-2 is known by a root meta-model ($^R$M) 15-3, which may form part of the meta-model 15-1, in the sense that the root meta-model 15-3 is a generalised model for model execution shared by processors 11-2 of the same class. The root meta-model 15-3 can also be considered as a generalised model of the meta-model 15-1, and, hence, also of the model 11-1; all objects in the meta-model 15-1 and model 11-1 are instances or specialisations of objects in the root meta-model 15-3. The root meta-processor 15-4 effects action in the processor 11-2 and, if it is included in the processor 11-2, the meta-processor 15-2, in accordance with and under the guidance of the root meta-model 15-3.

The processor 11-2 is responsive to an event to initiate in the subject system 10-2 the actions which are given by the model 11-1. Similarly, the meta-processor 15-2 is responsive to an event to initiate in the model 11-1 the actions which are given by the meta-model 15-1. The root meta-processor 15-4 is responsive to an event to initiate in the processor 11-2 the actions which are given by the root meta-model 15-3. Therefore, the root meta-processor 15-4 can take on the function of any processor (or meta-processor), which in turn can be guided by any model (or meta-model) from the class which the generalised root meta-model 15-3 represents. Consequently, neither the processor 11-2 nor the meta-processor 15-2 needs to exist physically as an independent processor, since their functions can be considered as being carried out by the root meta-processor 15-4. The processor 11-2 and the processor 15-2 therefore are virtual.

The root meta-model 15-3 is a generalised version of all meta-models 15-1 of a particular class. For instance, it could be a generalised version of the event-driven model described below with reference to FIG. 16. As such, the root meta-model 15-3 defines the valid structures and behaviours which can be embodied in any meta-model 15-1, and hence any model 11-1. The events which initiate action in the root meta-processor 15-4 on behalf of the processor 11-2 are generated in the subject system 10-2, or in the environment 10-3. The events which initiate action in the root meta-processor 15-4 on behalf of the meta-processor 15-2 are generated in the model 11-1 (which is the subject system of the meta-model 15-1), or in the environment 10-3.

An event may not give rise to any actions, or it may give rise to one, two or more actions. Also, each initiated action will typically give rise to one or more object state changes, each of which may in turn give rise to one or more further events. Each of these events then is processed by the appropriate one of the processor 11-2, the meta-processor 15-2 and the root meta-processor 15-4, and the process continues until no further events are generated.

If the root meta-model 15-3 lies outside the meta-model 15-1 and the model 11-1, the root meta-model itself cannot be adapted, in effect "hard wiring" the structure and behaviour of the root meta-processor 15-4. If, however, the root meta-model 15-3 is defined as part of the meta-model 15-1 within a model 11-1, as is shown, the root meta-processor 15-4 can adapt the root meta-model 15-3 through the meta-processor 15-2 (whose functions the meta-processor 15-2 has taken on), thereby freeing its structure and behaviour to adapt.

The concept of the pairing of the root meta-model 15-3 and the root meta-processor 15-4 to form a root meta-actor can be seen to follow a pattern similar to the pairing of the model 11-1 and the processor 11-2 of the actor shown in FIGS. 11 to 13.

The subject system of a root meta-actor 15-3, 15-4 is a generic model execution system.

Figure 16:
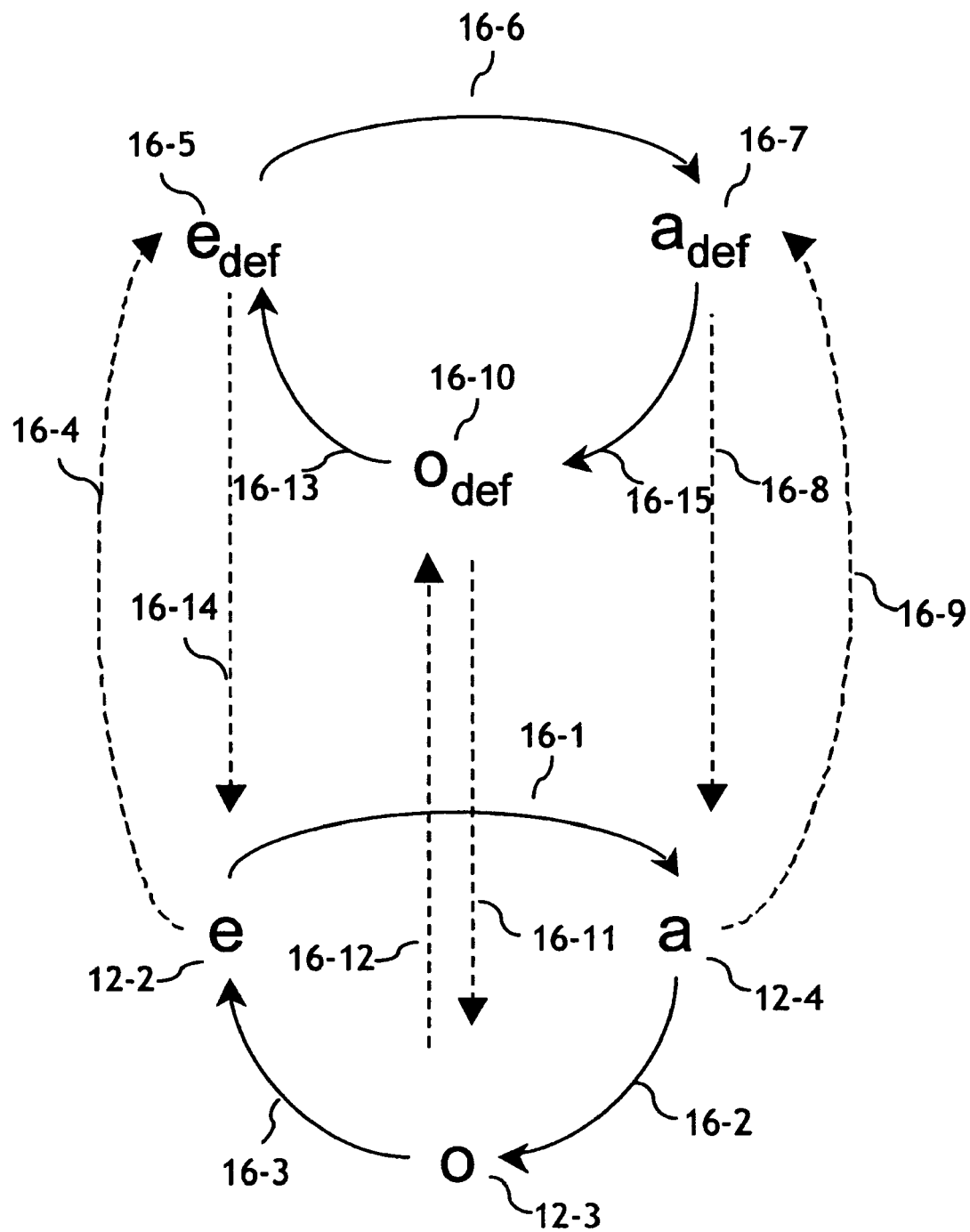
FIG. 16 illustrates a root meta-execution cycle, which is according to certain aspects of the invention and which may be implemented using the root meta-actor of FIG. 15.

Reference is now made to FIG. 16, which shows a root meta-execution cycle. On one level, the cycle includes an action 12-4 which is driven 16-1 by an event 12-2. Actions 12-4 can result in changes 16-2 in objects 12-3, which in turn can result 16-3 in events 12-2. This level of the cycle is illustrated in FIG. 13, as mentioned above.

The root meta-execution cycle of FIG. 16 is as follows. When an event 12-2 is triggered, the root meta-processor 15-4 examines 16-4 its definition 16-5 of the event to determine 16-6 which action definitions 16-7 are associated with, and which actions should therefore be initiated 16-1 by, the event 12-2. These actions 12-4 are then initiated 16-8. When an action 12-4 is initiated, the root meta-processor 15-4 uses 16-9 the definition of the action 16-7 to determine 16-15 which objects' definitions 16-10 are affected, and then initiates 16-11 changes 16-2 in the associated objects 12-3 as prescribed. When an object 12-3 is changed, the root meta-processor 15-4 examines 16-12 the definition of the object 16-10 to find out whether the change in the object should trigger 16-13 any further event definitions 16-5. If a positive determination is made 16-14, the further events 12-2 are triggered 16-3, thereby initiating a further root meta-execution cycle for the newly triggered event. In the foregoing, the changing of an object 12-3 is constituted by a change in the state of the object 12-3, and the determination of what events are to be triggered by the changing of a state of the object includes examining a definition 16-10 of the object's change of state. Actions may also or instead result in the creation or deletion of objects 12-3, which are special types of changes in the state. Whether or not objects 12-3 are to be created or deleted is determined by the action definition 16-7.

FIG. 16 represents a "fine-grained" event-driven execution cycle, as opposed to the "coarse-grained" event-driven processing of OO GUIs and DBMS triggers described in the prior art above. Every single action, down to the Elementary Actions which are equivalent to instructions in conventional software (as described with reference to FIG. 17 below), is initiated in response to an event recognised as a change in state of an object, including any object which represents another action. This makes this aspect of the invention considerably more amenable to parallel computing architectures, particularly those described below with reference to FIGS. 29 and 30.

When building a processor or system based on this execution cycle, further rules may be required to handle practical implementation considerations. For instance, referring again to FIG. 14, some events, such as the ANY event which initiates action 14-9 are themselves associated with the completion of other actions, in this case the completion of actions 14-7 or 14-10. However, both actions 14-7 and 14-10 trigger an object change event at 14-20 by modifying the current-_date object 14-8. Therefore, the system cannot regard either of the actions 14-7 or 14-10 as completed until the composite action 14-11 initiated by event 14-20 is also complete. This requires the executing system or processor to include a rule that an action is considered complete only when all of its consequences are also complete.

Figure 17A:
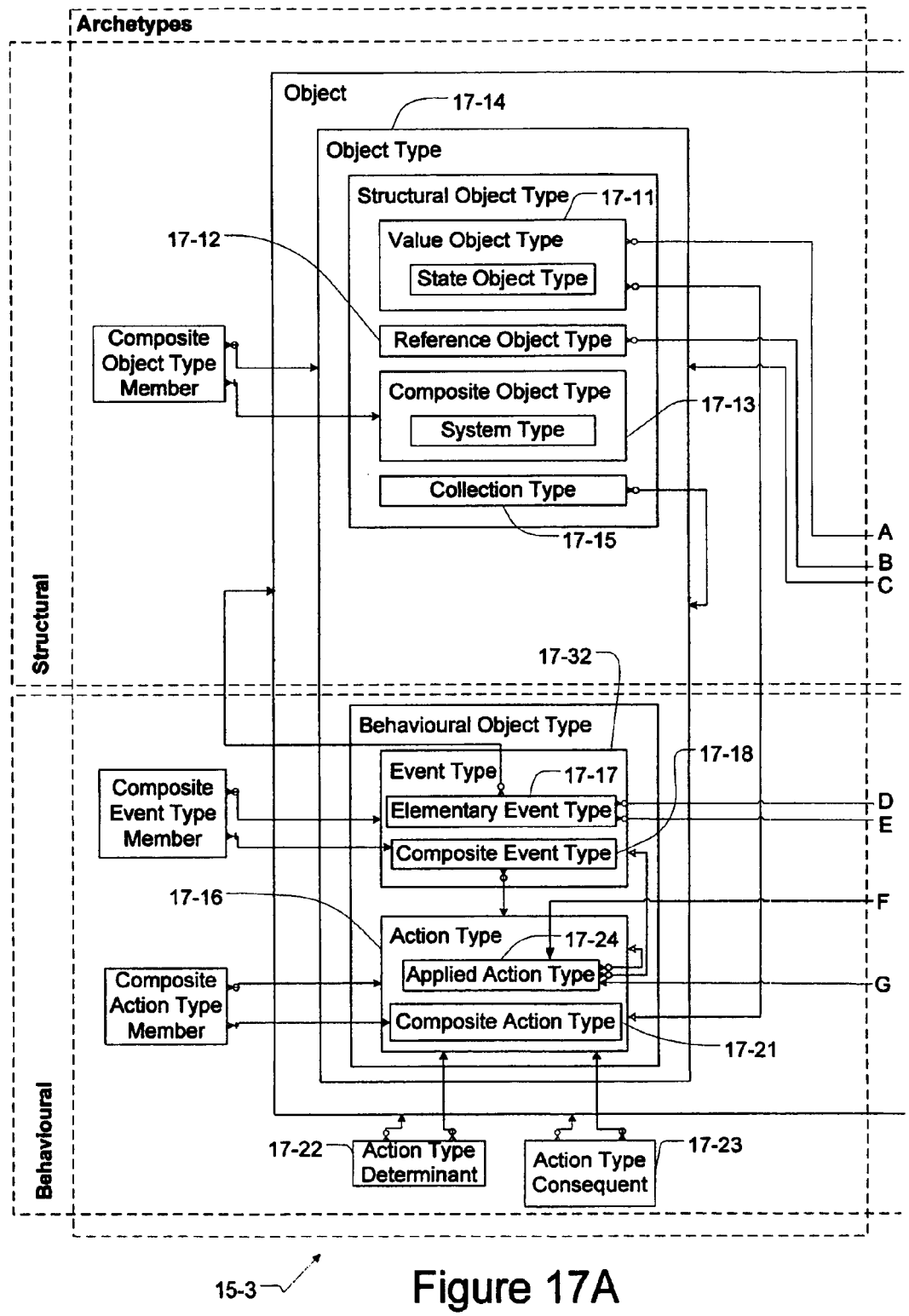
FIGS. 17A and 17B illustrate one possible structural root meta-model used in the root meta-actor of FIG. 15.
Figure 17B:
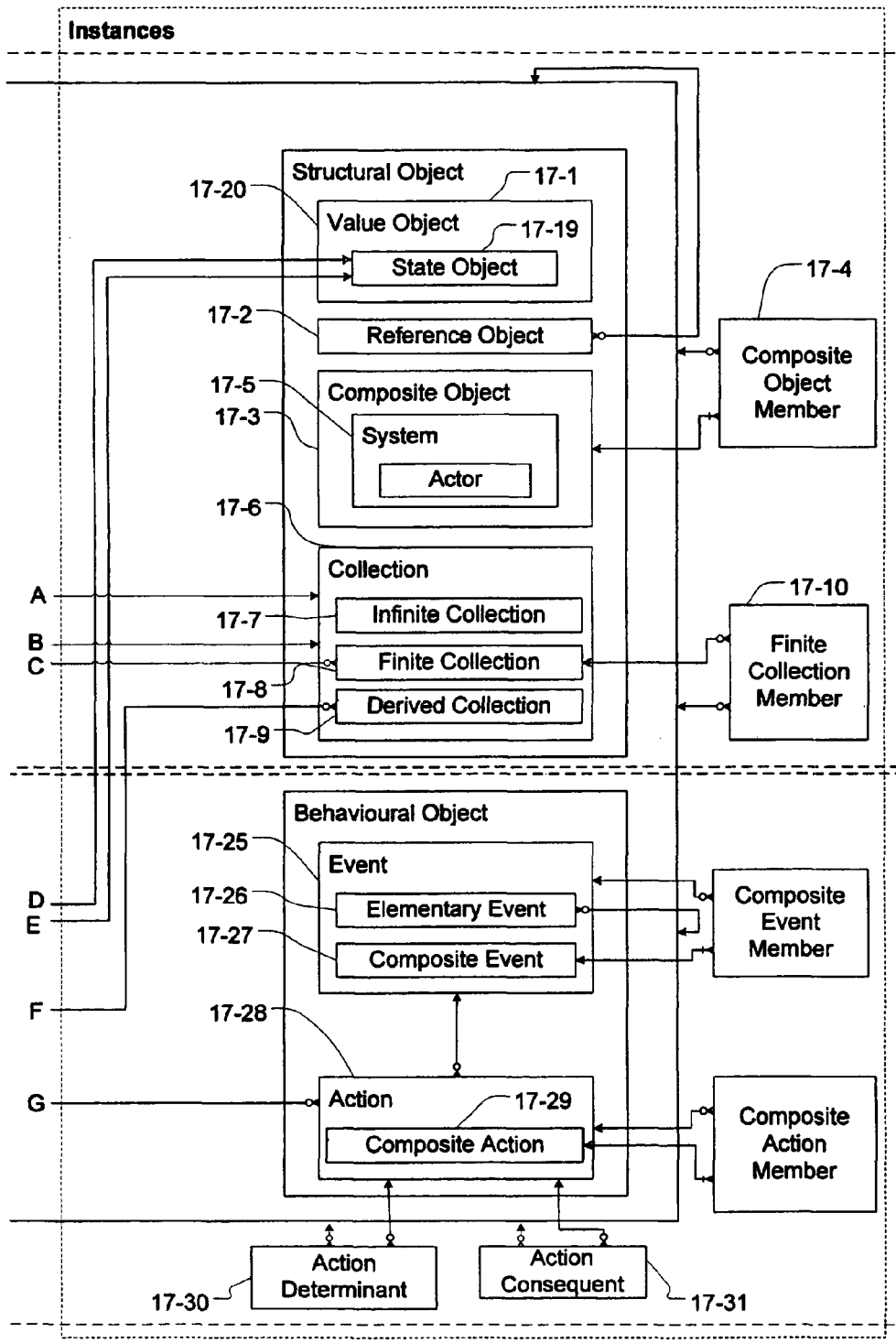
Figure 18A:
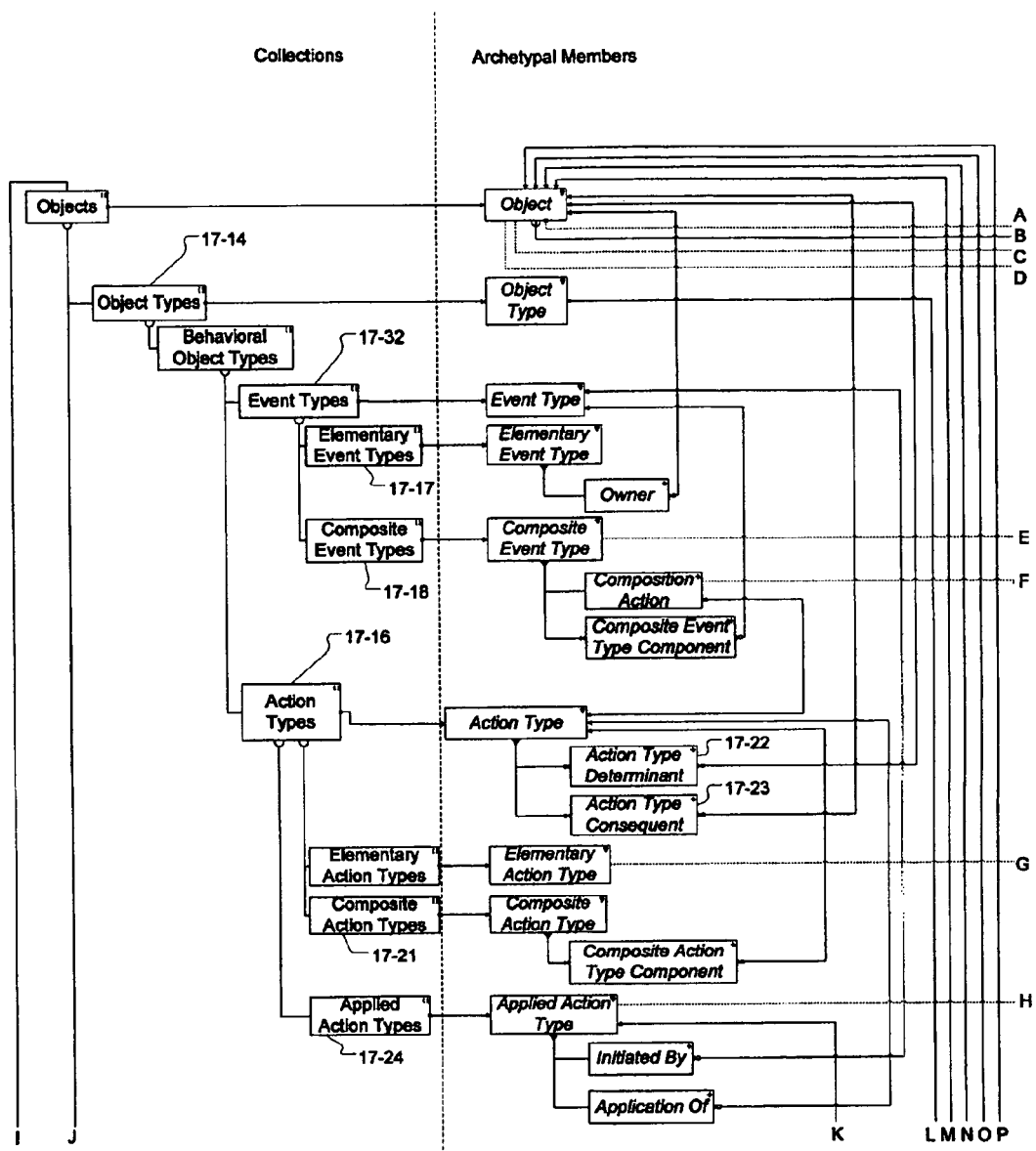
FIGS. 18A to 18D illustrate the behavioural components of the root meta-model of FIGS. 17A and 17B.
Figure 18B:
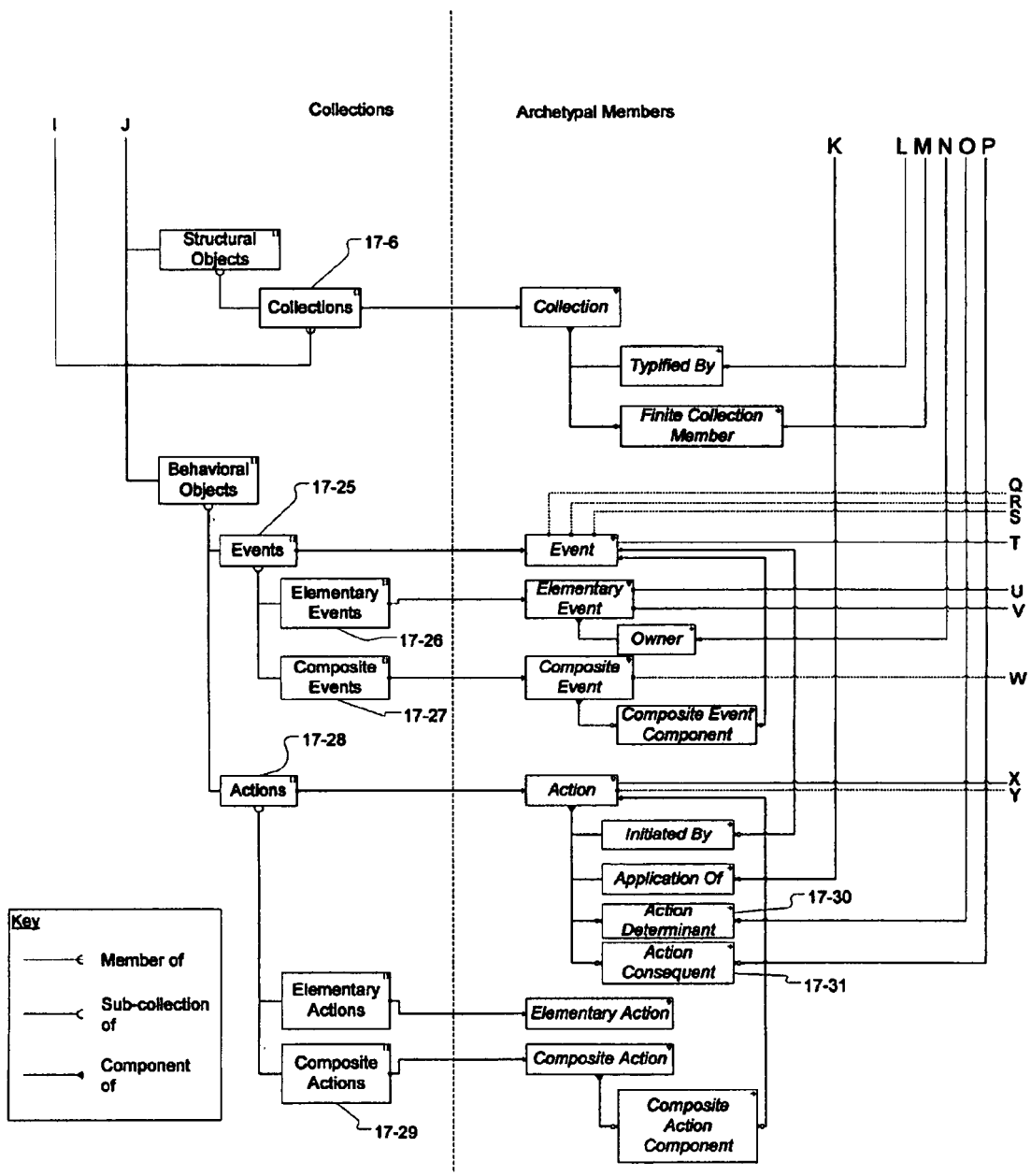
Figure 18C:
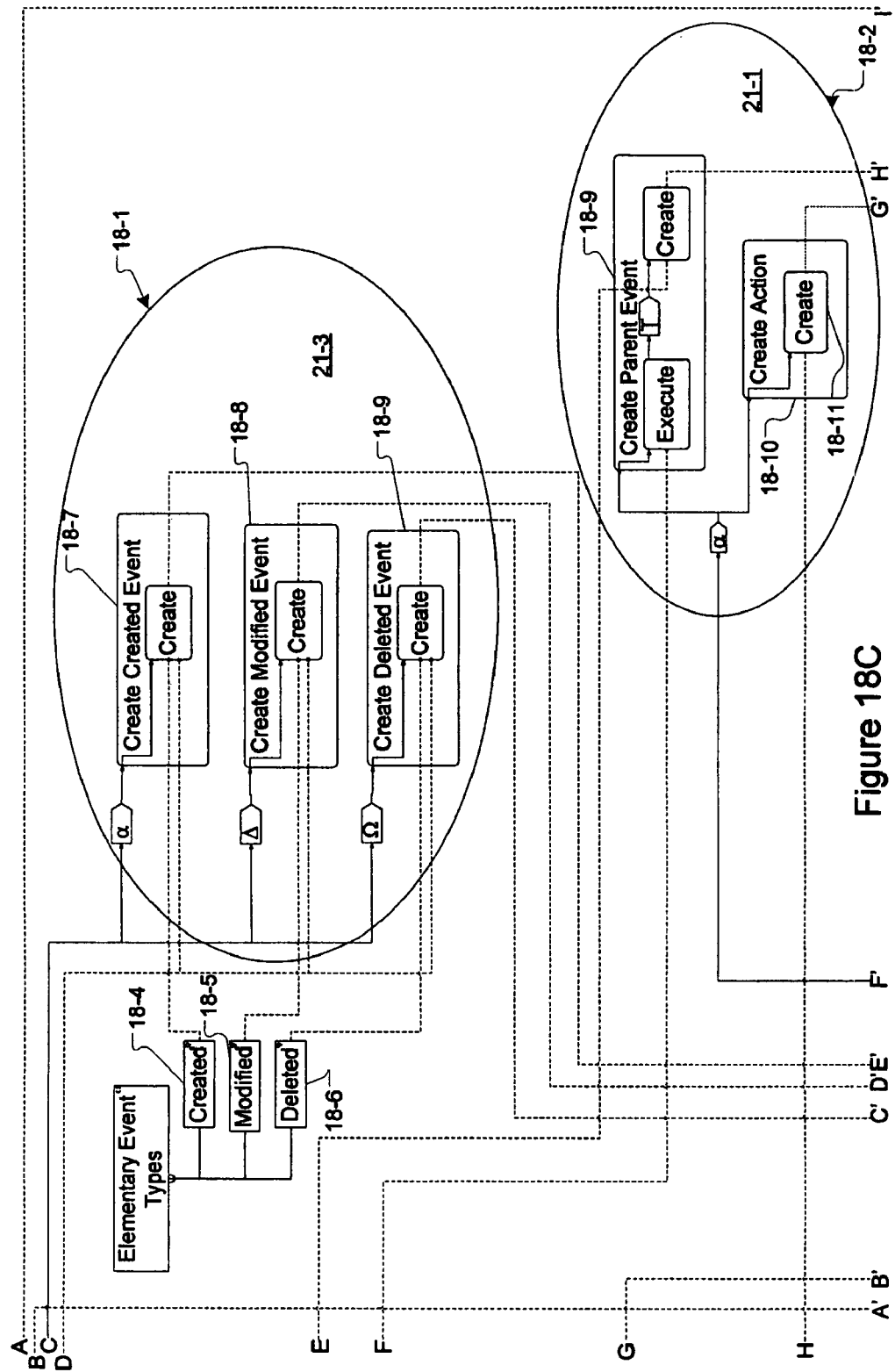
Figure 18D:
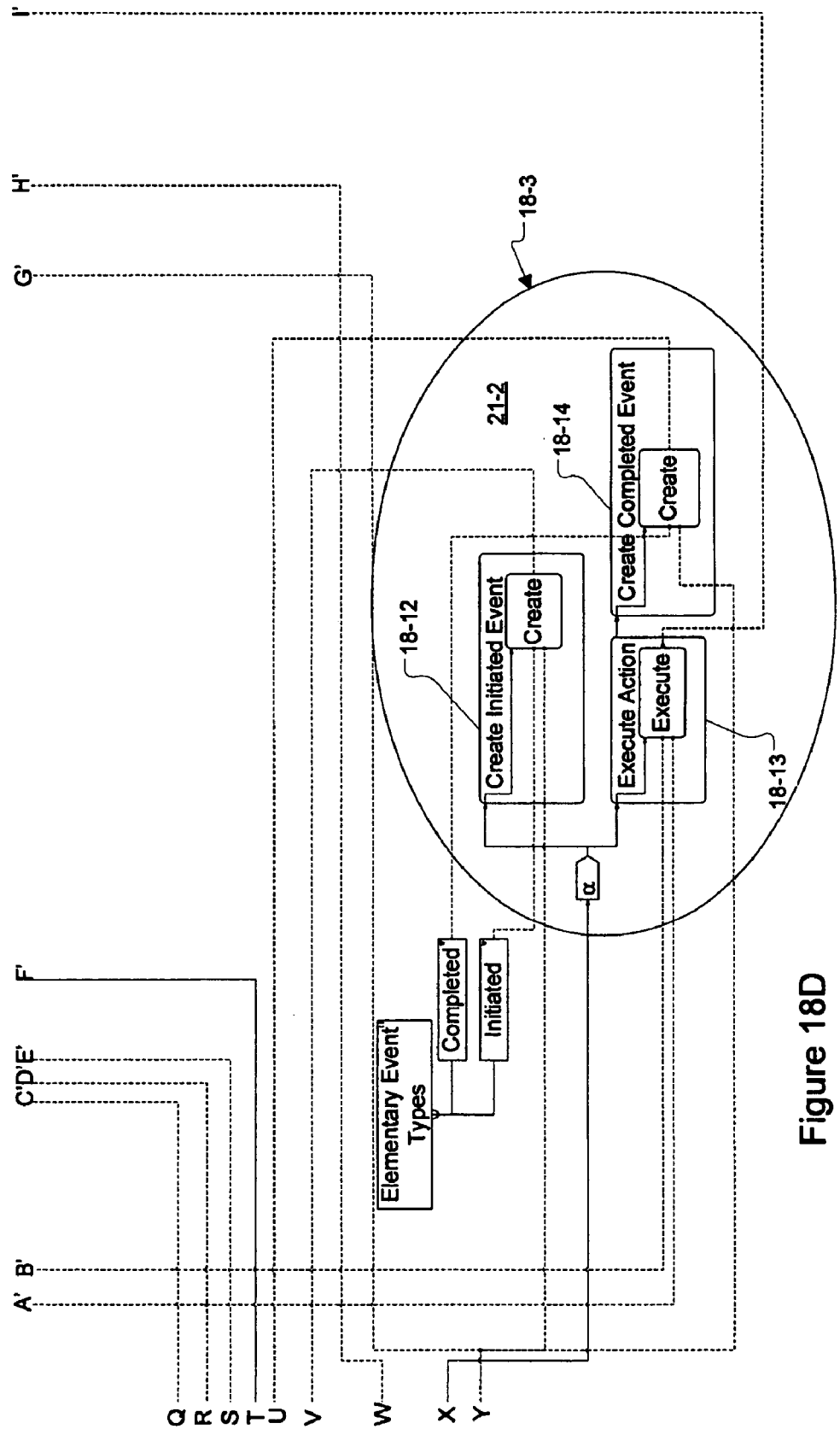
Figure 22B:
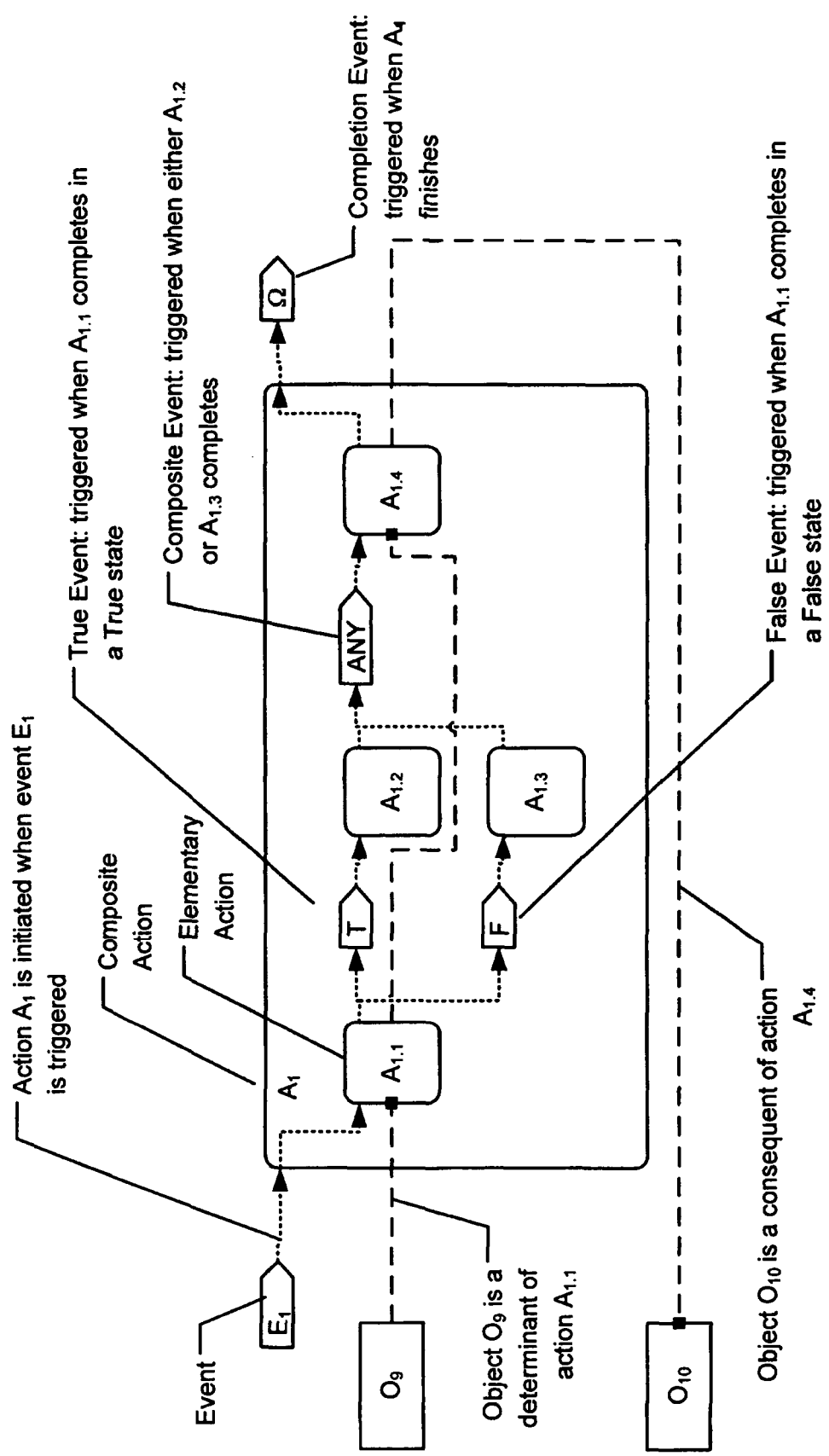

FIGS. 17A and 17B shows the structural components of a root meta-model 15-3. This is a simplified model (i.e. it leaves out some behavioural details, shown in FIG. 18) of the key object types required to describe a model, or a meta-model, and the key relationships between them. It is most easily understood by breaking it down into four quadrants resulting from the overlaps of two dimensions. In one dimension, the object type is that of an Archetype or an Instance, and in a second dimension it can be a Structural or a Behavioural component of the model. This gives four quadrants, namely Structural Archetypes and Behavioural Archetypes, shown in FIG. 17A, and Structural Instances and Behavioural Instances, shown in FIG. 17B. FIGS. 22A and 22B provide a key to FIGS. 17A and 17B.

It should first be noted that all the boxes on this model represent Object Types. Each Object Type represents a group of objects with the same properties, or attributes, and behaviours. All the Object Types in this model are also instances of Objects within the model; that is, all Object Types are subtypes of the Object object type. Therefore, the Object Type "Object" covers all four quadrants. Every Object is a member of at least one Finite Collection.

It will be appreciated that there are several aspects of this model with which particular care is required. One is the Object Type collection being a sub-collection of the Object collection, which is in turn an instance of the Object Type collection. This means that any meta-model 15-1 or model 11-1 containing a root meta-model 15-3 should first be primed with the core Object Types and Objects from the root meta-model before the specific Object Types of the meta-model or model can be added, under the control of the meta-processor 15-4.

Structural Instances are illustrated in FIG. 17B. All Structural Instances are either simple or complex. The simple objects in such a model have only one element and are either Value Objects 17-1 or Reference Objects 17-2. Value Objects 17-1 are those such as integers or dates whose content at any point in time is simply a single occurrence of a well-defined, though typically infinite, set. Reference Objects 17-2, on the other hand, point at some other object. Complex objects have more than one element 17-4 and are either Composite Objects 17-3 or Collections 17-6. Composite Objects 17-3 are composed of one or more other Objects, typically of different types; composite objects can be thought of as similar to (possibly variable) record structures from conventional high level programming languages. A System 17-5 is a special kind of Composite Object 17-3 which contains at least two other Objects, at least one of which is or contains a Reference Object 17-2. Similarly, an actor, as defined in this specification, is a special type of system capable of effecting action in another system—i.e. a subject system. Collections 17-6, are groups of Objects of similar types as their name implies. Collections may be Infinite 17-7, Finite 17-8 or Derived collections 17-9. Derived collections 17-9 are defined with reference to other Collections. Infinite Collections 17-7 typically describe infinite groups of values, such as a set of Integers. Most Collections 17-6 within a model, however, usually will be Finite Collections 17-8, which are typically defined with reference to other Objects within the model, either directly (i.e. explicitly enumerated) or through some formula through which its members can be derived. All the members 17-10 of a Finite Collection 17-8 have a structure and behaviour defined by the Object Type 17-14 associated with that Finite Collection (see below). Derived Collections 17-9, such as Subsets, are neither pre-defined as the basic value sets must be, nor fully enumerated, but have their membership defined through a formula contained within an Applied Action Type 17-24, which is discussed below.

Structural Archetypes are illustrated in FIG. 17A. They define the structure (and behaviours—through associations with Behavioural Archetypes—as is discussed below) common to all members of each Collection. Hence, a Value Object Type 17-11 identifies the Collection 17-6 (typically an infinite set such as integers) from which the values for all Value Objects 17-5 of that type must take. A Value Object type 17-11 may also include a reference to an Action Type 17-16 (as discussed below) through which the specific value of a Value Object 17-1 is derived. A Reference Object Type 17-12 also includes a reference to a Collection 17-6, indicating which Collection 17-6 members of this type are allowed to reference. Composite Object Types 17-13 identify the Object Types 17-14 which will provide the components of Composite Objects 17-3 of this type. Collection Types 17-15, which define the archetypal member of a collection of collections, identify the Object Type 17-14 from which Collection members 17-10 of this type must be taken.

Behavioural Archetypes are also shown in FIG. 17A. They introduce the mechanisms by which actions are effected, by associating Event Types 17-32 and Action Types 17-16 with Objects. Since Object Types 17-14 are also Objects, such associations can be with Object Types 17-14 as well as specific Objects, allowing behaviours to be associated with the entire Collections 17-6 of which an Object Type 17-14 is the Archetype. Event Types 17-32 are either Elementary 17-17 or Composite 17-18. Elementary Event Types 17-17 define a change in the state of an Object into a State, from another State or by the creation of an object, each State being defined with reference to a State Object 17-19. A State Object 17-19 is a special form of Value Object 17-20. Composite Event Types 17-18 combine other Event Types 17-32 (either Elementary or Composite) to define new Event Types. The way in which these Event Types 17-32 are combined is defined via an Action Type 17-16, typically Union (OR) or Intersection (AND) Action Types. Action Types 17-16 can similarly be Elementary or Composite 17-21. The Elementary Action Type is not shown in the Figure as there are no relationships which apply to it and to no other form of Action Type. Action Types 17-16 have Determinants 17-22, which must be available for the execution of Actions of this Action Type. Action Types 17-16 also have Consequents 17-23, which accept the outcomes of Actions of this Action Type. Determinants 17-22 and Consequents 17-23 of Action Types 17-16 may be either Objects or Object Types 17-14. Applied Action Types 17-24 are specific instances of Action Types 17-16, associated with a specific Event Type 17-32. To illustrate the difference between an Action Type 17-16 and an Applied Action Type 17-24, we can consider the action "add" (i.e. binary addition—the mathematical operator "+"). The Action Type "add" has two Determinants and a single Consequent, each of which is a Number. An Applied Action Type can be seen in FIG. 14. Here, following every action 14-9, an Applied Action Type "add" is initiated at action 14-10 which adds 1 to the "current_date" (the Determinants) and assigns the result to "current_date" (the Consequent).

Behavioural Instances also are illustrated by FIG. 17B. They are employed directly by the root meta-processor 15-4 to drive the execution of a model 11-1, as described above with reference to FIG. 16. The key Behavioural instance Object Types 17-4 are Events 17-25, which may be Elementary 17-26 or Composite 17-27, and Actions 17-28, which may also be Composite 17-29. Actions 17-28 and Composite Actions 17-29 have Determinants 17-30 and Consequents 17-31. Events 17-25 are occurrences of Event Types 17-32. Actions 17-28 are occurrences of Applied Action Types 17-24.

The main differences between this root meta-model 15-3 and meta-models associated with other modelling approaches, particularly Object Oriented Modelling, are as follows. In the root meta-model 15-3, the meta-objects (i.e. the Object Types 17-14) are elements of the model itself and therefore are open to being extended or modified by an associated meta-processor 15-2. Also in a root meta-model 15-3 the mechanisms for capturing behaviours are not contained in, ultimately sequential, methods or operations but instead in Event Types 17-32 and Action Types 17-16. This directly enables dynamic, parallel execution of the model.

FIG. 18 shows the behavioural components of a root meta-model such as the root meta-model 15-3. The left hand side of the model (shown in FIGS. 18A and 18B) is a partial but more detailed version of the structural model shown in FIG. 17. It explicitly includes the collections (on the left of the dotted line in the FIGURE) which are represented as types in the previous model, as well as the archetypal members of each set (on the right side of the dotted line in the Figure). It also includes special types of reference arrows indicating membership, sub-collection and composition relationships. FIGS. 22A and 22B provide a key also to FIG. 18. The key behavioural elements of the model are shown to the right hand side of the model (in FIGS. 18C and 18D) in three groups associated with Object 18-1, Event 18-2 and Action 18-3 events respectively.

The Object events group 18-1 shows three different Event Types which may be associated with an Object: a Creation Event Type 18-4, which type of event occurs when an Object is first created by an Action (i.e. changes its State from "Does Not Exist" to "Exists"); a Modification Event Type 18-5, which type of event occurs when the Object is changed (but not created or deleted) by an Action; and a Deletion Event Type 18-6, which type of event occurs when an Action deletes the Object. When these changes are detected by a root meta-processor 15-4, this model indicates that it should respond by creating a Creation Event 18-7, a Modification Event 18-8 or a Deletion Event 18-9 respectively, the Event being associated with the changed Object. This is sufficient to initiate an execution cycle, as described above with reference to FIG. 16. (These behavioural elements are in addition to the simple writing and reading of objects into or out of a memory or object store which must be undertaken within the Object events group and which are well covered in the prior art.)

The Event events group 18-2 shows the behavioural rules associated with Events. Only the creation of an Event is of interest. The creation of an Event initiates two parallel Actions 18-9, 18-10. The first is a Composite Action 18-9, which creates a parent Event for each occurrence of a Composite Event Type of which the Event Type associated with this Event is a component. This parent Event is created only if "Execution" of the Composite Action associated with the Composite Event Type indicates that all other necessary Events have also occurred (i.e. completes in a state of "True"). The second Action 18-10 creates an Action occurrence for each Action Type which is initiated by the Event Type associated with this Event. A Create action 18-11, forming part of the Create Action composite action 18-10 handles the creation of the created Action components, i.e. its references to the initiating Event, Action Type of which it is an application, and the Objects in its Determinant and Consequent Collections. Both of the Actions 18-9, 18-10 can create multiple Events 17-25 or Actions respectively. Whether or not multiple Events 17-25 or Actions 17-28 are created depends on the number of Composite Event Types 17-18 and Action Types 17-16 associated with the Event Type 17-32 created.

The Action events group 18-3 shows the behavioural rules associated with Actions 17-28. It is the creation of the Action which is of primary concern, and the creation of an Action can initiate two parallel activities. One activity, which occurs every time an Action is initiated, is to create an "Initiated" Event 18-12. This allows the root meta-processor 15-4 to track execution of Actions and, more importantly, enables the Actions which are components of a Composite Action and which are dependent on its initiation to be initiated. An Execute Action activity 18-13 is initiated only when the initiated Action is an Elementary Action. Only Elementary Actions actually cause changes to Objects. This Action 18-13 causes the processor to perform the created Elementary Action using the Action Type, Determinants and Consequents referenced by the associated Action Type. Any changes effected by assigning the outcomes of such Elementary Actions to the Consequents initiate another cycle of execution, since the root meta-processor 15-4 detects the change and creates a Modification Event, as described above. Once the Execution Action 18-13 is complete, the root meta-processor 15-4 initiates a Create Completed Event action 18-14, which creates an Action Completed Event and which in turn may initiate other Actions. These other Actions typically are components of the same Composite Action.

Figure 19A:
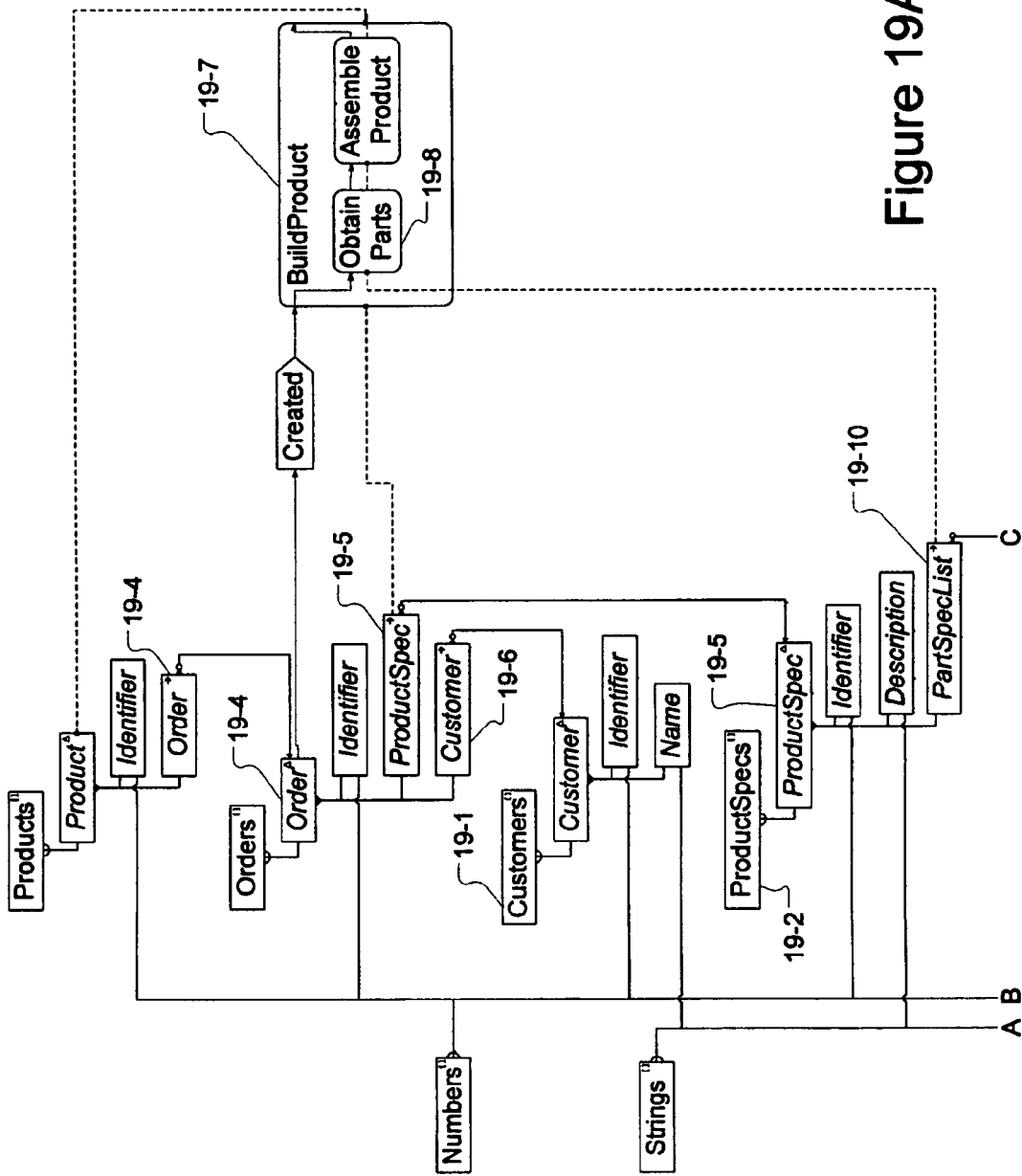
FIG. 19 illustrates a simple event-driven production assembly model constructed according to the invention.
Figure 19B:
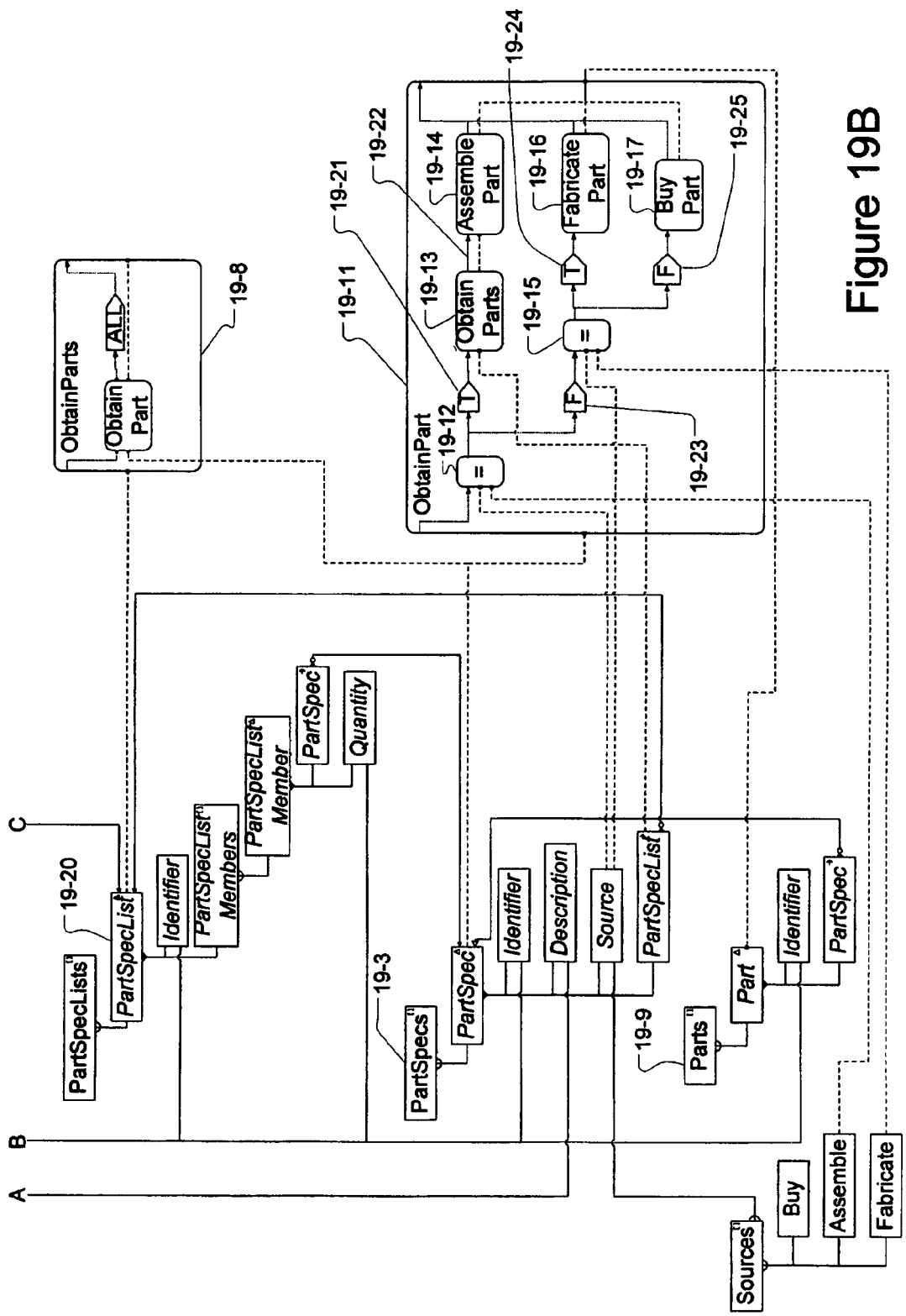

FIGS. 19A and 19B show the above-described system of operation applied to a production assembly model. FIGS. 22A and 22B also provide a key to FIGS. 19A and 19B. Prior to execution of the model, objects labelled "Customers" 19-1, "ProductSpecs" 19-2 and "Part Specs" 19-3, relating to customers, product specifications and part specification respectively are created. Execution of the model is initiated by the creation of an "Order" object 19-4, which orders a specific ProductSpec 19-5 for a specific Customer 19-6. The creation of the Order object 19-4 is an event which initiates a "BuildProduct" action 19-7. In actuality, there are plural objects called Customer, ProductSpec and Part Spec although only one of each of these is illustrated in the Figure. Initiation of the BuildProduct action 19-7 initiates an "ObtainParts" action 19-8. The Parts 19-9 to be obtained by the ObtainParts action 19-8 are those defined in a Part SpecList object 19-10 associated with the ProductSpec object 19-5. Initiation of the ObtainParts action 19-8 itself initiates one occurrence of an ObtainPart action 19-11 for each part in the Part SpecList 19-20 associated with the ProductSpec object 19-5. Each ObtainPart action 19-11 (only one of which is shown) commences by initiating a check (19-12) as to whether the part requested is an assembled part. If it is, action 19-12 completes in a True state 19-21 which initiates a further ObtainParts action 19-13 for the assembly of the requested part, just as the BuildProduct action 19-7 initiates an ObtainParts Action 19-8 for the finished product. Once all of the parts are available the completion of the ObtainParts action 19-13 causes 19-22 the AssemblePart action 19-14 to assemble the part itself, which constitutes either the creation of an object or the change in state of object. If it is determined that the part is not an assembled part, action 19-12 completes in a False state 19-23, initiating action 19-15 to determine whether it is a fabricated part. If it is, event 19-24 initiates a FabricatePart action 19-16, which fabricates the part. Otherwise, a BuyPart action 19-17, which buys the part, is initiated by event 19-25.

Once all of the parts have been obtained for a Part SpecList object 19-20 the ObtainParts action 19-11 is then complete. Completion of the last ObtainParts action 19-18 (i.e. the action initiated within the BuildProduct action) causes an event which initiates the assembly of the products (not shown). Once assembly is complete, execution of the model is completed.

Figure 20:
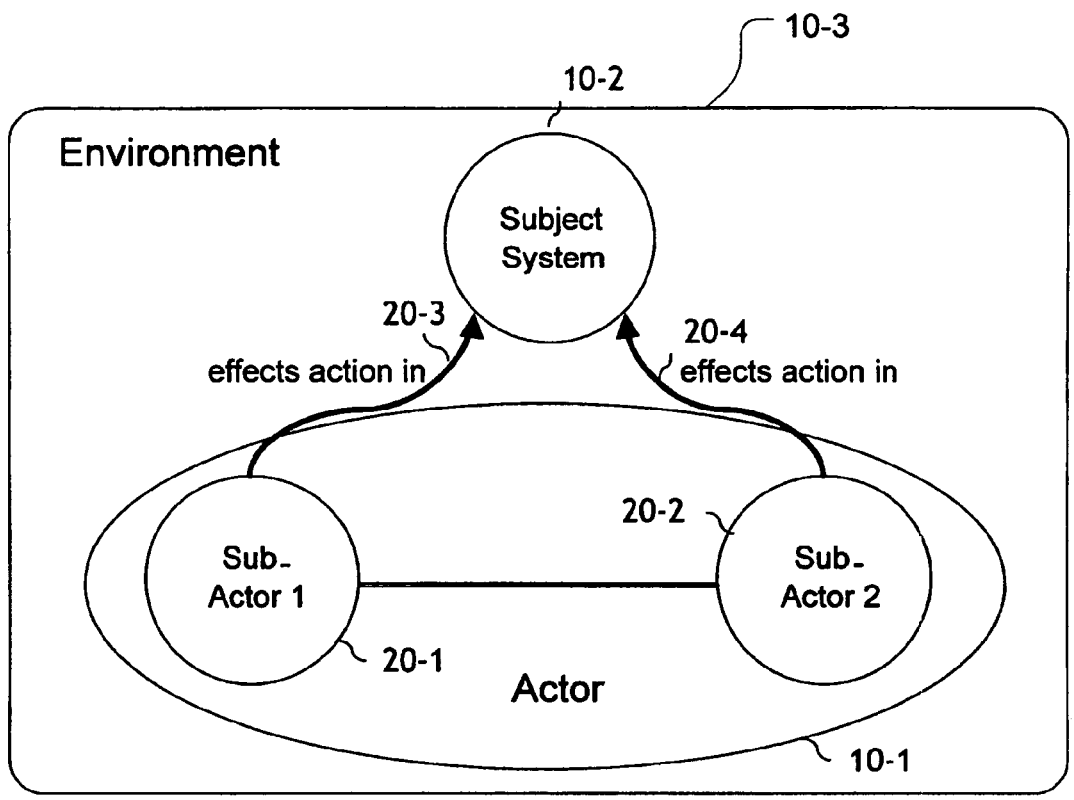
FIG. 20 illustrates an actor comprising first and second sub-actors, each of which acts on a subject system, according to certain aspects of the invention.

A complex activity system is illustrated in FIG. 20. Here, a subject system 10-2 is contained within an environment 10-3, in the same way as that illustrated in FIG. 10. In this case, an actor 10-1 includes first and second sub-actors 20-1, 20-2. The sub-actors 20-1, 20-2 are interconnected, and each effects action 20-3, 20-4 in the subject system 10-2. The sub-actors 20-1, 20-2 can be considered as co-operating with each other to effect action 20-3, 20-4 in the subject system 10-2.

Figure 21:
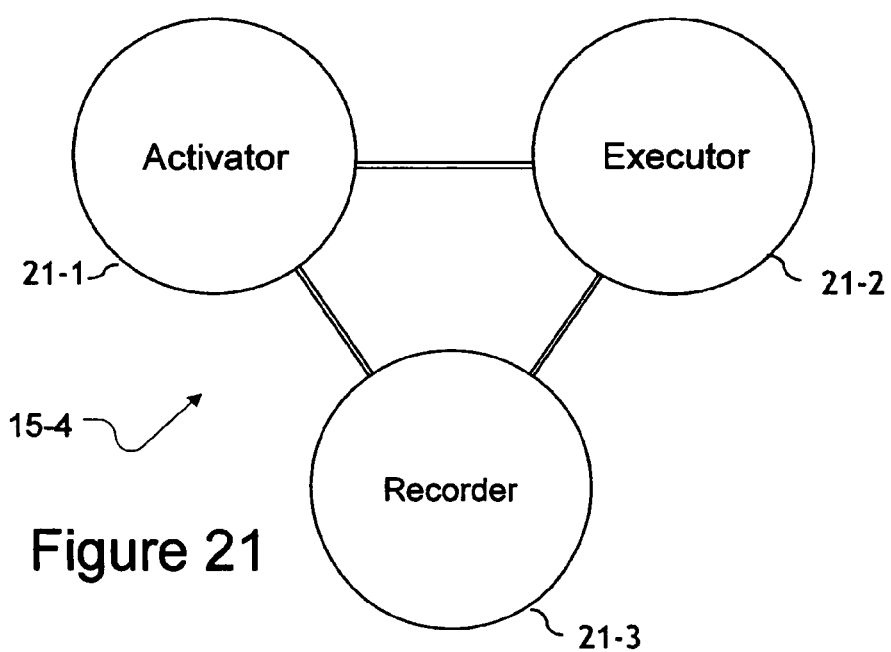
FIG. 21 illustrates a partial composite root meta-processor used with the invention.

A partial composite root meta-processor 15-4, such as the one shown in FIG. 15, is illustrated in FIG. 21. Here, the root meta-processor 15-4 is formed of a system of cooperating sub-actors 21-1, 21-2, 21-3. An activator actor 21-1 is concerned with events, an executor actor 21-2 is concerned with actions and a recorder actor 21-3 is concerned with objects. Each of the actors 21-1, 21-2, 21-3 is connected to each of the other actors, in order to enable the cycle shown in and described with reference to FIG. 16 to be performed. (Note that a complete composite root meta-processor requires further components as discussed below with reference to FIG. 23. A complete composite root meta-processor is therefore described below with reference to FIG. 24.)

The allocation of tasks between the sub-actors 21-1, 21-2, 21-3 is as follows. The activator 21-1 is arranged to respond to events and to determine from the events and from the model or models 11-1, 15-1, 15-3 which actions to initiate. The executor actor 21-2 is arranged for effecting the actions which are determined by the activator 21-1 as being required to be initiated. The executor 21-2 effects the actions so determined on the objects in accordance with the model or models 11-1, 15-1, 15-3. The recorder 21-3 manages the objects forming part of the models and recognises events triggered by the changes of states of objects managed by the recorder 21-3, or the creation or deletion of an object, which in turn initiates further activity by the activator 21-1.

FIG. 18 shows the key responsibilities of the recorder 21-3, activator 21-1 and executor 21-2 actors shown in FIG. 21 for the behavioural rules described above with reference to FIG. 18. The recorder 21-3 has responsibility for the Object events group 18-1, i.e. for detecting and creating Object Creation 18-7, Modification 18-8 and Deletion 18-9 Events. The activator 21-1 has responsibility for the Event events group 18-2, i.e. for detecting Event Creation Events 18-7 and creating the associated Parent (Composite) Events and Actions 18-9, 18-10. The executor 21-2 has the responsibility for the Action events group 18-3, i.e. for detecting the Action Creation Events 18-10 and executing such actions, together with creating the associated Action Initiated and Action Completed Events 18-12, 18-14.

Figure 23:
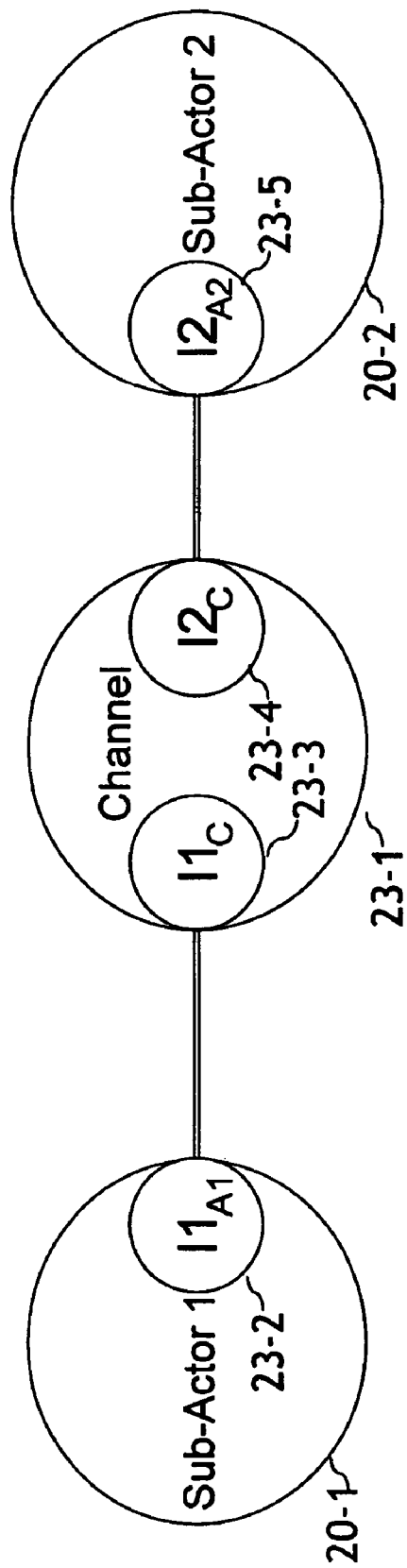
FIG. 23 illustrates connection of the actors according to the invention using a channel, according to certain aspects of the invention.

When two actors cooperate to form a composite actor, like the sub-actors 20-1, 20-2 cooperate to form the actor 10-1 in FIG. 20, it is necessary to provide a communication mechanism. Depending on the nature of the sub-actors 20-1, 20-2, the communication can take either a continuous or a discrete form. The connection of the first and second sub-actors 20-1, 20-2 is illustrated in FIG. 23. Here, the first sub-actor 20-1 includes a connection to a channel 23-1, which also is connected to the second sub-actor 20-2. The sub-actors 20-1, 20-2 are thus connected to each other by the channel 23-1. To enable connection of the first sub-actor 20-1 to the channel 23-1, a first interface component 23-2 is included in the first sub-actor 20-1, the first interface component 23-2 being connected to a second interface component 23-3 forming part of the channel 23-2. Similarly, a third interface component 23-4 forming part of the channel 23-1 is connected to a fourth interface component 23-5, which forms part of the second sub-actor 20-2. Each of the interface components 23-2, 23-3, 23-4 and 23-5 constitutes an actor which preferably is constituted as the actor 10-1 of FIG. 15. Each of the actors 23-2, 23-3, 23-4 and 23-5 has as its subject system 10-2 the article which constitutes the communication between the components. If the communication is continuous, the communication articles may take the form of material flow, for example, piped fluids or powders, or of signals, for example electromagnetic waveforms or electronic waveforms. Discrete communication articles may constitute packages, for example the shipment of manufacturing components or the like, or messages, for example information packages, such as orders. Each of the actors therefore includes a model of the article which is used for communication, and effects action on that article.

Figure 24:
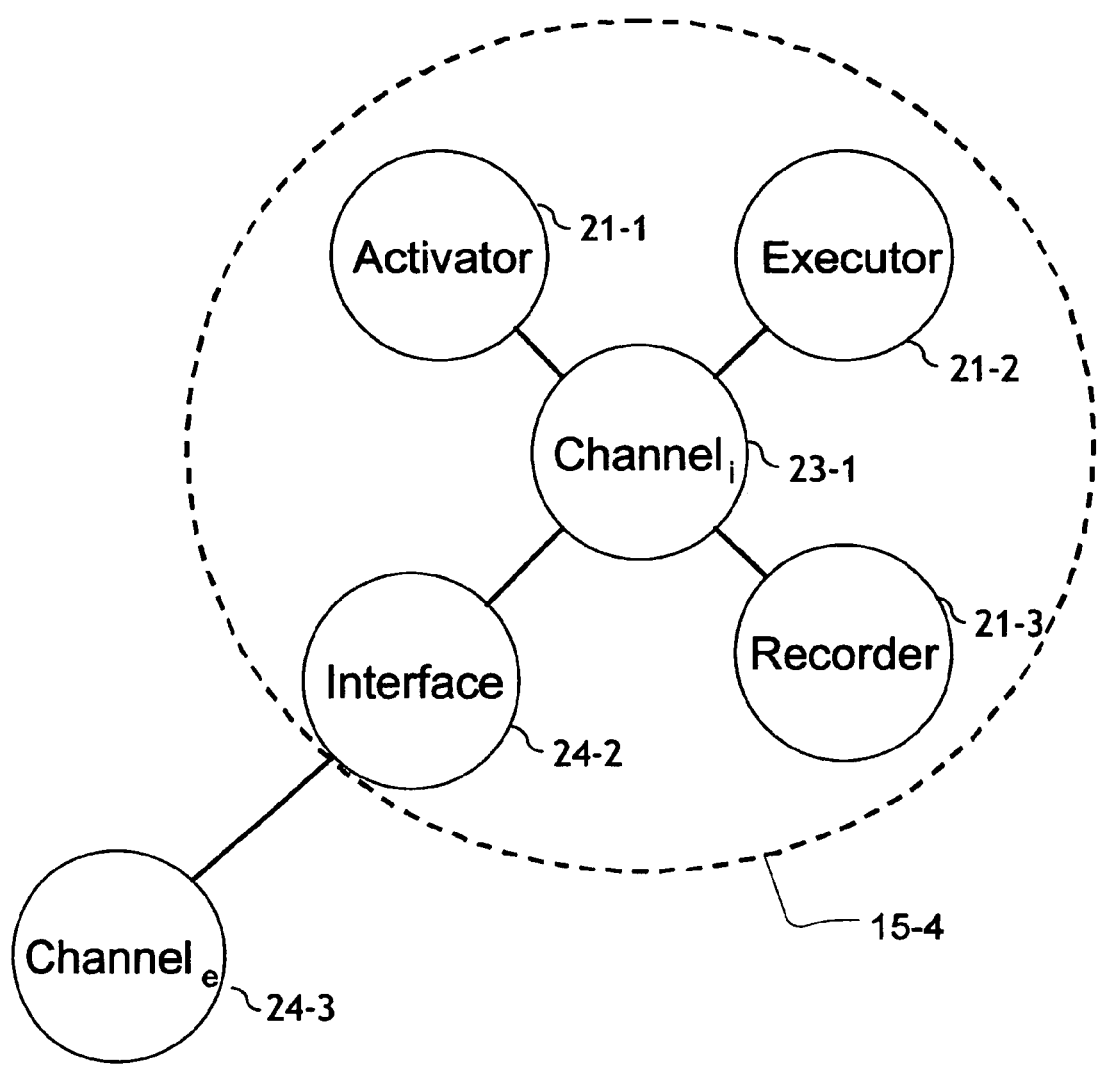
FIG. 24 illustrates a root meta-processor according to and used by certain aspects of the invention.

A complete generic model for a composite root meta-processor is illustrated in FIG. 24. Here, the activator 21-1, the executor 21-2 and the recorder 21-3 are shown as being connected to one another by a channel 23-1. The channel 23-1 is also connected to an interface 24-2, which allows the root meta-processor 15-4 to be connected to external systems, for example by the channel 24-3.

The channel 23-1 may connect the activator 21-1, the executor 21-2, the recorder 21-3, and the interface 24-2 to each other directly, as shown. Alternatively, there may be a ring-like channel system, in which the recorder 21-3 is connected to the activator 21-1, the activator 21-1 is connected to the executor 21-2, and the executor 21-2 is connected to the recorder 21-3. The channel system may instead take any form between these two extremes.

Figure 25:
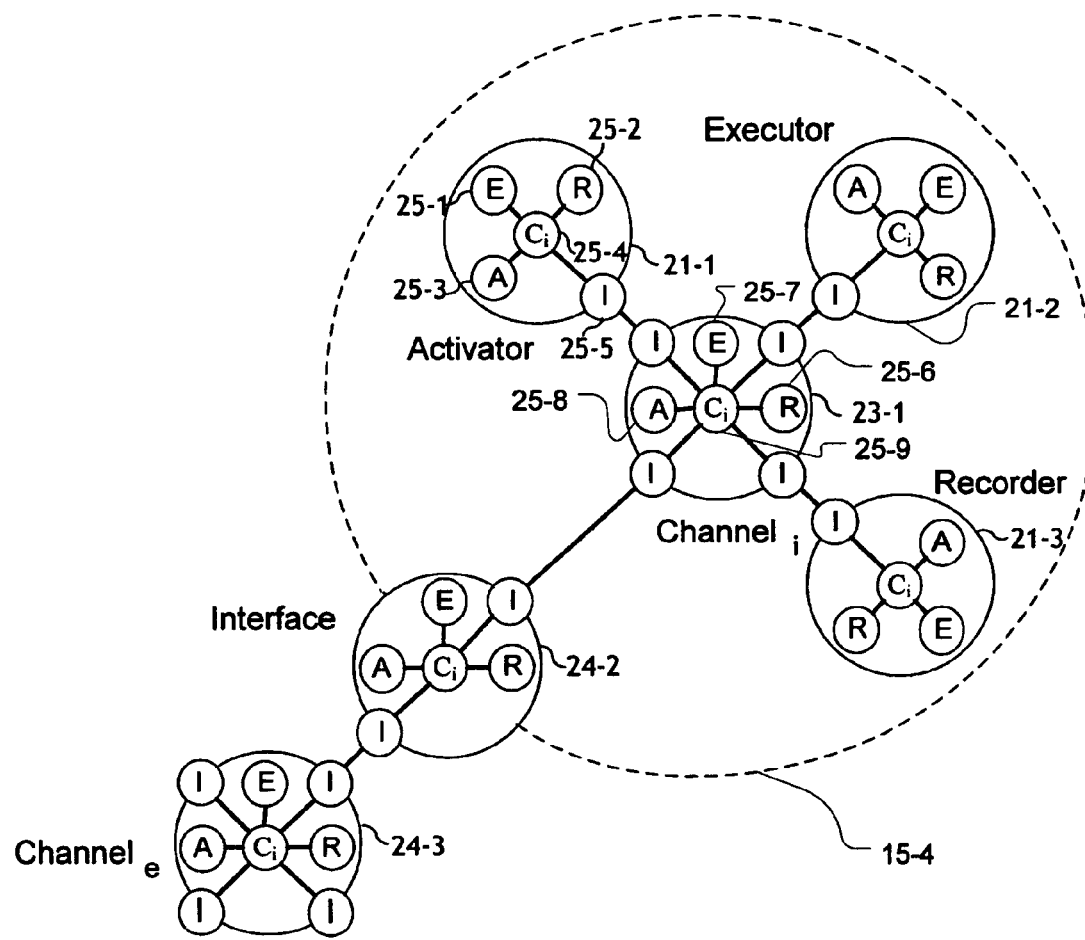
FIG. 25 illustrates a recursive root meta-processor according to certain aspects of the invention.

Each of the sub-actors 21-1, 21-2, 21-3, 23-1 or 24-2 may itself be constituted by a system of co-operating activators, executors, recorders, channels and interfaces. This is illustrated in FIG. 25. Referring to this Figure, the activator 21-1 is shown including an executor 25-1, a recorder 25-2 and an activator 25-3, all of which are connected together by a channel 25-4. An activator interface 25-5 connects the activator 21-1 to the channel 23-1. The channel 23-1 itself comprises a root meta-processor constituted by a recorder 25-6 an executor 25-7 an activator 25-8 and a channel 25-9. The channel 25-9 forming part of the channel 23-1 is connected to each of the executor 21-2, the recorder 21-3, the activator 21-1 and the interface 24-2 by a further respective interface, indicated merely as "I" in the Figure. The executor 21-2, the recorder 21-3, the interface 24-2 and the external channel 24-3 also are constituted by root meta-processors including the relevant components.

A ring-like channel system, or a hybrid channel system, may be used as described above with reference to FIG. 24.

Although in FIG. 25 each of the components of the root meta-processor 15-4 is illustrated as a root meta-processor, it is not necessary that each of the components is so constituted. In some circumstances, it may be required to implement only one, two or three of the components as root meta-processors.

The subject system of an activator 21-1 is a system of events which initiate actions in a subject system. The subject system of an executor 21-2 is a system of actions which change objects within a subject system. The subject system of a recorder 21-3 is a system of objects, their associated data and states and the events which are triggered when the states of those objects change. The subject system of a channel 23-1, 24-3 is a system of communication between two or more actors. The subject system of an interface 24-2 is a system of communication between an actor and a channel or the outside world.

Figure 26:
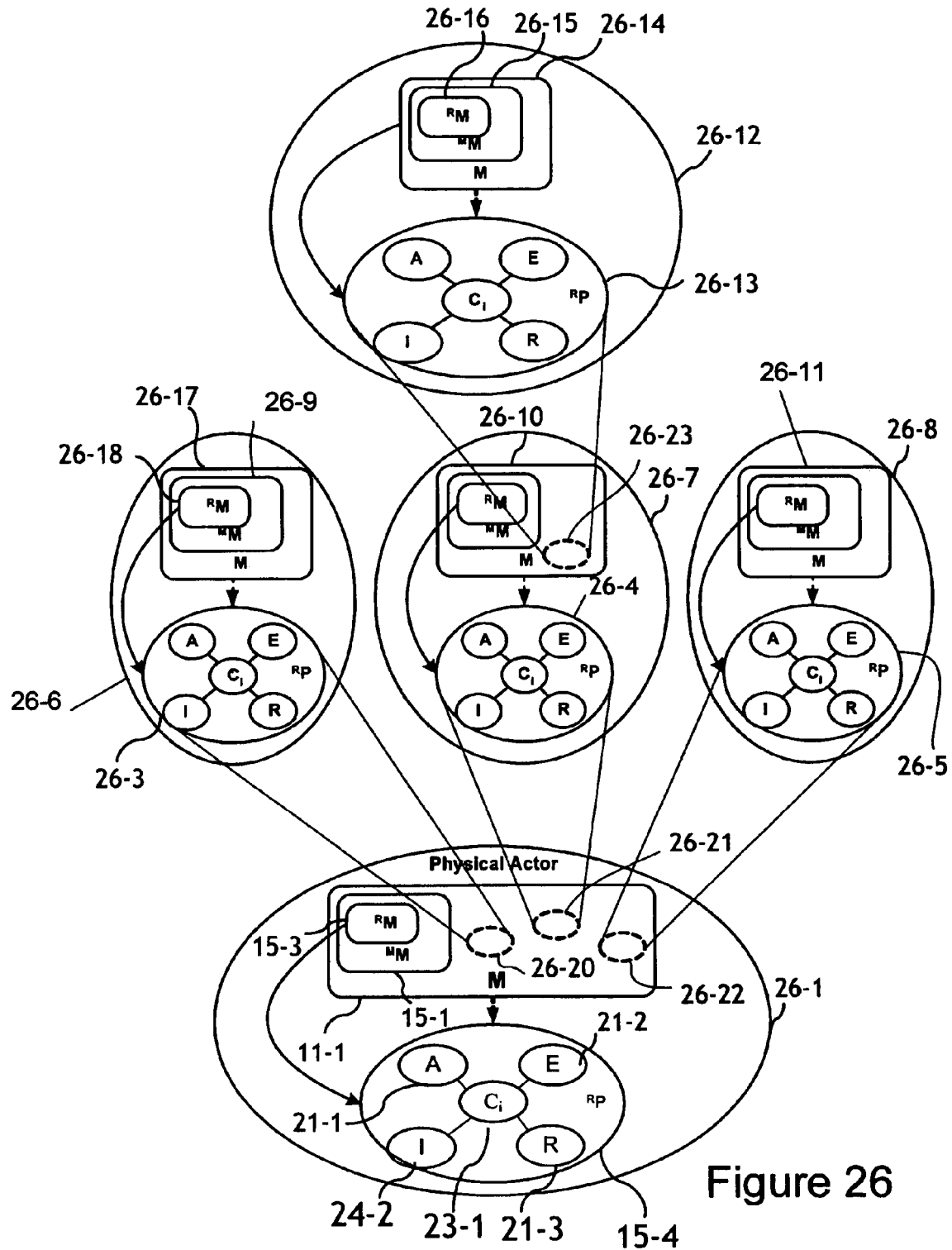
FIG. 26 illustrates layering of root meta-actors, including multi-actor elaboration, according to the invention.

A model of layered root meta-actors is shown in FIG. 26. Here, a physical actor 26-1 is illustrated comprising a root meta-processor 15-4 and a model 11-1. The model 11-1 includes a meta-model 15-1 and a root meta-model 15-3. The root meta-processor 15-4 is constructed like the root meta-processor of FIG. 24, namely including an activator 21-1, an executor 21-2, a recorder 21-3, a channel 23-1 and an interface 24-2.

The model 11-1 contains sub-models 26-20, 26-21, 26-22 which respectively elaborate the behaviours of the virtual activators, executors, recorders, channels and interfaces of the virtual root meta-processors 26-3, 26-4 and 26-5, in particular the virtual activators, executors, recorders, channels and interfaces thereof, into terms which are directly executable by the physical root meta-processor 15-4. As the behaviour of a root meta-processor 15-4 and its components is defined by its associated root meta-model 15-3, this means that each model effectively renders the elementary objects, events and actions of the root meta-model of the relevant virtual actor into the elementary objects, events and actions of the root meta-model of the underlying physical actor. How this elaboration may be achieved is described below with reference to FIGS. 27A and 27B.

Note that the model—and hence meta-model and root meta-model—of any root meta-actor is in fact stored within the recorder of the root meta-actor's root meta-processor.

This elaboration may be extended to one or more further layers. For example, in FIG. 26, the second virtual actor 26-7 contains a sub-model 26-23 within the model 26-10 which in turn elaborates the root meta-model of the fourth virtual actor 26-12 in terms which render it executable by the virtual root meta-processor 26-4 of the second virtual actor 26-7.

The physical actor 26-1 is the only hardware element; all the other elements are virtual. The root meta-processors 26-3, 26-4 and 26-5 can be thought of as virtual model execution engines.

A single actor can support multiple virtual actors, each of the virtual actors having a respective role or roles, provided that the elaboration model of the single actor recognises each of the roles of the virtual actors. When an actor has multiple roles, its elaboration model requires additional rules for handling contention between the roles. Such rules might be definitions of the relative priority of each role.

Applying an actor having multiple roles to a situation in which a production control computer system is used for manufacturing, an actor can have a role of monitoring production and a role of raising alarms for production management should any production issues occur, for example, falling behind schedule. The actor can also have the role of running a simulation of a proposed change to the production process, in order to enable the performance of the existing process to be compared to that of the proposed process. Obviously, keeping production running is more important and more urgent than completing the simulation quickly.

Here, the computer system (not shown) is a single composite actor having two assigned roles, namely production monitor and simulator. The hardware of the computer system is provided with an elaboration model, which needs to be aware of both roles and needs to include rules for handling any potential conflict between the roles. If both the simulator and the production monitor want to do something simultaneously, the production monitor role of the actor has a higher priority and therefore takes precedence over the simulation role. The multi-actor elaboration model therefore needs two individual models, one for each role, contained within a single, common model. The single model also has rules to handle the inter-role interactions.

The role of this computer system is quite similar to that fulfilled by a conventional computer operating system. However, the multi-actor layered virtual meta-actor response to this need is improved because each of the models is event-driven, and hence parallel rather than sequential. This enables parallel implementation of the roles. As a result, the multi-actor elaboration model does not require much overhead in switching between roles (which could be processors in a conventional operating system) because the underlying physical processor has a single model (rule set) from which events from any of the roles can be triggered at any time.

This approach differs from similar existing layered approaches (for example, in the design of modern layered operating systems) in that it is not the model of the virtual actor which is elaborated onto the physical actor, but instead is the virtual root meta-model. This offers the ability to execute any model of the virtual actor capable of being executed by the virtual root meta-processor on the physical actor without requiring modification of the physical actor itself, significantly increasing the reusability of the elaboration model.

The subject system of an elaborator 11-1 is a system of elaboration of the behaviour of a processor device 26-3, 26-4, 26-5, 26-13 comprising a processor, meta-processor or root meta-processor of an actor 26-6, 26-7, 26-8 enabling direct execution by another processor, meta-processor or root meta-processor 15-4.

Figure 27A:
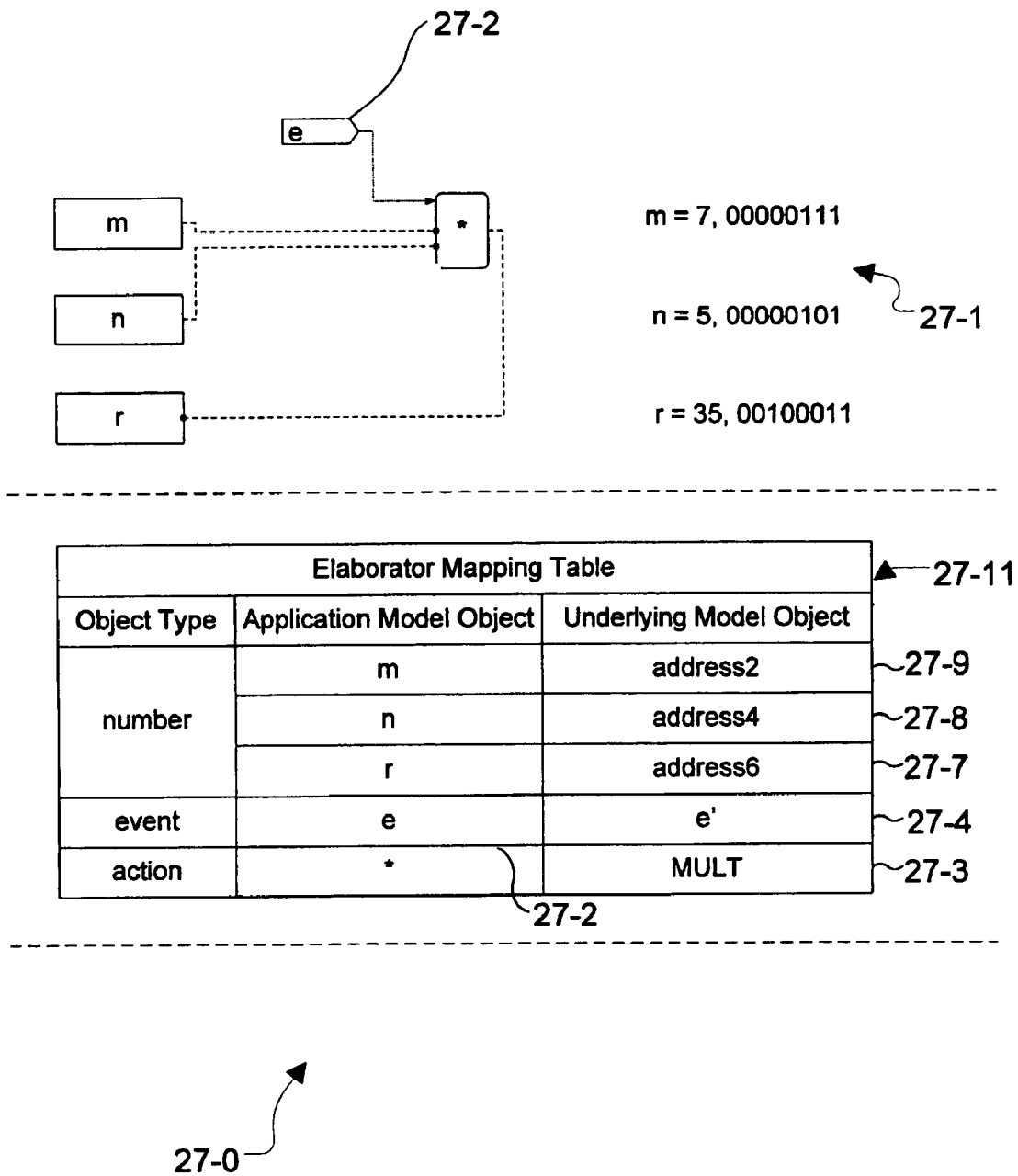
FIGS. 27A and 27B gives an example of an elaboration model which might form part of the FIG. 26 system.
Figure 27B:
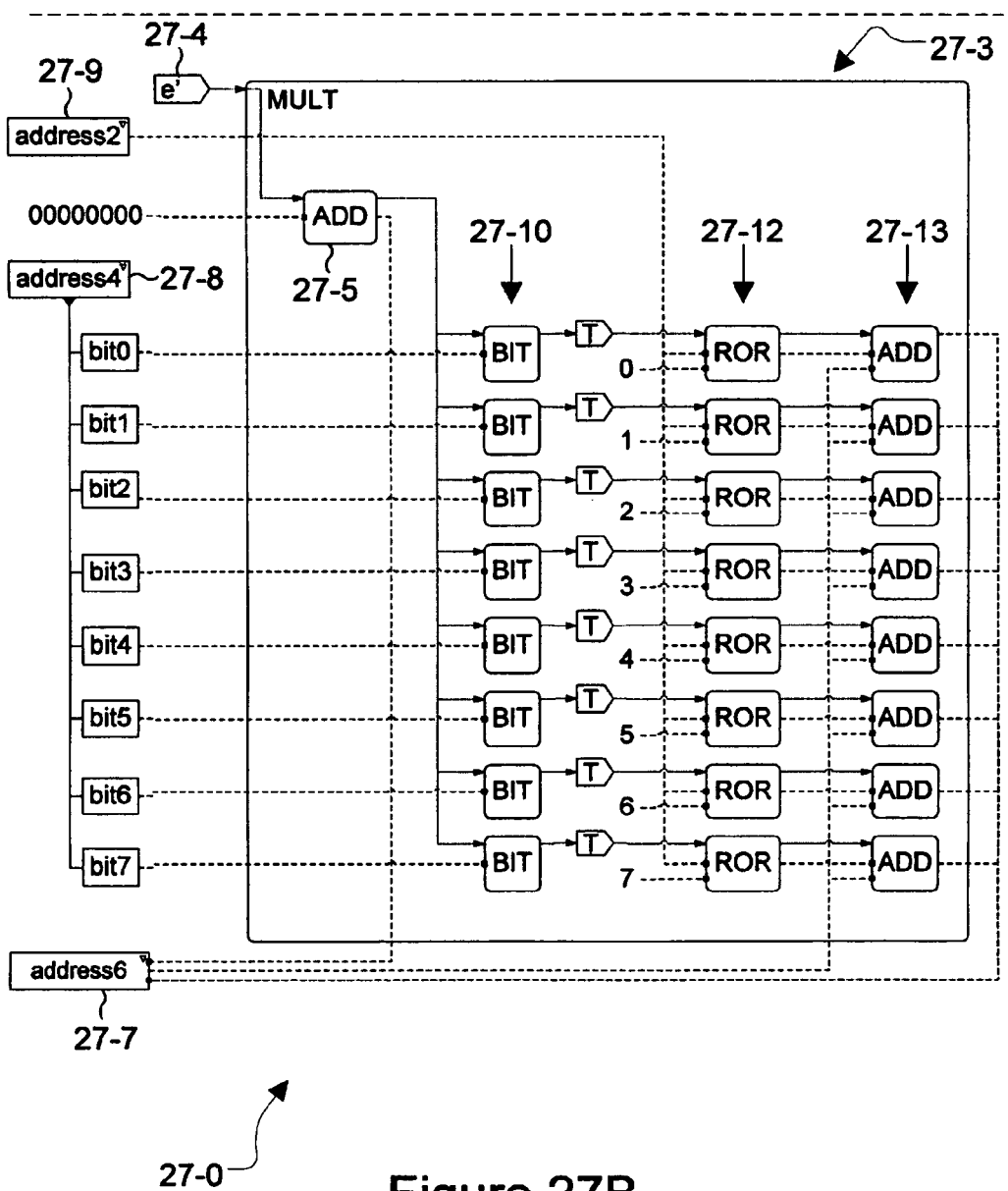

An elaboration model 27-0 will now be described with reference to FIGS. 27A and 27B. Here, part of an application model 27-1 includes an event 27-2, which initiates a multiplication process to multiply two numbers m and n to produce an output number r. It can be seen from the elaborator mapping table 27-10 that the numbers m and n are placed in the eight-bit address2 object 27-9 and eight-bit address4 object 27-8 respectively before the multiplication process begins. This elaboration model has an event e' 27-4, which is initiated whenever the event e 27-2 is initiated in the application model 27-1. The event e' 27-4 initiates a composite action 27-3. This in turn initiates action 27-5 to assign the value of zero to an eight-bit result object address6 27-7. Completion of the ADD action 27-5 initiates eight parallel sequences of actions, one sequence for each bit of the address4 object 27-8. Each of the parallel sequences indicated at 27-10 tests whether or not the corresponding bit of the address4 object 27-8 is set and, if it is, rotates the value of the further address2 object 27-9 (which is the number m) by a number of bits specified at a corresponding ROR rotation input using ROR action 27-12, and adds the result to the value of the address6 object 27-7. ADD actions 27-13 are initiated simply by the completion of the preceding ROR actions 27-12. The ROR actions 27-12 are initiated by the associated BIT action 27-10 having completed in a state of "True". The result of the elaboration process is a value stored in the address6 object 27-7 which is equal to the binary number of the third address object multiplied by the binary number of the second address4 object 27-8. With sufficient parallel processors, this model is executable in a small fraction of the time of the equivalent multiplication algorithm utilising a conventional Von Neumann type computer.

The elaborator of FIG. 27 is merely an example, and the exact form of the elaborator will depend particularly on the function that it needs to perform.

The composite root meta-actor model described above can be used to create a single processor, multiprocessor, (potentially massively) micro-parallel and distributed processor computer architectures. This approach breaks the dependency on the program counter which is inherent in traditional Von Neumann type computers, and enables fine-grained parallel implementations which closely reflect the semantics of the systems which the implementations are intended to represent.

Figure 28:
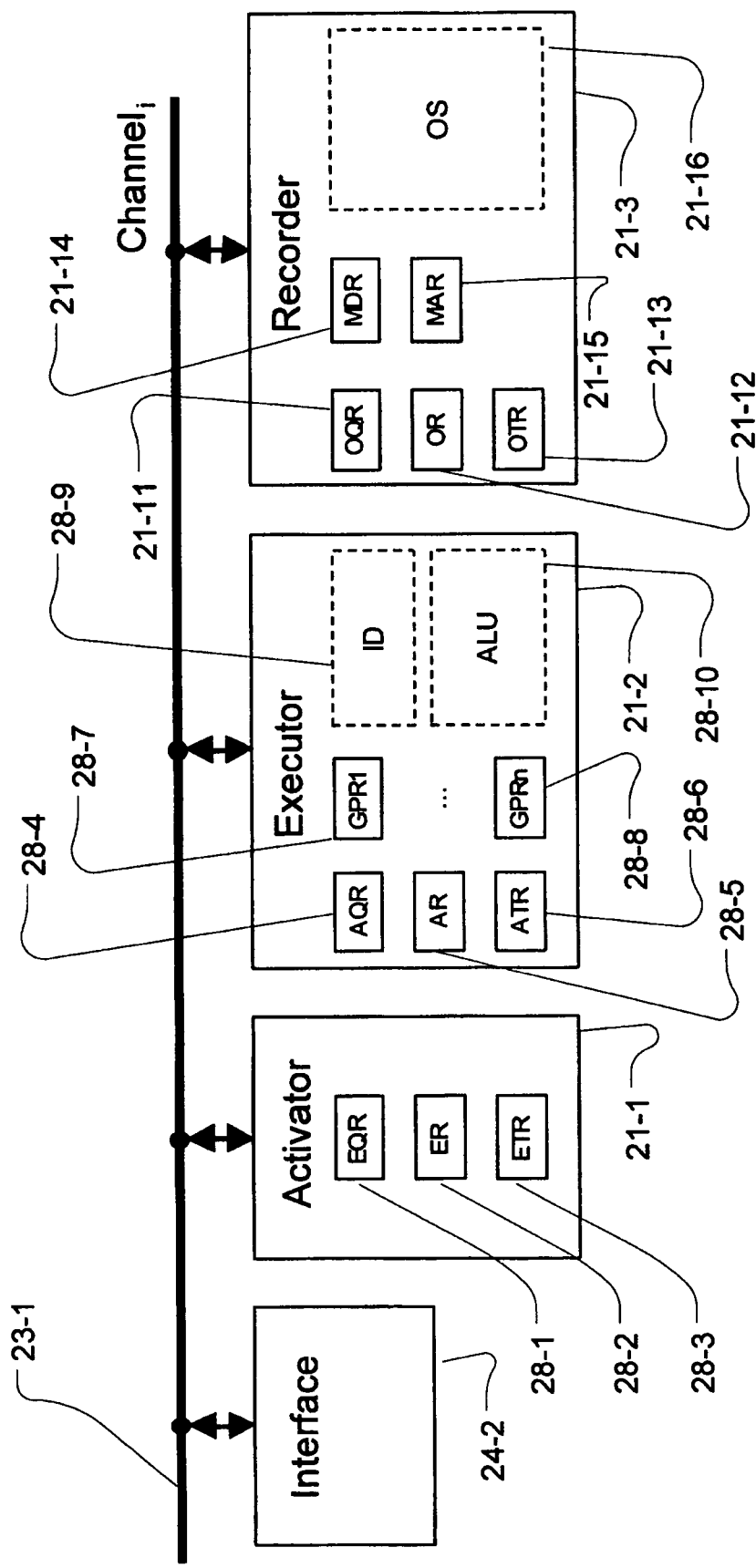
FIG. 28 illustrates an implementation of an electronic root meta-actor using a single microprocessor according to the invention.

A root meta-actor based computing device utilising a single processor is illustrated in FIG. 28. Here, the computing device comprises an activator 21-1, an executor 21-2, a recorder 21-3 and interfaces 24-2 all connected to each other by a channel 23-1. The computing device thus is constructed according to the scheme used for the root meta-processor of FIG. 24. The activator 21-1 includes an event queue register (EQR) 28-1, which contains the reference of the next entry in the event queue. A reference may be considered as being similar to an address as used in conventional computing devices. This allows plural events to be awaiting processing simultaneously. The activator 21-1 also includes an event register (ER) 28-2 which contains a reference of the current event, which is the event which is being currently processed. The activator 21-1 also includes an event type register (ETR) 28-3 which contains the physical reference of the current event type.

The executor 21-2 similarly includes an action queue register (AQR) 28-4, an action register (AR) 28-5 and an action type register (ATR) 28-6. The action queue register 28-4 contains the address of the next entry in the action queue, and the action register 28-5 contains the address of the current action which is being processed. The action type register 28-6 contains the operation code of the current action type, which is to be considered as being similar to a conventional instruction register. The executor 21-2 also includes first to nth general purposes registers (GPR) 28-7 to 28-8. These registers 28-7, 28-8 contain parameters which are used in processing. The executor 21-2 optionally further includes an instruction decoder (ID) 28-9 and an arithmetic and logical unit (ALU) 28-10, which are conventional in microprocessor architecture.

The recorder 21-3 includes an object queue register (OQR) 21-11, which contains the reference of the next entry in the object queue. Also included are an object register (OR) 21-12, which contains a reference of the current object being processed, and an object type register (OTR) 21-13 which contains the current object's type. The object's type is used primarily to distinguish between objects, actions and events. The recorder 21-3 also includes a memory data register (MDR) 21-14 which is used to store data being recorded to or fetched from memory, and a memory access register (MAR) 21-15, which contains the reference at which store or fetch instructions to be actioned are held. An object store or memory (OS) 21-16 forms part of the recorder 21-3.

In a root meta-actor based computing device, access to all objects in the OS 21-16 is managed by the Recorder 21-3. Whenever access to an object is required, the object's reference is placed on the object queue. The Recorder's OQR 21-11 points at the next item in the object queue to be processed. When the object queue is not empty and the Recorder 21-3 is ready, it obtains the reference from the object queue and places it in the Object Register (OR) 21-12. The Recorder 21-3 then places the OR into the MAR 21-15 and issues a read or write instruction to the OS 21-16; in the case of a read, the Recorder 21-3 obtains the object from the OS location specified in the MAR 21-15 and places it in the MDR 21-14; in the case of a write, the Recorder 21-3 places the object in the MDR 21-14 into the OS 21-16 at the location specified by the MAR 21-15. When an object is read from the OS 21-16, along with the object is information about the object's type, which is placed in the OTR 21-13. The object's type is then available for further processing as required by the Recorder 21-3, or the Activator 21-1 or the Executor 21-2.

In a single processor root meta-actor based computing device, the Activator's 21-1 event queue is held in the OS 21-16 within the Recorder 21-3. When an event is triggered, it is placed in the Activator's 21-1 event queue by the triggering actor (e.g. the Recorder 21-3 or an Interface 24-3). Events continue to be added to this queue as they are generated. The EQR 28-1 points to the next item in the event queue to be processed. Whenever the event queue is not empty and the Activator 21-1 is ready, it follows the reference in the EQR 28-1 to obtain the next item in the event queue. This includes a reference to the event object held within the Recorder 21-3, which is placed in the ER 28-2. The reference in the ER 28-2 is then used, in turn, to obtain the event's type from the information held about the event object in the Recorder and return this to the ETR 28-3. The event's type is then used to obtain associated action types and parent event types, as described in FIG. 18.

Similarly, the Executor's action queue for a single processor root meta-actor based computing device is held in the OS 21-16 within the Recorder 21-3. When an action is initiated, it is place in the Executor's action queue by the Activator 21-1. Actions continue to be added to this queue as they are identified. The AQR 28-4 points to the next item in the action queue to be processed. Whenever the action queue is not empty and the Executor 21-2 is ready, it follows the reference in the AQR 28-4 to obtain the next item in the action queue. This will include a reference to the action object held within the Recorder, which is placed in the AR 28-5. The reference in the AR 28-5 is then used, in turn, to obtain the action's type from the information held about the action object in the Recorder 21-3 and return this to the ATR 28-6. The contents of the AR 28-5 and ATR 28-6 are then used to execute the action, as described in FIG. 18. More specifically, if the action is an elementary action (i.e. is not composed of further, more detailed actions but can be directly executed by the Executor 21-2 in one step), the action type in the ATR 28-6 has specific circuitry or micro-coding within the ALU 28-10 to implement that action type; in this way type action type in this invention is equivalent to an instruction in a conventional computer and the ATR 28-6 is similarly equivalent to an Instruction Register. Specific information required for the execution of the action, such as the locations of the determinants and consequents in the OS 21-16 are provided via the action object referenced in the AR 28-5, as described in FIGS. 17 and 18.

It will be appreciated that the Activator, Executor and Recorder processing cycles are themselves applications of the root meta-execution cycle described in FIG. 16. These must be implemented within the processor configuration by: the further manipulation of the event, action and object queues (using multiple queues or priorities within the queues) to ensure that events, actions and objects being used by the Activation, Execution and Recording cycles themselves are handled in preference to "user" events, actions and objects from the model being executed; the implementation of additional logic circuits designed specifically to execute the Activation, Execution and Recording cycles; or the elaboration of the Activator 21-1, Executor 21-2 and/or Recorder 21-3 onto one or more lower level machines, as shown in FIGS. 26 and 27, which can be considered to be similar in effect to the use of micro-coding within conventional computer architectures, although the specific mechanisms are fundamentally different (see the description below with reference to FIG. 29). In either case, the underlying logic circuits are designed employing asynchronous circuit design, which approach is referred to above. Using the asynchronous circuit design approach, the gating signals of the clock in the synchronous sequential circuit design are replaced by event signals in the additional logic circuits or the lower level Activator, Executor and Recorder machines, depending on which approach is used. The application of similar event signals is well understood in the field of asynchronous circuit design.

It will be also appreciated that further optimisations of these Activation, Execution and Recording cycles, such as including details of events, actions and objects, including, for example, their type, in the event, action and object queue entries, may be beneficial.

It will be seen that the computing device of FIG. 28 is in someway similar to the conventional Von Neumann type computer. However, operation is event-driven, rather than flow and jump. Put another way, the computing device of FIG. 28 does not require a program counter to process events, actions and objects. Also, the activator 21-1 determines what actions happen and at what times, and is guided by the behavioural model, described above.

Figure 29:
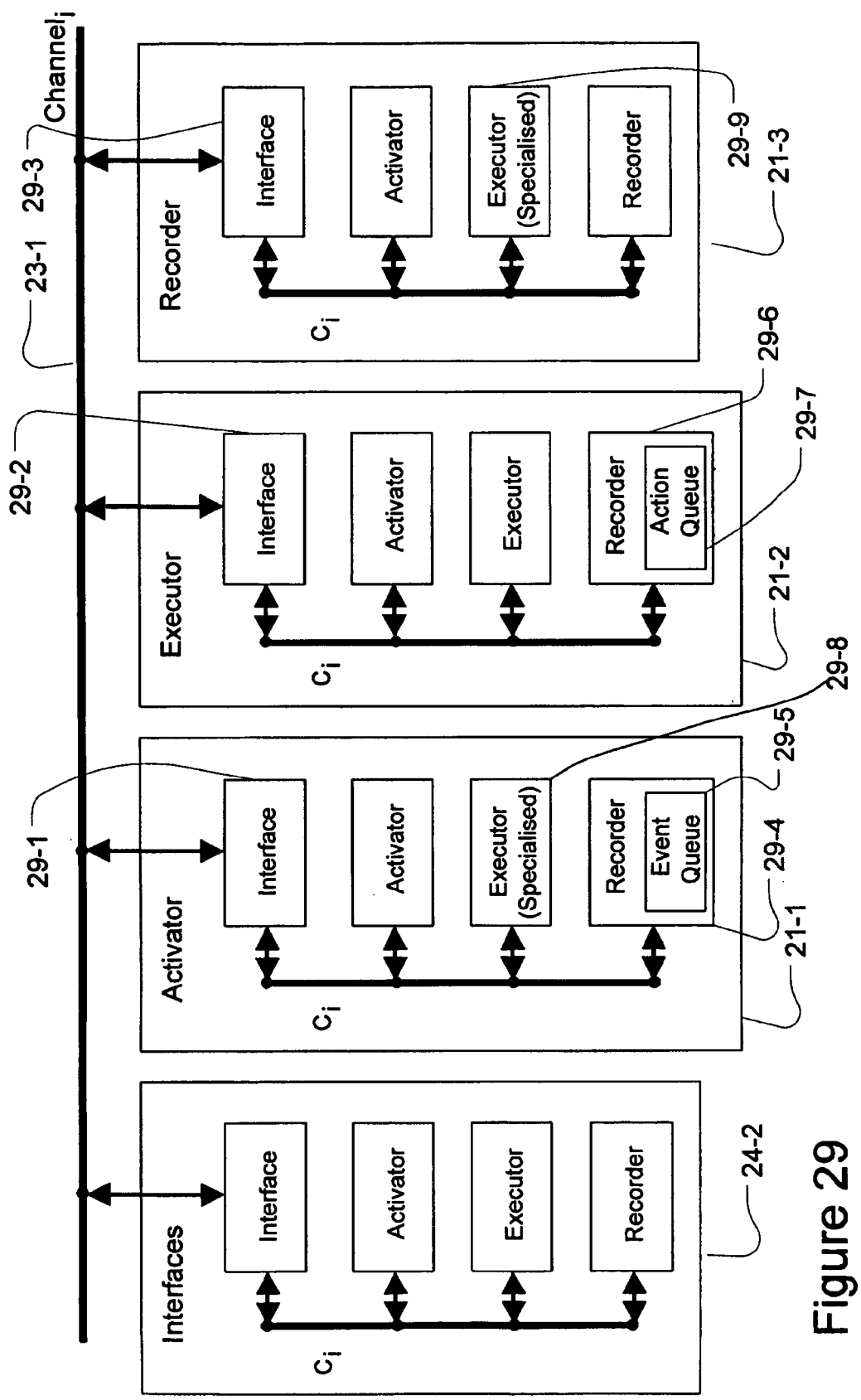
FIG. 29 illustrates an implementation of an electronic root meta-actor using multiple processors according to the invention.

A root meta-actor based computing device can also be constructed using multiple processors. This is shown in FIG. 29. The structure here is the same as that for the computing device of FIG. 28, but each of the activator 21-1, executor 21-2 and recorder 21-3 are replaced by (that is, are constituted by) another copy of the computing device illustrated in FIG. 28. Each of the activator 21-1, executor 21-2 and recorder 21-3 are connected to the channel 23-1 by a respective interface 29-1, 29-2 and 29-3. Some modifications to this described architecture can be made, namely that a recorder 29-4 included within the activator 21-1 is restricted to event queues 29-5, and a recorder 29-6 contained within the executor 21-2 is restricted to action queues 29-7. Also, an executor 29-8 contained within the activator 21-1 and an executor 29-9 within the recorder 21-3 may optionally be restricted to specialist actions required by those actors.

The Activation, Execution and Recording cycles for the multi-processor root meta-actor based computing devices shown in FIG. 29 are similar to those for the single processor implementation described above. However, in this case, each of the Activator 21-1, Executor 21-2 and Recorder 21-3 explicitly has a dedicated processor with its own Activator, Executor and Recorder, together with internal Channels and Interfaces to the higher level Channel 23-1 connecting all components of the multi-processor device. This allows the design of the Activation, Execution and Recording cycles to be specialised. For example, the Recording cycle within the Activator's Recorder 29-4 can be specialised to dealing with the management of events in an event queue, and the Execution cycle within the Activator's Executor 29-8 can be specialised to those actions required for identifying and initiating actions and triggering parent events, as described in the model in FIG. 18.

Figure 30:
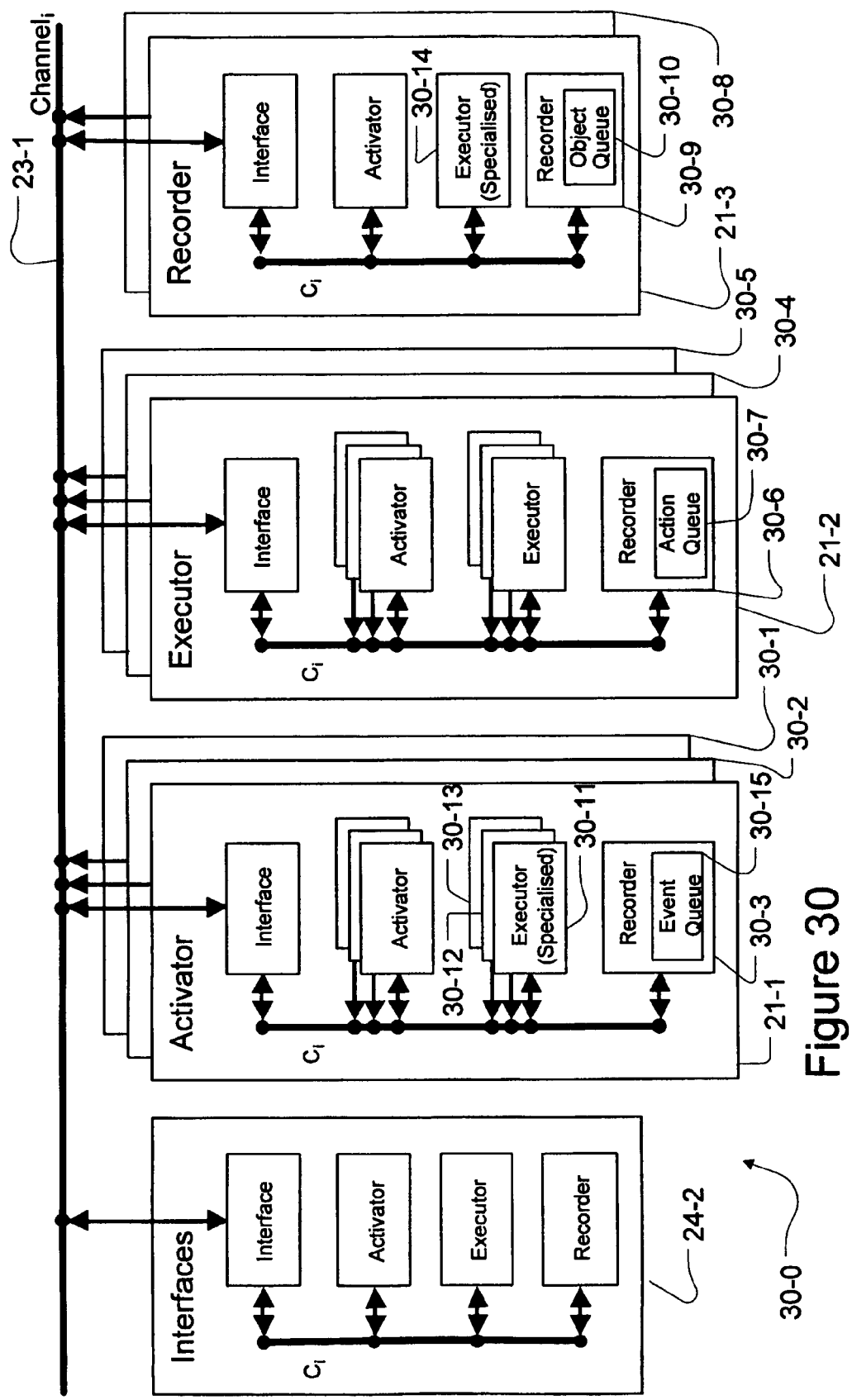
FIG. 30 illustrates an implementation of an electronic root meta-actor using micro-parallel architecture according to certain aspects of the invention.

FIG. 30 shows how plural elements can operate together to form a more sophisticated actor. Here, a root meta-actor based computing device 30-0 using micro-parallel processing includes plural activators 21-1, 30-1 and 30-2 connected bi-directionally to the channel 23-1. Each activator 21-1, 30-1 and 30-2 includes a recorder (the activator 21-1 is shown with a recorder 30-3). The recorder 30-3 includes an event queue 30-4. The other activators 30-1 and 30-2 are constructed in the same way. Although not shown, each activator 21-1, 30-1 and 30-2 can include more than one recorder. Plural executors 21-2, 30-4 and 30-5 are connected bi-directionally to the channel 23-1. Each includes a recorder 30-6, and each recorder includes an action event 30-7. Two recorders 21-3, 30-8 are connected bi-directionally to the channel 23-1. Each includes a recorder 30-9, and each recorder includes an object queue 30-10. Each queue 30-3, 30-7 and 30-10 provides events, actions and objects respectively on demand, on a first-in, first-out basis. The channel 23-1 is bi-directionally connected to the interface 24-2. The connection of the various components to be channel 23-1 avoids requiring them to be located at the same place so allows them to be physically distributed.

The recorder 30-3 contained within the activator 21-1 includes an event queue 30-15. The recorders (not shown) in the other activators 30-1, 30-2 do not contain event queues. Similarly, the recorder 30-6 contained within the executor 21-2 includes an action queue 30-7. None of the recorders (not shown) in the other executors 30-4, 30-5 include an action queue. The recorders in the activators 21-1, 30-1, 30-2 do not contain object or action queues. The recorders in the executors 21-2, 30-4, 30-5 do not contain object or event queues. Also the executor or executors 30-11, 30-12, 30-13 within the activators 21-1, 30-1, 30-2 (there are plural executors in each activator) and the executors 30-14 within the recorders 21-3, 30-8 may be restricted to specialist action required by those actors. Thus, parallel processing is enabled by multiple activators, executors and recorders each sharing a common event, action and object queue respectively, enabling activity to be sourced from and processed by multiple processors simultaneously.

Multiple action queues 30-7, event queues 30-15, and object queues 30-10 are needed where plural executors 21-2, activators 21-1 and recorders 21-3, respectively are not collaborating. Optionally, each executor, activator and recorder can have an associated queue, and queues are disabled as required so that only one queue in a set of collaborating executors, activators or recorders is used at a given time.

Devices based on the architecture described in FIG. 30 may have all their components combined into a single physical housing. Alternatively, collections of components may be physically remote from one another, as in a distributed computer system.

The root meta-actor based approach described with reference to FIG. 30 allows parallel architectures to be employed, and for them to be exploited for improved performance without any need to adapt the system model from the original problem domain. This is achieved even though the program counter of the conventional Von Neumann type architecture is no longer required, and thus frees the hardware from the sequential/serial paradigm which dominates prior art computer architectures. The root meta-actor in this approach also has advantages over other prior art computer architectures which do not use the Von Neumann approach. In particular, concurrency in the root meta-actor based model is derived from the fundamentally event-driven nature of the system model which it implements. This is in contrast to the Concurrent Sequential Process model which remains grounded in the sequential paradigm, i.e., each processor operates on a essentially sequential machine which limits the granularity of the parallelism which it can support. Also, dependencies between actions in the root meta-actor based model are through events which are explicitly defined and dynamically created. This offers greater flexibility and broader application than the prior art Dataflow model. Although the Dataflow model also eliminates the program counter, enabling more granular parallelism, the events which drive actions are implicit and predetermined by a complier, which queues functions to be initiated on receipt of matching tokens. The toot meta-actor based model also provides improvement over the Actor model, which initiates actions only in response to the receipt of a message. As message receipt is the only type of event which can initiate action in an Actor model, its applicability to real-world, event-driven systems is limited.

In addition, root meta-actors which have their meta-models and root meta-models embedded in the event-driven model driving their primary process are capable of supporting well defined and highly adaptable systems, since any of the models can be adapted without recourse to offline, specialist programming, statically translated across semantic gaps. This is in contrast to Object Oriented approaches, for example, in which, at best, meta-models are incomplete, only available to specialist developers and unavailable for adaptation during system operation.

Figure 31A:
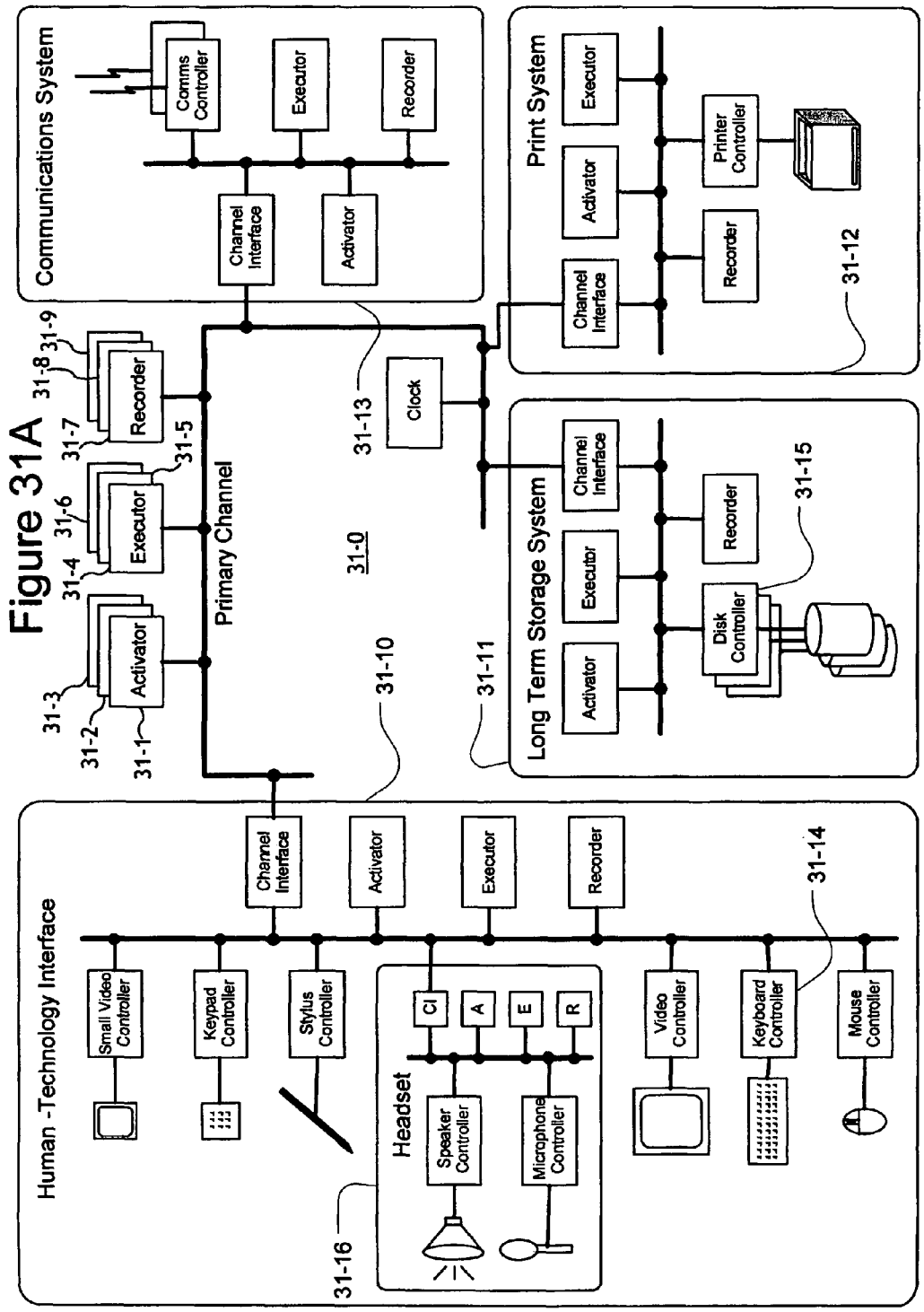
FIG. 31A illustrates an implementation of an integrated personal computing system employing the micro-parallel architecture illustrated in FIG. 30.

FIG. 31A shows how the massively parallel architecture described in FIG. 30 can be configured to provide a tightly- or loosely-coupled integrated personal computing system 31-0. In this configuration, one or more Activators 31-1, 31-2, 31-3, Executors 31-4, 31-5, 31-6 and Recorders 31-7, 31-8, 31-9 provide the primary processing capability of the system, capable of supporting several concurrent, and perhaps massively parallel, event-driven models simultaneously. The major interfaces of the system (i.e. a Human-Technology Interface 31-10, a Long Term Storage System 31-11, a Print System 31-12 and a Communications System) are here provided by further root meta-processor based machines. Each of these root meta-processor based machines contains at least one Activator, Executor and Recorder connected via a Channel as shown, together with further interfaces both for connecting to the primary internal channel of the core processor and for connecting to dedicated peripheral interfaces, such as a keyboard controller 31-14 of the Human-Technology Interface 31-10 or a Disk Controller 31-15 of the Long Term Storage System 31-11. Distributing this interface activity to dedicated interface processors 31-14, 31-15 frees the core processor from being involved in such activities (unlike in a conventional Von-Neumann processor), significantly increasing the throughput of the primary processor. In this case, the activators 31-1, 31-2, 31-3, the executors 31-4, 31-5, 31-6 and the recorders 31-7, 31-8, 31-9 acting together constitute the primary processor. The processing power of this configuration 31-0 could be further distributed, for example, by combining associated devices such as the speaker and microphone into a headset 31-16 with its own root meta-processor. This would allow the headset 31-16 to undertake some aspects of the aural/oral interface, such as voice recognition or voice synthesis, without even involving the wider Human-Technology Interface 31-10. Appropriately configured, such an integrated personal computing system 31-0 could offer the features of a conventional personal computer (PC), a mobile telephone, a personal digital assistant (PDA) and a digital watch without the device and data redundancy which undermines the present-day collection of poorly integrated devices.

Figure 31B:
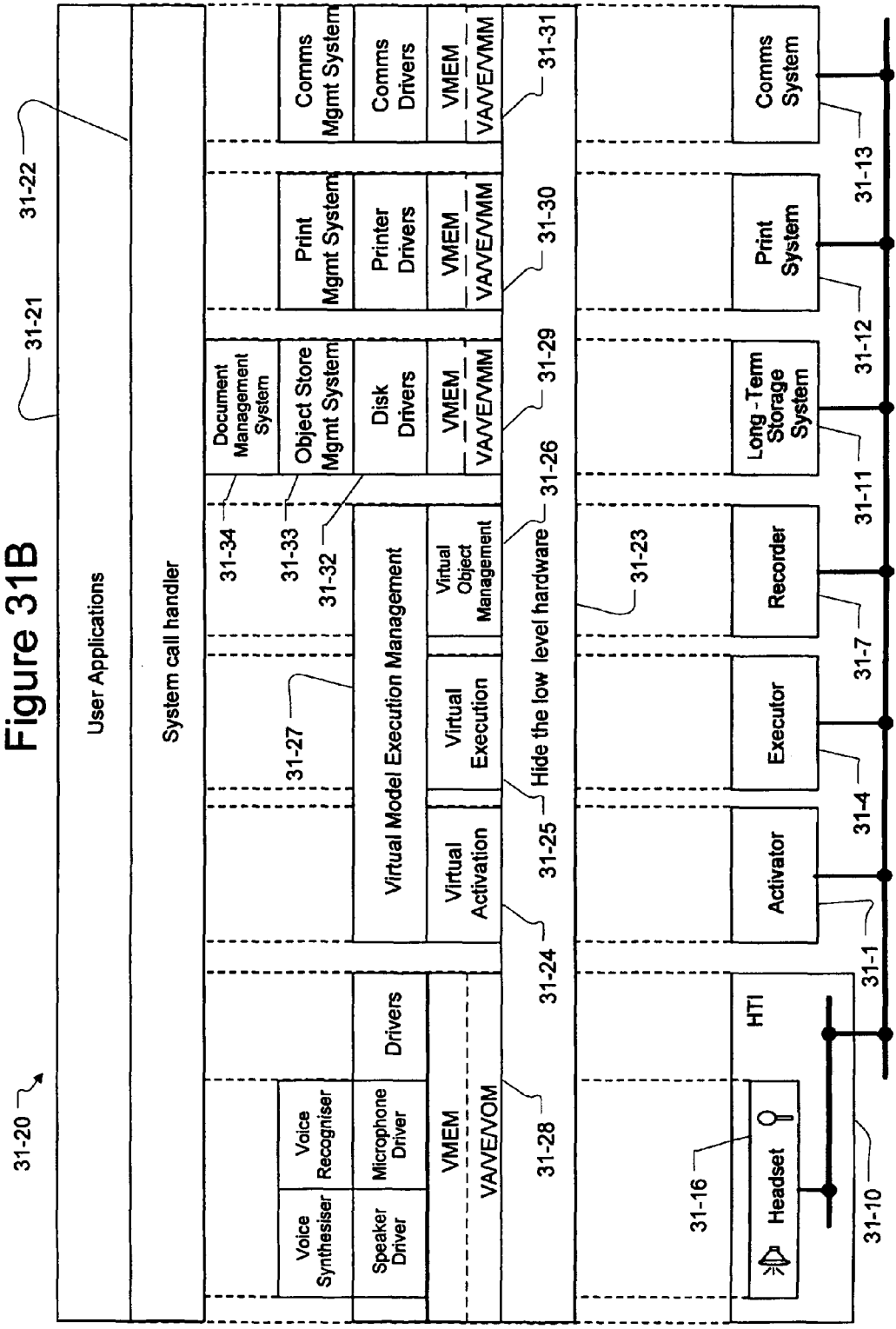
FIG. 31B illustrates an implementation of an operating system to control the integrated personal computing system illustrated in FIG. 31A.

FIG. 31B shows how an operating system 31-20 might be designed for such a root meta-processor based integrated personal computing system 31-0. The bottom layer of the diagram shows selected elements of the integrated personal computer hardware configuration shown in FIG. 31A, connected by Channels. Above them are the layers of the operating system which are common to all, or distinct to each, processor type. The User Application 31-21, System Call Handler 31-22 and Hide the low-level hardware 31-23 layers are similar or common across all processor types, and are similar to the equivalent layers in a conventional layered operating system (see FIG. 5). The key differences to conventional layered operating systems are in the intermediate layers. The Virtual Activation, Virtual Execution and Virtual Object Management layers 31-24, 31-25, 31-26 each provide an implementation of the behavioural models for the Activator 31-1, Executor 31-4 and Recorder 31-7 respectively, based on the generic models described in FIG. 18. Above them, in the core processor, is a Virtual Model Execution Management layer 31-27, which provides for multiple models to be in-process simultaneously, without adversely impacting one another. All other processor types also need a common platform of Virtual Activation, Execution and Object Management, as well as some elements of Virtual Model Execution Management, since each has a root meta-processor configuration at its core. These are indicated at 31-28, 31-29, 31-30 and 31-31 for the Human-Technology Interface 31-10, the Long Term Storage System 31-11, the Print System 31-12 and the Communications System 31-13 respectively. However, what sits on top of these foundation layers 31-28, 31-29, 31-30, 31-31 depends on the nature of the processor. For example, the Long Term Storage System 31-11 builds up layers of Disk Drivers 31-32, Object Store Management Systems 31-33 and, perhaps, Document Management Systems, depending on the nature of the objects being stored. Each layer 31-34, 31-33, 31-32 is dependent on the layers below to elaborate it, as described in FIG. 26. This approach removes unnecessary components from each processor type, allowing them to specialise as appropriate. It also allows the operating system 31-20 to be enriched with components often relegated to the user application layer in conventional layered operating systems. For instance, allowing the headset operating system 31-16 to specialise might incorporate a voice recognition element (not shown) which can be tuned to the voice of a single individual (the headset wearer) and interfaced to potentially multiple user applications within the integrated personal computing system 31-0.

Figure 5:
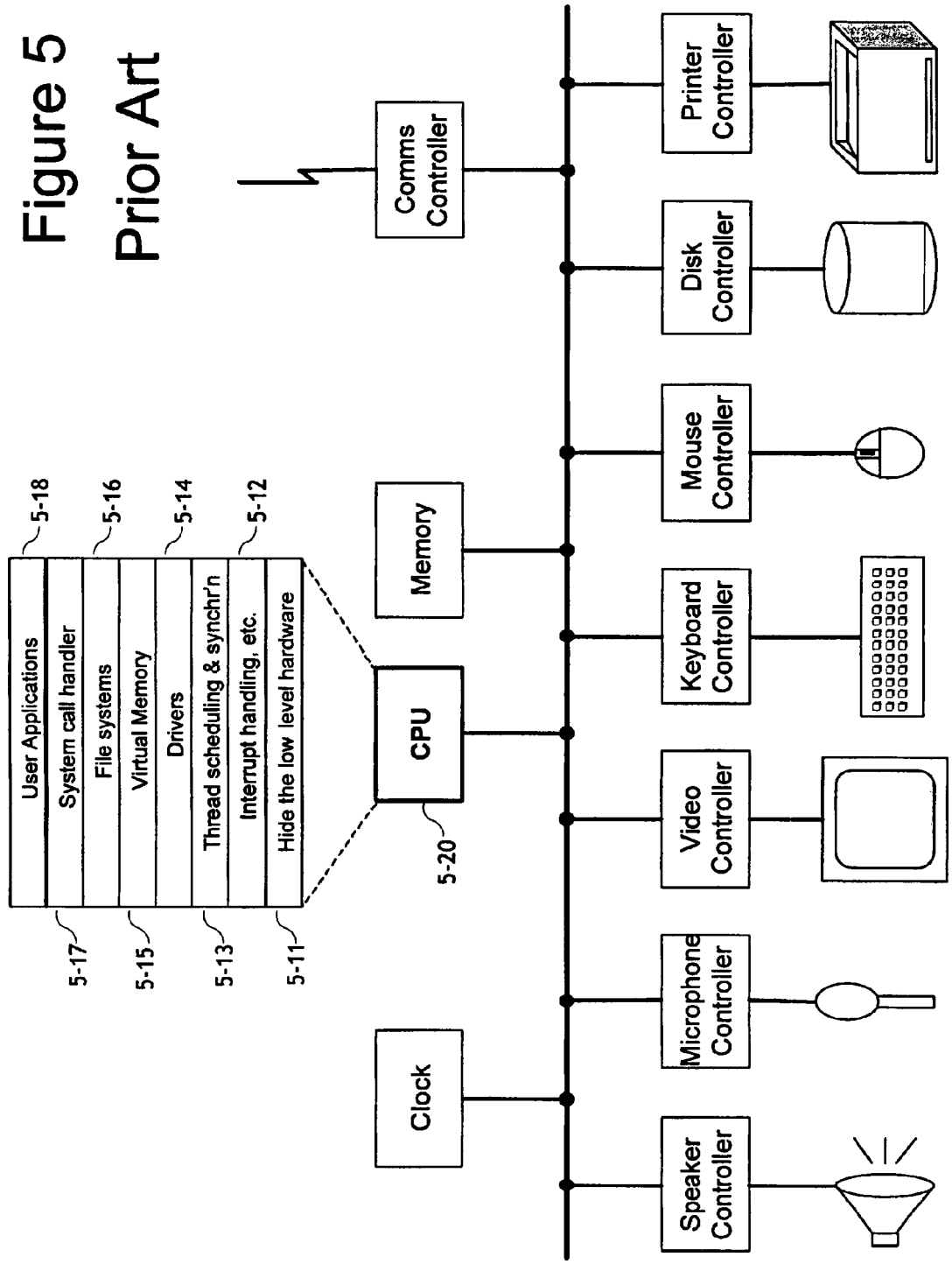
FIG. 5 illustrates a modern layered operating system according to the prior art.
Figure 6:
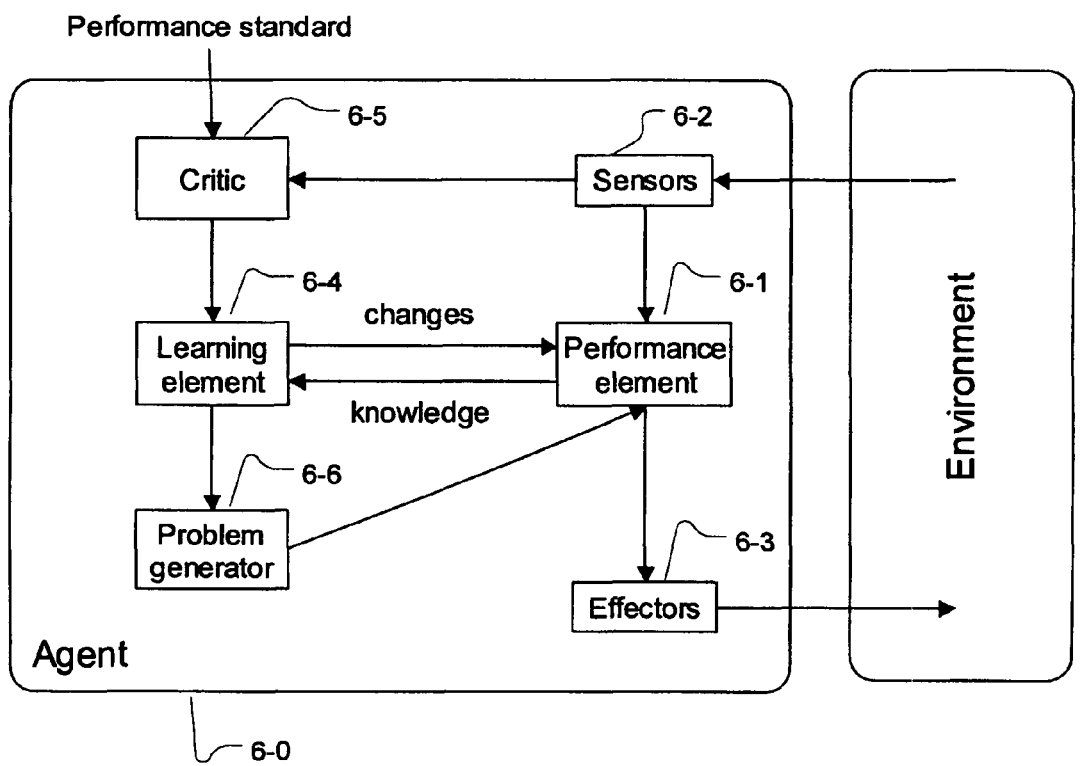
FIG. 6 illustrates a prior art generic learning agent.
Figure 8A:
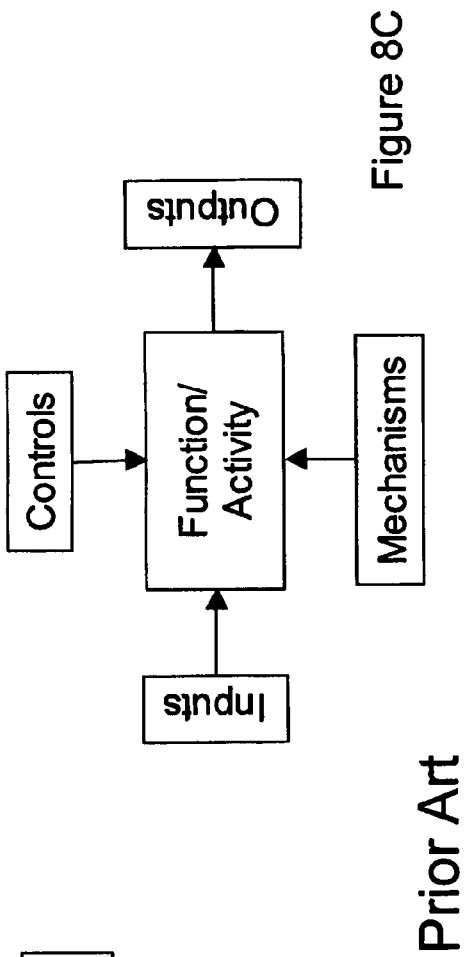
FIGS. 8A to 8D show known IDEF and UML models.
Figure 8B:
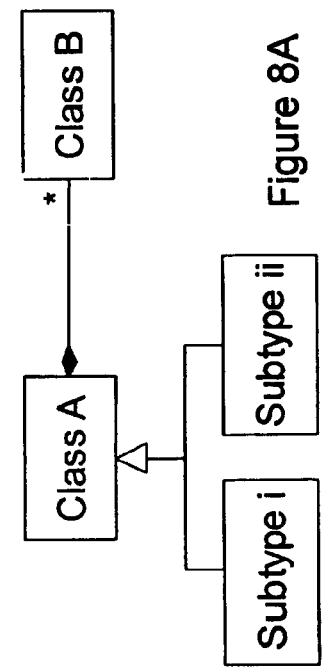
Figure 8C:
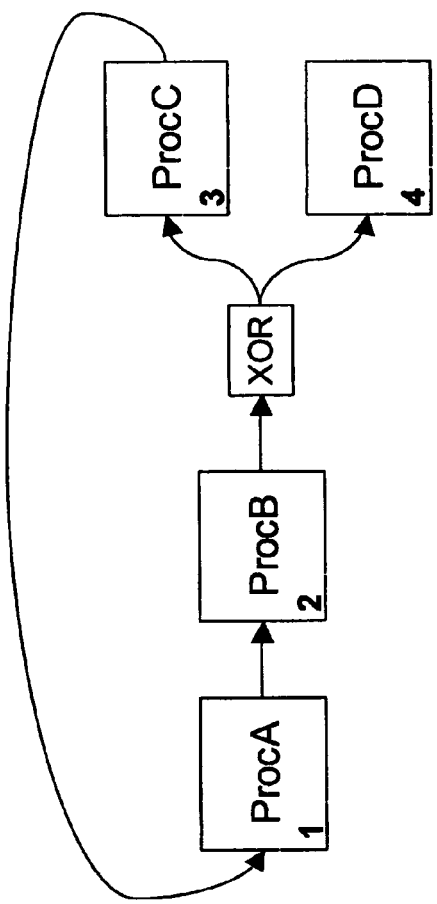
Figure 8D:
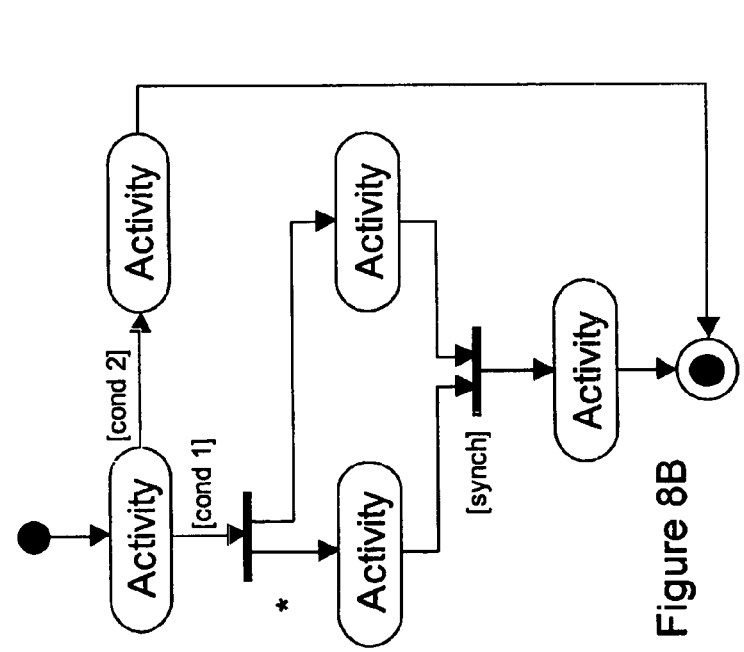

The operating system described in FIG. 31B contrasts with a conventional modern layered operating system design, as shown in FIG. 5, in which all the layers of the operating system are intermingled on a single processor (CPU). It also contrasts with previous designs for multiple processors, such as the known multi-processor, multi-computer and distributed computer configurations. In particular, due to the architecture of the root meta-processor, activity scheduling (conventionally "process" or "thread" scheduling) and activity synchronisation, which are the two key challenges for conventional multiple processor operating systems, are both considerably simplified, enabling a wide range of tightly- to loosely-coupled configurations of multiple processors, which would necessitate a considerable increase in complexity for arranging multiple processors of conventional Von-Neumann type processors. Activity scheduling is simpler since a sequential process context does not have to be switched in and out of the CPU as the Scheduler selects a new process to run. Activity synchronisation is simpler because, in contrast to a conventional sequential process driven by a clock cycle and an automatically incrementing program counter, the natural state of an event-driven model is to wait until an event, such as an input from another activity, is triggered.

The subject system of an operating system is a system of computer resources and/or virtual machines.

Figure 32A:
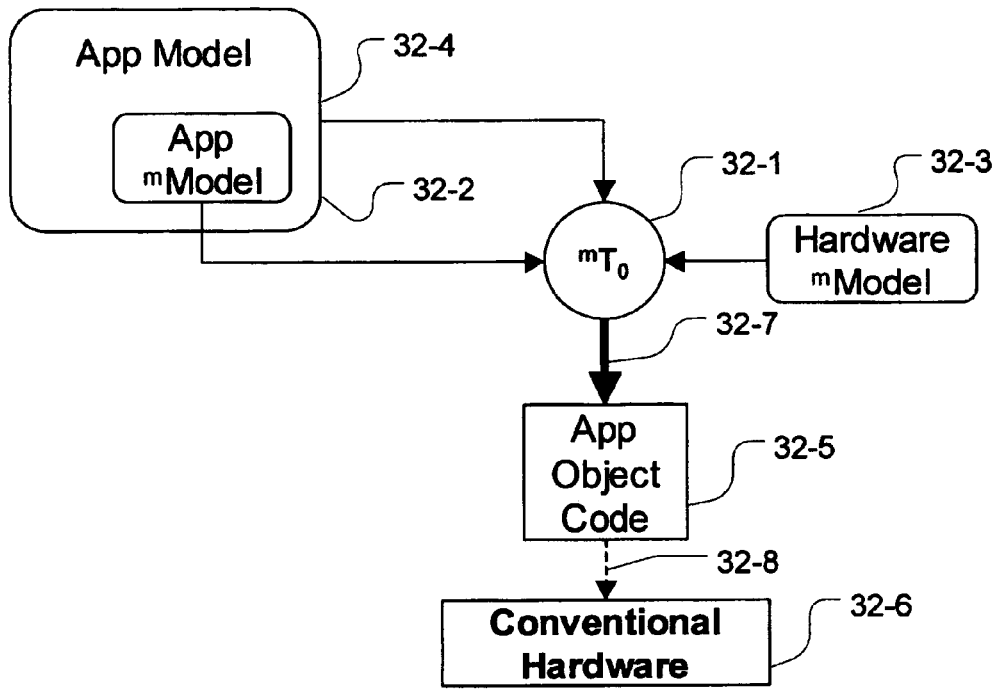
FIG. 32A illustrates a translation of a meta-actor statically onto conventional hardware according to certain aspects of the invention.

FIG. 32A shows one approach to elaborating a virtual root meta-actor on conventional (i.e. Von Neumann-type) computer hardware, employing static translation, such as compilation or interpretation. In this approach, a Meta-Translator 32-1 (i.e. a complier or interpreter) is created using an Application Meta-Model 32-2 together with a meta-model 32-3 for the underlying hardware. The Meta-Translator 32-1 contains rules similar to the Elaborator component of a Virtual Layered Meta-Actor, together with additional rules and constraints required in view of the sequential nature of the underlying hardware. One or more Application Models 32-4 can then be statically translated into Object Code 32-5 which can be directly executed on an underlying computer 32-6, just like any other compiled program. In this Figure, a translation 32-7 from the Meta-Translator 32-1 to the Object code 32-5 is static, and from there it is a dynamic elaboration 32-8 onto the hardware 32-6. Inputs to the Meta-Translator 32-1 are model inputs from the Application Model 32-4.

Here, the term "conventional computer" will be understood to include computers having a processor and memory coupled to a bus, and to include those having processors connected in parallel, such as supercomputers.

Figure 32B:
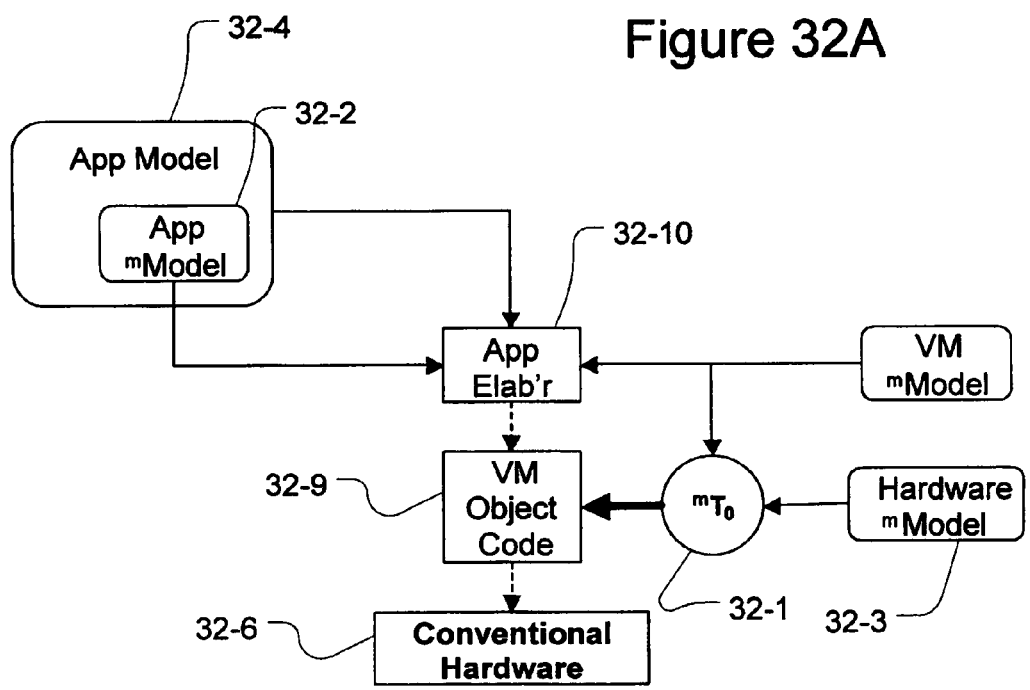
FIG. 32B illustrates the placing of a virtual elaboration machine onto conventional hardware, according to certain aspects of the invention.

FIG. 32B shows an alternative approach to elaborating a virtual root meta-actor on conventional (i.e. Von Neumann-type) computer hardware, employing a virtual elaboration machine. In this approach, the Meta-Translator 32-1 is again required, but on this occasion is used to create Object Code for a Virtual Machine (VM) which runs on top of the underlying computer 32-6. The VM creates a pseudo-root meta-actor machine on which Application Models can be elaborated, via a VM-specific Application Elaborator 32-10. There is static translation from the Meta-Translator 32-1 onto the VM object code 32-9, and dynamic elaboration from the dynamic elaborator 32-10 onto the VM object code, and from there onto the underlying computer 32-6. The Application Elaborator 32-10 and VM 32-9 together handle the semantic gap between the dynamic, parallel model, meta-model and root meta-model and the static, sequential nature of the underlying machine 32-6.

Whilst the massively micro-parallel processors described with reference to FIG. 30 could employ conventional software, this would impart restrictions on the benefits that could be obtained through the use of this architecture. Conventional software is fundamentally sequential, and reinforces the semantic gaps being the problem domain and the computer domain. It also requires translation in advance or at run time. This imparts limits on the flexibility in performance of the software.

Conversely, software employing the layered virtual actor model described above, particularly in relation to FIG. 26, is fundamentally fine-grained and parallel in nature. This eliminates semantic gaps, and requires only partial translation (as described below). This partial translation need not be performed in advance, but only at run time. Root meta-actor based software therefore is more flexible and is more capable of supporting increased performance.

Root meta-actor based software is different to conventional software in that only the elementary actions needs to be translated onto the underlying machine (translation is performed by the elaborator), and in that the elementary actions within a model at one level are each translated as a micro-event driven model, not a program, at the lower level. This micro-event driven model can itself be executed in parallel to other models, provided that the appropriate root meta-actor based hardware is available.

A root meta-actor based simulator is a special type of elaborator which enables the model to be executed against a proxy subject system to enable both the details and dynamics of the model to be explored without impacting the intended subject system. In addition to the features of an elaborator described above with reference to FIGS. 26 and 27, a simulator includes rules for handling: the relationships between simulation, physical and wall-clock time; the distribution of internal and external events, for example the frequency of customer orders or the proportion of orders expected for different product specifications; the creation and deletion of simulated actors, and their assignment and reassignment of roles within the model being simulated; and the assignment and elaboration of simulated actors to actual physical actors within the simulation system. The latter is particularly important in a simulation which takes place on top of a distributed, micro-parallel architecture hardware such as that shown in FIG. 30. A distributed system might be used in, for example, a war gaming situation, in which different units are located at different places. Here, there can be multiple sets of micro-parallel hardware, each set being at a different physical location. One or more simulated actors is handled by each node of the physical simulation system, and the simulation manager will have rules for routing messages between the different nodes as the simulated actors communicate with each other.

The root meta-actor based simulator approach enables simulation of the system dynamics directly from the model of the system. This makes simulation more accessible to business and technology change programmes, thereby increasing the likelihood that simulation will be used, with a consequent likely improvement in the quality and performance in implemented changes.

Both analytic simulators and digital virtual environments can be simulated on a root meta-actor based platform. This is of particular use during a business change project in which, once modelled, a particular process can be simulated to analyse its likely performance, and can then be taught to workers through a digital virtual environment employing the same model.

A root meta-actor based simulator also offers the opportunity for more sophisticated simulations than the prior art in two ways. Firstly, by enabling the creation and deletion of simulated actors during the simulation, the dynamics of complex systems can be explored directly from the details of the individual actor model. This is particularly useful for simulations in which there are dynamics within an actor group, such as is found with marketing and military applications. For instance, in a market simulation, the individual behaviours of customers can be modelled, including the way in which they might pass on information by word of mouth. The simulation can then create new actors as positive news is communicated or, conversely, delete actors as negative news is propagated or as a competitor increases market share. Secondly, simulations of models which include meta-models can readily include adaptation of the system's rules during the simulation run, which can be particularly useful in certain gaming, training or design workshop applications.

The conjunction of root meta-actor based simulators and root meta-actor based computing platforms eliminates the complexities associated with synchronisation between logical processes in a parallel implementation by exploiting the fine-grained parallelism of the massively micro-parallel architecture described above with reference to FIG. 30. A distributed system might also be used in, for example, a war gaming situation, in which different units are located at different places. Here, there can be multiple sets of micro-parallel hardware, each set being at a different physical location. One or more simulated actors is handled by each node of the physical simulation system, and the simulator must manage the routing of messages between the different nodes as the simulated actors communicate with each other. Although the synchronisation issues between simulation nodes which are physically and temporally remote remain, the use of a root meta-actor based simulator removes other complexities, simplifying the implementation of parallel and distributed simulations.

The subject system of a simulator is an artificial replica of an intended or real-world subject system, for the purpose either of collecting and analysing data about the actor's dynamic performance or of creating at least a component of a digital virtual environment. The artificial replica will usually involve some management of simulation time to allow it to be significantly faster or slower than would be the case in the intended or real-world subject system.

Figure 33:
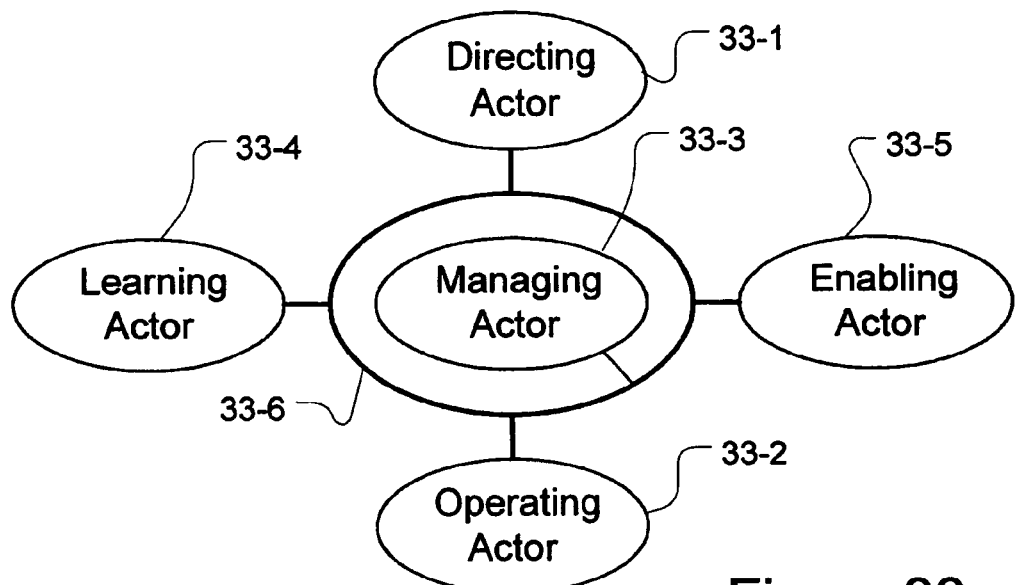
FIG. 33 illustrates the components of a designed self-adaptive system according to aspects of the invention.

Applications of the invention to systems which are self-adapting will now be described. A high level self-adapting system is illustrated in FIG. 33. Here, a directing actor 33-1, an operating actor 33-2, a managing actor 33-3, a learning actor 33-4 and an enabling actor 33-5 are each connected to a communication channel 33-6. Each of the five illustrated actors can be a root meta-actor as described above. The operating actor 33-2 performs a core operation, sometimes called the "transformation process". The directing actor 33-1 provides an overall direction, in terms of purpose, performance goals and constraints. The managing actor 33-3 plans, monitors and controls the operation of the system, in light of the direction provided by the directing actor 33-1. The learning actor 33-4 allows the self-adaptive system to learn, in order that the overall system may improve or maximise its performance. The enabling actor 33-5 has the function of acquiring or developing the actors which enable the system to effect all its other activities. In this context, the actors acquired or developed by the enabling actor 33-5 might be humans, machines, software, etc.

The self-adaptive system might be a "viable enterprise" e.g. a system which has the aim and purpose of making a profit for its owners (i.e. a business).

Alternatively, the self-adaptive system could be a "viable intelligent agent", as discussed in more detail below.

The subject system of a self-adaptive actor is similar to the subject system for a simple or composite actor.

Figure 34:
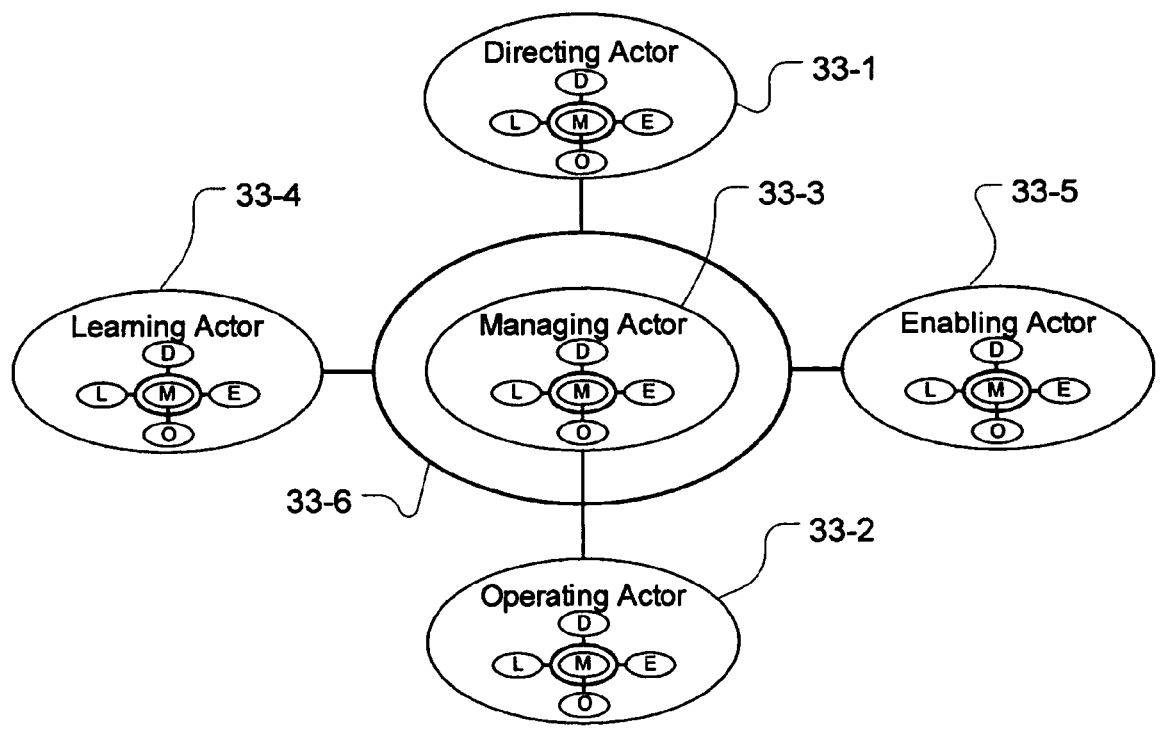
FIG. 34 illustrates the FIG. 33 system with further recursion.

FIG. 34 shows how each of the directing actor 33-1, the enabling actor 33-5, the operating actor 33-2, the learning actor 33-4 and the managing actor 33-3 may include their own respective self-adaptive system. This can be considered as a recursive self-adaptive system.

The subject system of an operating actor 33-2 is the same subject system as for the composite, self-adaptive actor—i.e. it is the operating actor component of the self-adaptive actor which actually operates on the subject system of the self-adaptive actor. The subject system of a directing actor 33-1 is the system of purposes and performance goals for a self-adaptive actor. The subject system of a managing actor 33-3 is a system of plans and monitoring metrics for a self-adaptive actor, based on the purpose and performance goals defined by a directing actor 33-1. The subject system of a learning actor 33-4 is a (meta-)system of models and meta-models employed by all actors within a composite, self-adaptive actor. The subject system of a enabling actor 33-5 is a system of actors capable of performing the duties of all actors within the composite, self-adaptive actor.

Figure 35:
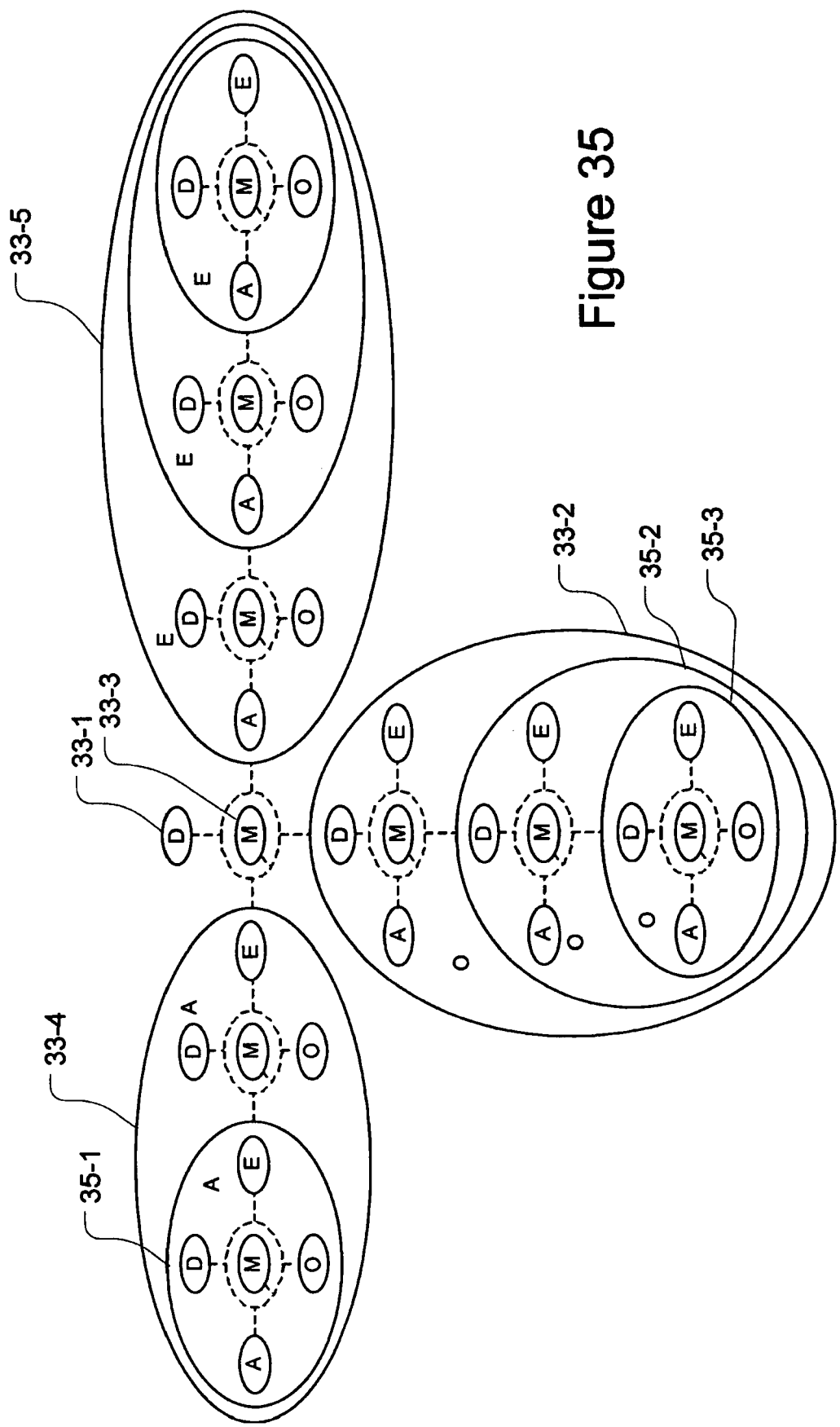
FIG. 35 illustrates the system of FIG. 34 with still further recursion.

A multiply recursive self-adaptive system is illustrated in FIG. 35. Here, the learning actor 33-4 includes a self-adaptive system including a learning actor 35-1 which itself includes a further self-adaptive system. Similarly, the operating actor 33-2 includes a self-adaptive system, an operator 35-2 of which includes a further self-adaptive system having an operating actor 35-3 which is a further self-adaptive system. It will be appreciated how this concept can be applied to multiple recursion within the enabling actor 33-5, the directing actor 33-1 and the managing actor 33-3. Although in the example of FIG. 35 it is the same actor which is subjected to recursion within a top-level actor, this is not necessary. Indeed, there can be recursion of multiple actors within the self-adaptive system forming one of the highest level actors.

A root meta-actor based artificial intelligent agent can be embodied in a set of co-operating virtual actors, each of the actors representing one of the actors shown in FIG. 33. This intelligent agent has a number of key differences to a conventional expert system inference engine. In particular, the model component can be considered as fully event-driven, rather than as using the conventional IF, THEN production rules. Also, the generic root meta-processor undertakes a partial scan of the rules of a model based on events generated in a previous cycle, which provides improved efficiency compared to a scheme in which a full scan of the rule base is performed every cycle, as occurs in conventional expert system inference engines. Furthermore, the search for new rules is performed by the learning actor 33-4. The outcomes of the new rules are then communicated through changes in the meta-models of the other actors 33-1, 33-5, 33-2, 33-3. In contrast to conventional expert system inference engines, a meta-actor based intelligent agent includes an enabling actor 33-5 which is capable of recruiting or developing actors to fulfil new roles, as the roles are identified by the learning actor 33-4, and could, given adequate authority, enable the entire artificial intelligent agent to become viable.

Providing a root meta-actor based intelligent agent with sensors and actuators, (for example, within a robot environment) allows the agent to have the real world as its subject system.

Figure 36A:
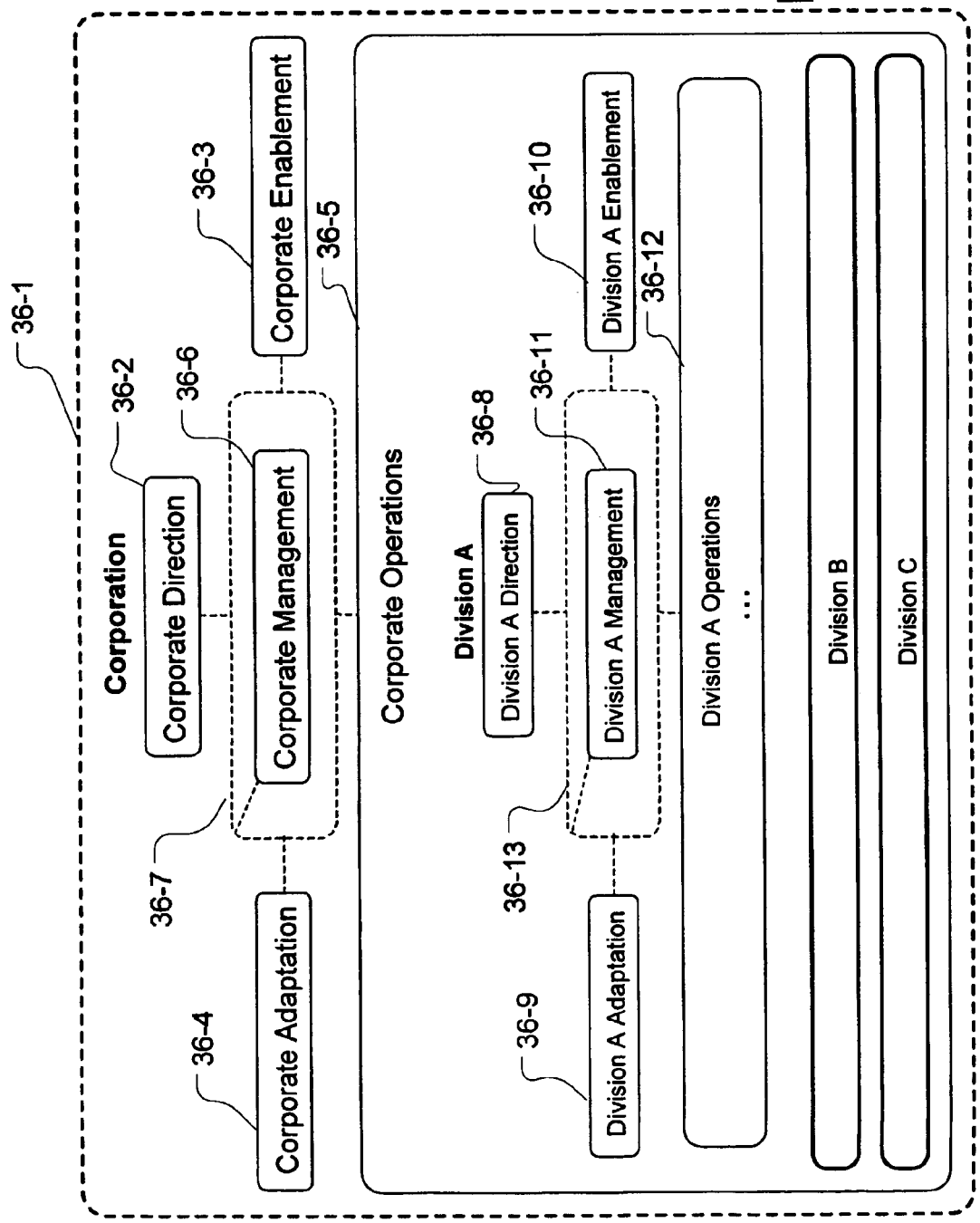
FIG. 36A and FIG. 36B illustrates a viable enterprise design according to certain aspects of the invention.

Regarding viable enterprise design, the root meta-actor based approach can be used to create a Corporation, as shown in FIG. 36A. Here, a corporation 36-1 includes a corporate direction actor 36-2, a corporate enablement actor 36-3, a corporate adaptation actor 36-4, a corporate operations actor 36-5 and a corporate management actor 36-6. Each of these actors 36-8 to 36-12 is connected to each of the other actors via a communication channel 36-7. The corporate operations actor 36-5, includes first, second and third divisions, labelled as Division A, Division B and Division C respectively. The first division, Division A is expanded to show a Division A direction actor 36-8, a Division A adaptation actor 36-9, a Division A enablement actor 36-10, a Division A management actor 36-11 and a Division A operations actor 36-12. Each of these actors within the first division Division A is connected to each of the other actors via a communications channel 36-13. The second and third divisions Division B and Division C include corresponding actors, although these are omitted from FIG. 36A for the sake of clarity.

The corporation 36-1 and the first, second and third divisions, Division A, Division B and Division C each can be considered as viable enterprises. The first to third divisions can be considered as distinct value chain enterprises.

Figure 36B:
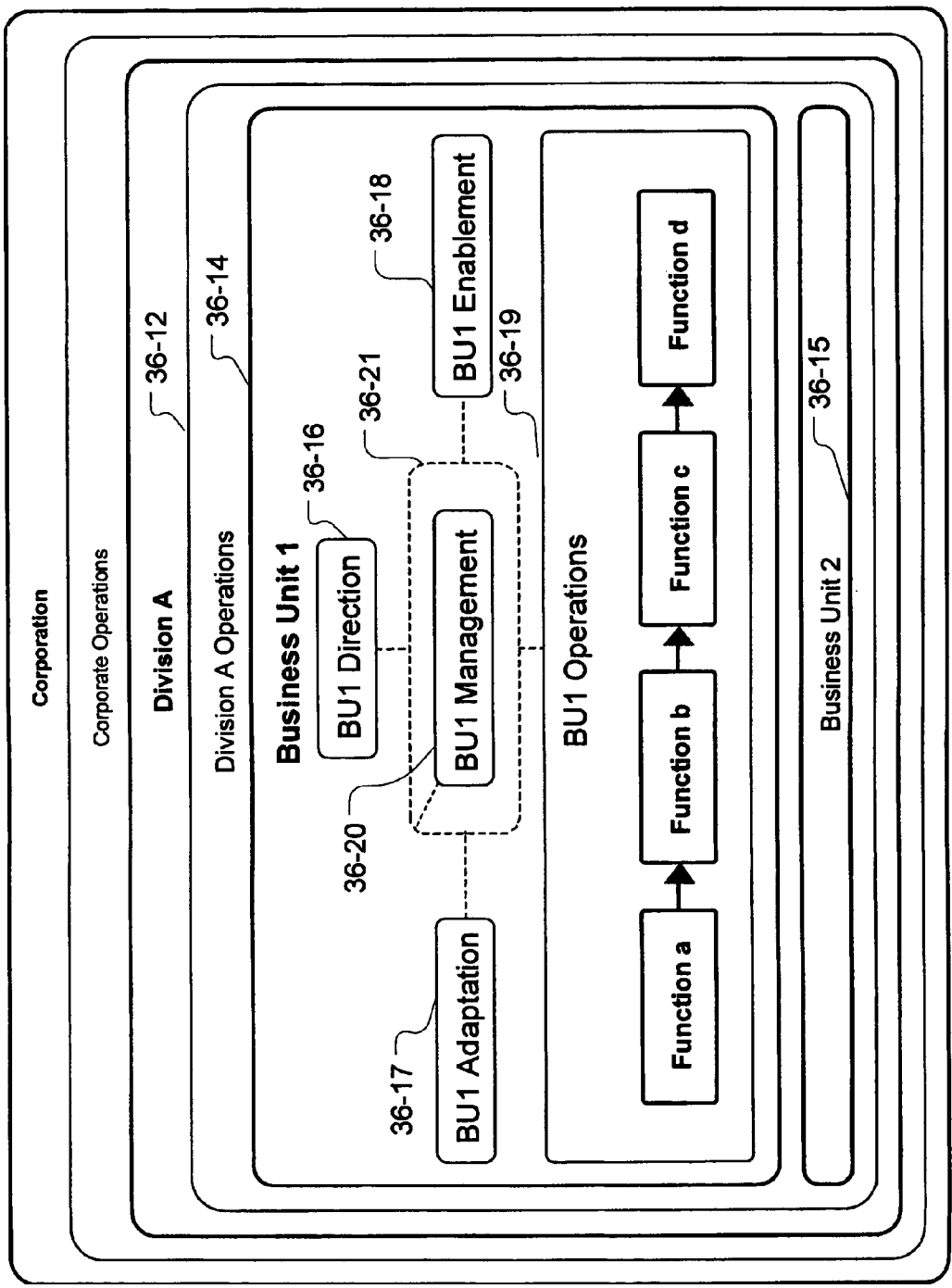

Further breakdown of the corporation 36-1 is shown in FIG. 36B. Here, the Division A operations actor 36-12 is shown to include first and second business units 36-14 and 36-15. The first business unit 36-14 includes a BU1 direction actor 36-16, a BU1 adaptation actor 36-17, a BU1 enablement actor 36-18, a BU1 operations actor 36-19 and a BU1 management actor 36-20. Each of the actors is connected to each of the other actors in the business unit by a communications channel 36-21. The BU1 operations manager 36-19 includes four serial functions, labelled function A to function D. The functions A to D can be considered as cooperating value chain enterprises.

In FIGS. 36A and 36B, the actors relate directly to the actors which are illustrated in FIGS. 33 to 35. The outcome of the activity of the Corporate adaptation actor 36-4 or the Division A adaptation actor 36-9 or the BU1 adaptation actor 36-17 is a set of meta-models for defining behaviour of the other actors at the same respective level.

In designing a viable enterprise, it is necessary to include a directing actor, a learning actor, a managing actor, an enabling actor, and an operating actor at least at the highest level, and preferably as well at one or more lower levels. It may be necessary also to determine what are the appropriate roles and responsibilities of similar functions in the same areas at different levels in the hierarchical structure, for example, in the corporation adaptation actor 36-4, the division adaptation actor 36-9 and the BU1 adaptation actor 36-17.

Figure 1:
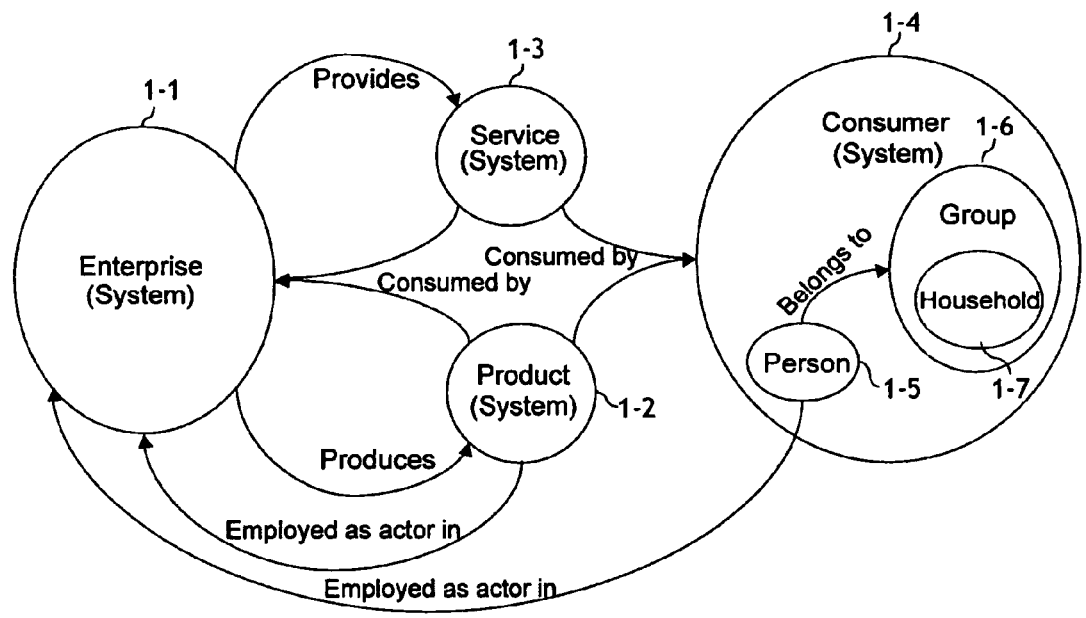
FIG. 1 is an illustration of real world adaptive or self-adaptive systems.
Figure 2:
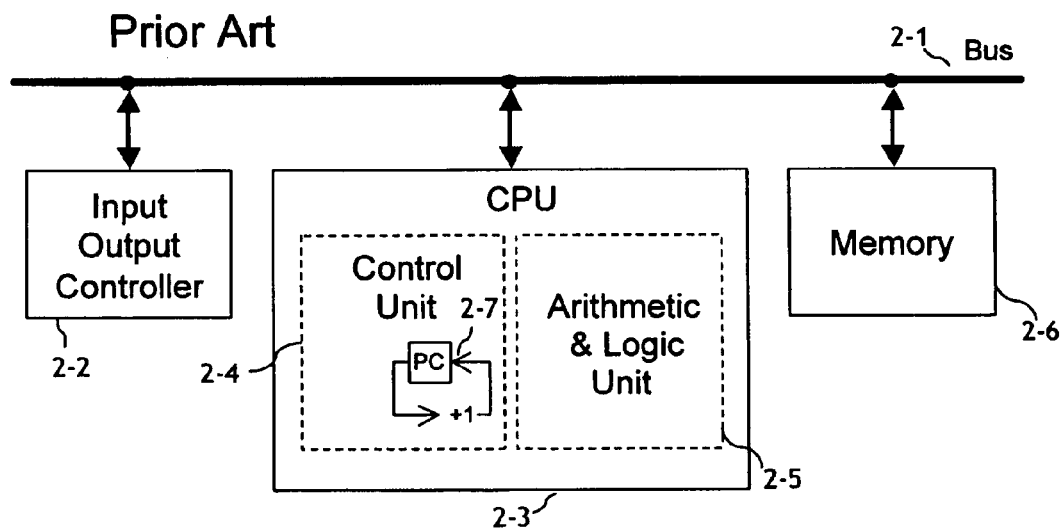
FIG. 2 shows the architecture of a prior art Von Neumann computer.
Figure 3:
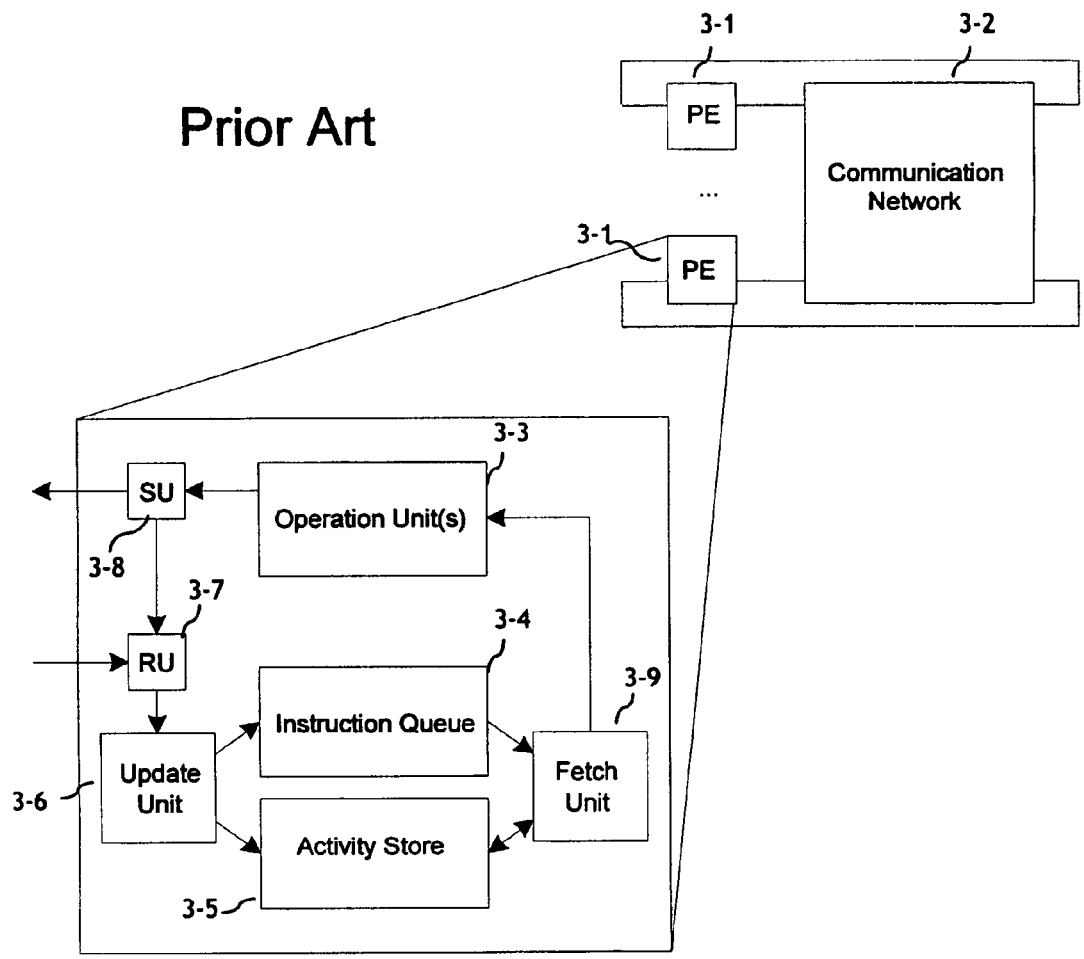
FIG. 3 shows a prior art dataflow machine.
Figure 4:
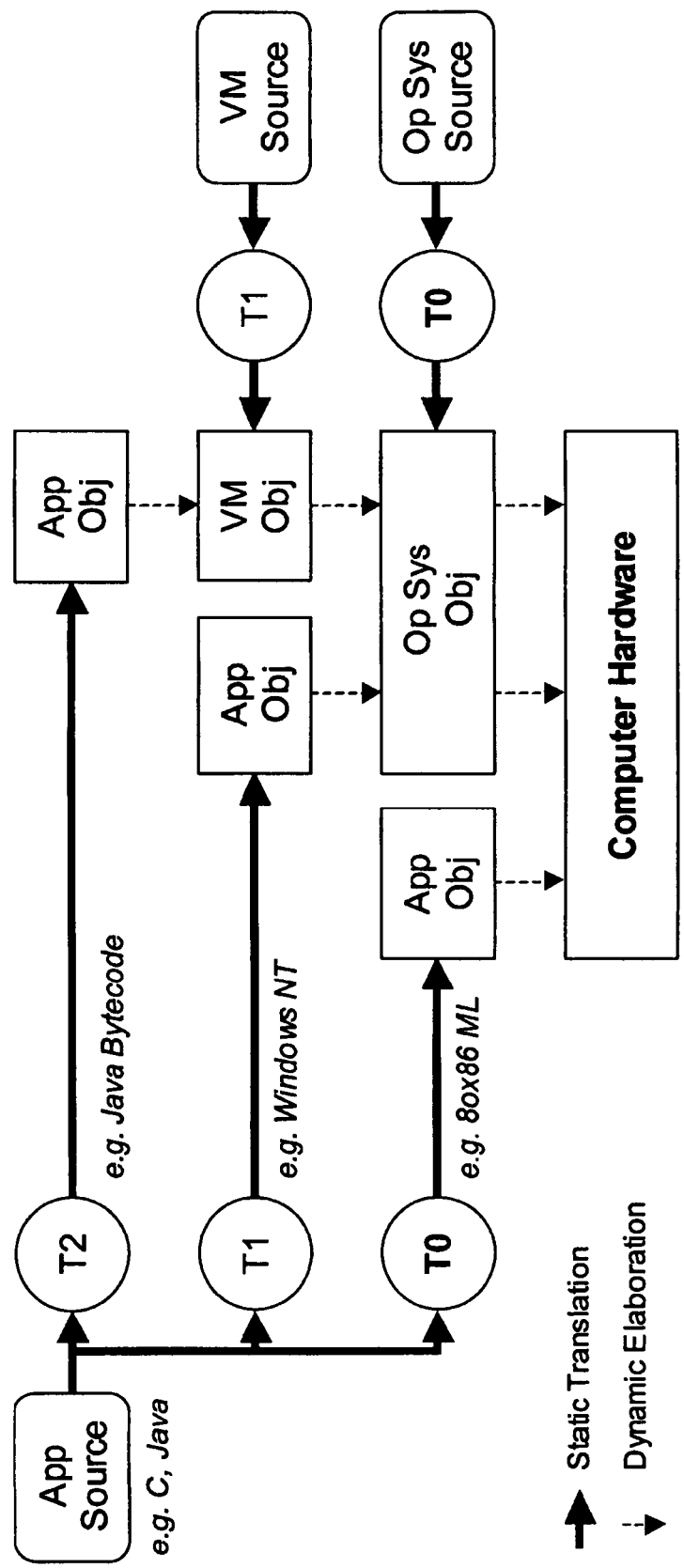
FIG. 4 illustrates systematically prior art software elaboration onto computer hardware.

Applying the root meta-actor based approach to system development, it is possible to establish a systems project as a viable learning system, which is directed, operated, managed, enabled and adapted to create or change a target system using the same mechanism as any other viable learning system. (Note that the word "system" is used here in all of the senses described earlier with reference to FIG. 1.) It is possible also to set up the system development project operation as four dependent activity systems, namely investigation, development, preparation and deployment systems. The investigation system is triggered by disruption to the system which is the target of the overall system development project. Its purpose is to understand some issue or opportunity, and to arrive at a model as to how it should be addressed. The development system is triggered by a defined requirement to change the target system from the investigation system. The development system designs, constructs and simulates that change. The preparation system also is triggered by a defined change requirement from investigation. The preparation system designs, constructs and simulates the temporary system by which the change will be deployed. The deployment system is triggered by completion of both the development and preparation systems. The deployment system executes the temporary system defined in the preparation system to implement the change to the target system defined in the development system.

The development and preparation systems are set up with similar patters of activity to the investigation system, namely modelling and simulation. The modelling pattern defines the rules by which the subject system will operate and assigns and elaborates actors to roles, each actor handling individual responsibilities within these rules. The simulation system both tests the details of the rules and roles modelled and analyses the dynamics of the resulting interactions.

Figure 37:
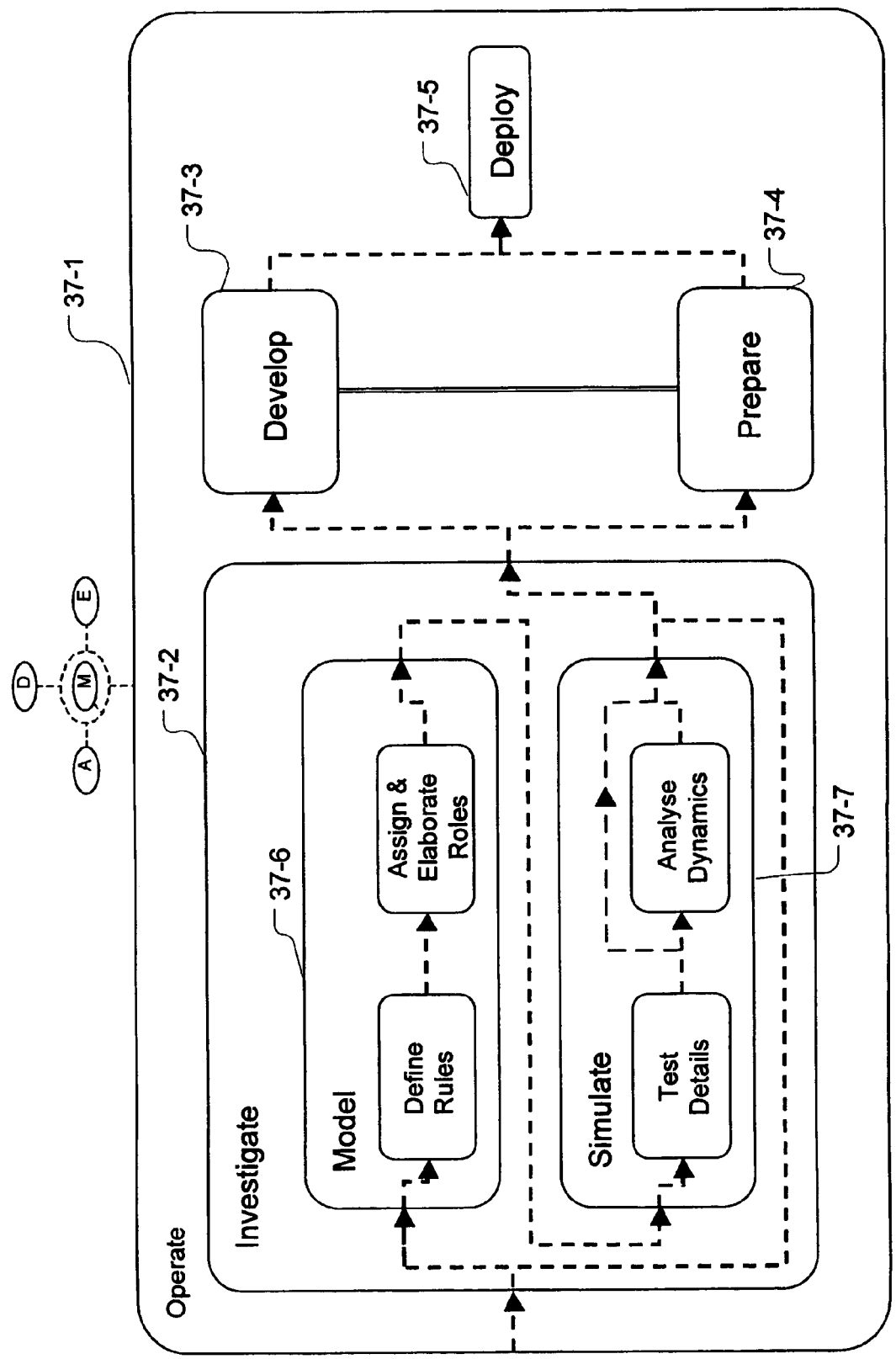
FIG. 37 illustrates a methodology according to the invention utilising root meta-actors.

This is illustrated in FIG. 37. Referring to FIG. 37 a self-adaptive system is shown in which an operating actor 37-1 includes an investigation system 37-2, a development system 37-3, a preparation system 37-4 and a deployment system 37-5. Within the investigation system are included a modelling system 37-6 and a simulation system 37-7. In the modelling system, rules are defined, and roles are assigned and elaborated. In the simulation system 37-7, details are tested and dynamics are analysed. The development and preparation systems 37-3, 37-4 also include model and simulation systems 37-6, 37-7, although these are omitted from the Figure for sake of clarity. The development and preparation systems 37-3, 37-4 are connected in parallel to the output of the investigation system 37-2. The development and preparation systems 37-3, 37-4 also are connected to each other so that they may interact with each other. Each of these systems has an output connected to the deployment system 37-5.

The key differences between the investigation, development and preparation activity systems are what is being modelled and simulated. For the investigation system, it is a problem or an opportunity within the target system which is being modelled and simulated. The purpose of the investigation is to obtain sufficient understanding of what needs to be changed in order to initiate development and preparation. For the development system, the change to the target system is itself being modelled and simulated. For the preparation system, it is the system by which the change will be deployed that is being modelled and simulated. The preparation system is a temporary system which exists only during the transition between the current state and the future state of the target system. However, the preparation system may exist for several months or more where the change is for example a significant change to a large corporation, which may involve training and new roles and responsibilities, hardware and software sourcing and set up, etc.

Although effecting action in different systems, the development and preparation activity systems need to interact with one another. The preparation system needs to know what is going to be deployed, and the development system needs to consider the deployment implications of different designs options and, where appropriate, change its approach to minimise the deployment effort or risk.

Figure 9A:
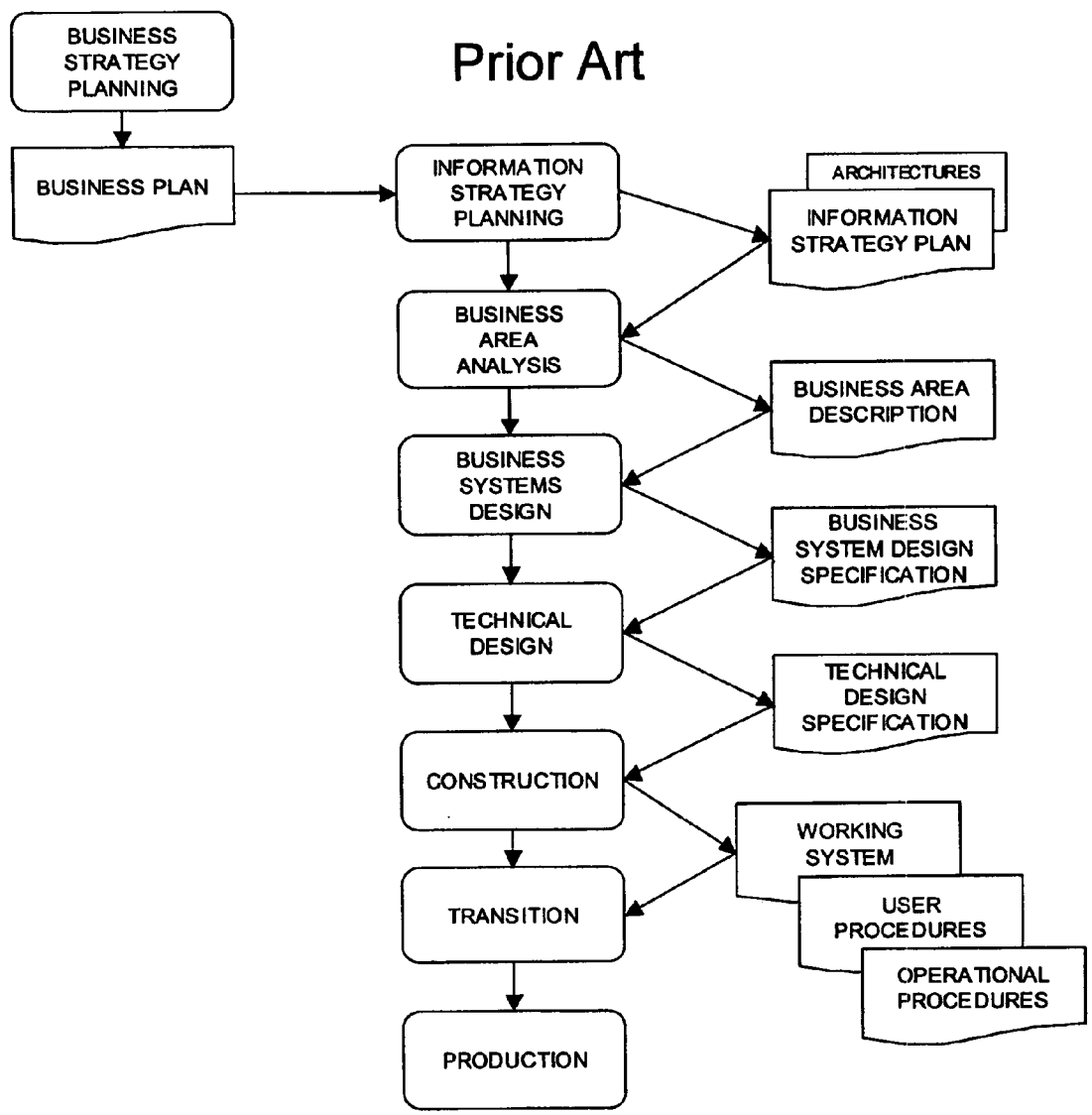
FIG. 9A shows prior art Information Engineering Methodology.
Figure 9B:
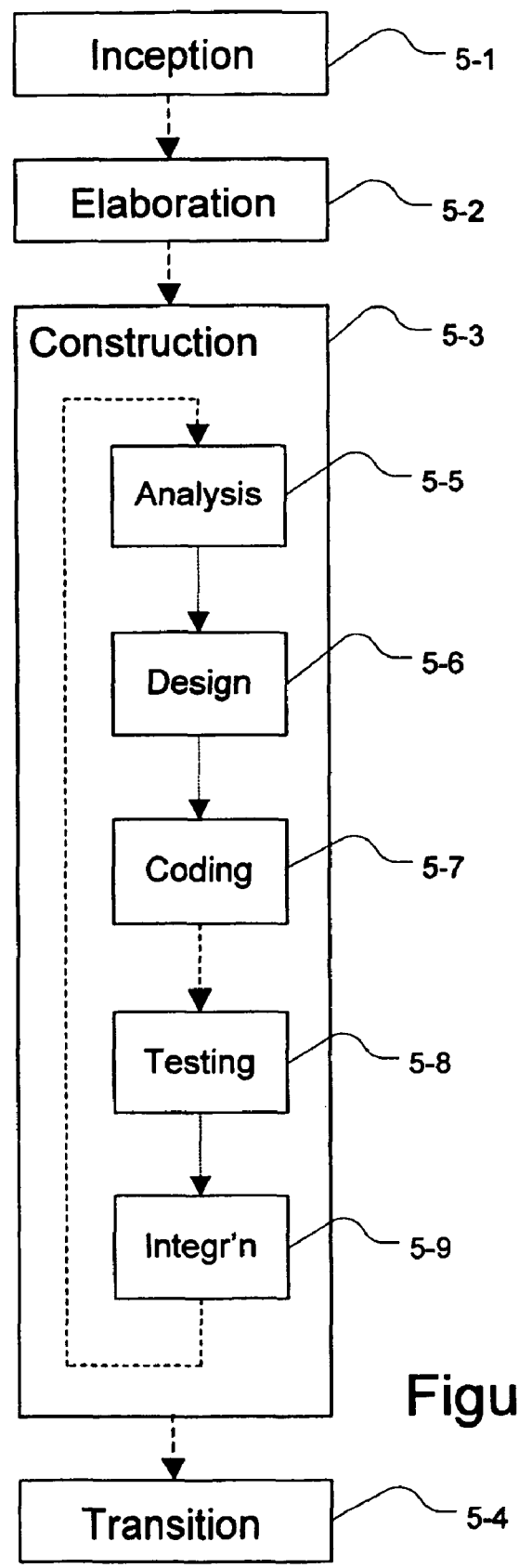
FIG. 9B illustrates schematically generic object-oriented methodology according to the prior art.

This system development methodology is event driven, rather than flow driven as is found in prior art system development methodology (see FIGS. 9A and 9B). It is also meta-model based, which can be used to define classes of projects which can be re-used. The system development methodology is also a learning system, and thus can learn to act in order to improve its performance. The methodology also incorporates layered virtual actors, from hardware architecture to high level design.

Compared to conventional approaches, the above described systems development methodology incorporates an integrated model, does not include semantic gaps between the problem and implementation domains, does not require the translation of models at one stage to models at a later stage; instead it is needed only to provide elaborators for one or more virtual actors in the lower layers of the architecture. Also, the same activities and techniques do the same thing at different stages and within different domains, for example in software, hardware and process domains. This allows the taking of the decisions concerning the assignment of roles to different types of actors (for example humans, or software, or hardware) later in the cycle than is found in a conventional methodology, which enables greater flexibility. It also offers the potential of reusability to be realised, and the benefits thereof to be obtained, since the layered, event-driven meta-models which drive all the systems involved can be more suitable as a basis for creating generic, reusable components.

The subject system of a system development methodology is a system of system change, including complex technical and socio-technical system change.

The following are general comments, which apply to all the above embodiments, and are made with reference to FIGS. 22A and 22B which act as keys to some of the other Figures.

In root meta-models, all types of activity systems are modelled in terms of objects, events and actions of the subject system. The activity is then shared amongst actors. To obtain maximum benefit, modelling at the meta-level maximises the flexibility and reusability of each model. In modelling activity systems, it can be helpful to appreciate that an object can be a representation of a person, place (location), event, action or thing (for example a physical object). In FIGS. 22A and 22B, all the boxes with square corners labelled $O_1$ to $O_{10}$ and $O_A$ to $O_C$ represent objects. An object may be elementary, for example a value $O_1$ (e.g. an integer or character), or a reference $O_2$ (e.g. a pointer to something). An object may be compound, for example a composite object $O_3$ or a collection of objects, such as a set $O_6$ or $O_7$. An object may instead be a sequence or array etc. (not shown).

An event may be considered to be an object which reflects an instantaneous change in the state of another object. In FIGS. 22A and 22B, all the arrow boxes labelled $\alpha$, $\Delta$, $E_1$, T, F, ANY and $\Omega$ represent events. An event may be elementary, in which case it might either be an object event or an action event. Object events include created ($\alpha$), deleted (not shown) and changed or modified ($\Delta$). Action events include initiated (not explicitly shown), completed ($\Omega$), and completed-in-state (T and F). An initiated event occurs when an action begins to be executed. In FIG. 22B, the event $E_1$ initiates action $A_1$ which in turn initiates action $A_{1.1}$, shown by the link from the top left corner of $A_1$ to the top left corner of $A_{1.1}$. A completion ($\Omega$) event occurs when execution of an action is finished. For some actions, it is the outcome of the action which is important. This applies particularly to binary tests which can result in a True T or False F outcome, but may also apply to n-ary tests (for example "CASE" statements in high level languages) where there may be more than two outcome states (not shown). The resulting events can be termed "completed-in-state" events. A compound event could be an ANY event which occurs when one of its components occurs. Alternatively, a compound event could be an ALL event (not shown) which occurs when all components of it have occurred. These can be considered as OR and AND events respectfully.

An action is an object which is initiated in response to an event and which causes changes in other objects. In FIG. 22B, all the boxes with rounded corners labelled $A_1$ and $A_{1.1}$ to $A_{1.4}$ represent actions. An action may be elementary $A_{1.1}$ to $A_{1.4}$ or compound $A_1$. A compound action $A_1$ is made up of sub-actions $A_{1.1}$ to $A_{1.4}$ each of which is in turn initiated by events which are triggered either directly or indirectly by the initiation of the composite action. Depending on the configuration of events and sub-actions within a composite action, it can form a sequence (one sub-action after another, as action $A_{1.4}$ is initiated by the completion of actions $A_{1.2}$ or $A_{1.3}$), a concurrence (two or more sub-actions in parallel, not shown), a recursion (where the sub-action references the compound action, either directly or indirectly, not shown), a selection such as an IF THEN (skip) action, or an IF THEN ELSE (two-way) action (shown as a test action $A_{1.1}$ followed by alternative actions $A_{1.2}$ initiated if $A_{1.1}$ terminates in a state of True or $A_{1.3}$ initiated if $A_{1.1}$ terminates in a state of False), or a CASE (n-way selection, not shown) action, a repetition, which repeats a sub-action zero or more times (WHILE, not shown), or one or more times (REPEAT, not shown). A special type of repetition action available using this approach is a replication (not shown), in which the same sub-action is initiated for each member of a set of objects, each occurrence of the sub-action proceeding in parallel with the others.

Advantages of root meta-actor based models include that they employ root meta-generic execution models, and that they are event driven and parallel (as opposed to flow driven and sequential as found in the prior art). Also, exceptions are treated just as another kind of event, whereas their handling is more complicated with prior art modelling. It also allows procedures for human beings to be written in the same language as procedures for machines. Furthermore, constraints can be handled within the primary modelling language, without resorting to an "add-on". This is in contrast to UML, for example, where constraints are handled by OCL. Root meta-actor based models also provide the precision required for hardware and software modelling together with the visual presentation required when communicating processes to humans. Importantly, making the models directly implementable allows them to be tested, simulated and employed directly, without the need to translate to another language or paradigm.

In the above embodiments, the or each model may take any suitable form. For example, it may be a graphical representation of the subject system, or alternatively a set of computer-readable instructions. In the latter case, at least some of the instructions are non-sequential, and can be for example in set theory or mathematical notation.

The computing devices described above, particularly in relation to FIGS. 28, 29 and 30, preferably are electronic computing devices. Alternatively, they may be bio-mechanical, quantum or any other type of computer device instead. It will be appreciated by those skilled in the relevant art how such other forms of computer device how may be constructed.

Any of the computing devices described may be provided as part of, or packaged for use in or as, a general purpose computer, a manufacturing or process control device system, a network infrastructure device, a mobile computing device, a mobile communication device, a domestic appliance, a vehicle, a computer peripheral or a robot, for example.

What is claimed is:

1. Apparatus for effecting action in a subject system, the apparatus comprising:
   memory configured to store a model of the subject system, the model including:
      objects which represent objects within the subject system, each object in the model having associated therewith data which define which of at least two states the object is in at a given time,
      event definition rules, each event definition rule defining a number of actions which are required to be initiated in response to an event, wherein an event is a change in the state of an object,
      action definition rules, each action definition rule defining a number of objects of which a state change is required be initiated in response to the corresponding action, and
      object definition rules, each object definition rule defining a number of events that are required to be triggered in response to a change in state of the corresponding object,
   wherein all events and actions are constituted as objects, and
   at least one processor configured:
      to be responsive to the triggering of an event to examine the corresponding event definition rule to determine what actions are required be initiated, and to initiate those actions,
      to be responsive to the initiation of an action to examine the corresponding action definition rule in the model to determine what objects are required to be changed in state, and to change the states of those objects accordingly,
      to execute actions initiated in response to a single event directly in a single step,
      to execute composite actions initiated in response to an event defined in terms of sub-actions initiated in response to events one of a) directly and b) indirectly resulting from the execution of the composite action, and
      to be responsive to a change in state of an object, to examine the corresponding object definition rule in the model to determine what events are required to be triggered, and to trigger those events.

2. Apparatus as claimed in claim 1, in which the model contains at least two sub-models, each of which is a model of a sub-system of the subject system.

3. Apparatus as claimed in claim 1, in which the apparatus includes a meta-actor comprising a meta-model and a meta-processor,
   the meta-model including:
      objects which represent objects within the model, each object in the model having associated therewith data which define which of at least two states the object is in at a given time, and
      rules which define actions are to be initiated in response to events, events being changes in state of objects in the model, and
   the meta-processor being configured:
      to respond to an event in the model by initiating at least one action in the model which is dependent on the event, as defined by the meta-model.

4. Apparatus as claimed in claim 3, in which the meta-model forms part of the model.

5. Apparatus as claimed in claim 3, in which the meta-processor forms part of the processor.

6. Apparatus as claimed in claim 3, in which the meta-model contains at least two sub-meta-models, each of which is a model of a sub-system of the model.

7. Apparatus as claimed in claim 3, in which at least one meta-processor comprises:
   at least one activator, configured in response to the triggering of an event to examine the definition of the event in the meta-model to determine which actions in the model to initiate, and then to initiate those actions;
   at least one executor, configured to effect the actions and configured in response to the initiation of an action to examine the definition of the action in the meta-model to determine what objects, if any, in the model to change the state of, and then to change those objects accordingly;
   at least one recorder, configured to record the outcomes of actions, including the creation, modification and deletion of objects within the meta-model, and configured in response to the changing of the state of an object to examine the definition of the object in the meta-model to determine therefrom what, if any, events in the model should result from the changes in the states of objects, and to trigger those events;
   at least one interface to external channels via which the processor is connected to one of a) other processors and b) the outside world; and
   at least one internal channel, via which the activators, executors, recorders and interfaces are connected.

8. Apparatus as claimed in claim 1, in which the at least one processor comprises:
   at least one activator, configured in response to the triggering of an event to examine the definition of the event in the model, to determine which actions, if any, to initiate and then to initiate those actions;
   at least one executor, arranged to effect the actions and being configured in response to the initiation of an action to examine the definition of the action in the model to determine what objects, if any, in the subject system to change the state of, and then to change the states of those objects accordingly;
   at least one recorder, arranged to record the outcomes of actions and being configured in response to recognising the changing of the state of an object to examine the definition of the object in the model to determine therefrom what events in the subject system, if any, should result from the changes in the states of the objects and to trigger those events;

at least one interface to external channels via which the processor is connected to one of a) other processors and b) the outside world; and at least one internal channel, via which the activators, executors, recorders and interfaces are connected.

9. An Apparatus as claimed in claim 1, in which the model elaborates a processor entity comprising one of a) a processor, b) a meta-processor and c) a root meta-processor, thereby to enable the processor entity to be directly executed by any of a) a processor, b) a meta-processor and c) a root meta-processor of the first apparatus.

10. Apparatus, as claimed in claim 9, configured to initiate actions in a proxy subject system, wherein a model further includes further rules for:

handling the relationships between simulation, physical and wall-clock time;

handling the distribution of internal and external events defined in the detailed model of the first apparatus;

handling the creation and deletion of simulated apparatuses, and their assignment and reassignment of roles within the model being simulated; and handling the assignment and elaboration of simulated apparatuses to physical apparatuses.

11. Apparatus as claimed in claim 9 in combination with another apparatus as claimed in claim 9, the apparatuses configured together to manage the resources of a computer system and enable the simultaneous execution of one of a) at least one model, b) at least one meta-model and c) at least one root meta-model on that computer system.

12. Apparatus as claimed in claim 9, a model of which contains rules which enable the elaboration of one of a) a processor, b) a meta-processor and c) a root meta-processor onto one of A) a computer with Von Neumann-like architecture, B) a computer system with Von Neumann-like architecture, C) an operating system which manages the resources of a computer with VonNeumann-like architecture and D) an operating system which provides a simple interface to a computer with VonNeumann-like architecture.

13. Apparatus as claimed in claim 1, configured to manage each of plural resources of a computer system, each resource being managed by, and constituting a subject system of, apparatus as claimed in claim 1.

14. Apparatus as claimed in claim 1, and a compiler configured to use a model of one of a) a Von Neumann computer and b) a layered operating system to translate statically the model into one of 1) the object and 2) code of one of A) a Von Neumann computer, B) a Von Neumann computer system, C) an operating system which manages the resources of a Von Neumann computer, and D) an operating system which provides a interface to a Von Neumann computer.

15. Apparatus as claimed in claim 14, in which the compiler includes a meta-translator and a hardware meta model configured to translate statically the model.

16. Logic-based computing apparatus for effecting action in a subject system, the apparatus comprising:

means for implementing a model of the subject system, the model including:

objects which represent objects within the subject system, each object in the model having associated therewith an indication of which of at least one state the object is in at a given time, event definition rules, each event definition rule defining a number of actions which are required to be initiated in response to events, wherein an event is a change in the state of an object, action definition rules, each action definition rule defining a number of objects of which a state change is required be initiated in response to the corresponding action, and object definition rules, each object definition rule defining a number of events that are required to be triggered in response to a change in state of the corresponding object, wherein all events and actions are also constituted as objects, and means for implementing a processor, configured:

to be responsive to the triggering of an event to examine the corresponding event definition rule to determine what actions are required be initiated, and to initiate those actions, to be responsive to the initiation of an action to examine the corresponding action definition rule in the model to determine what objects are required to be changed in state, and to change the states of those objects accordingly, to execute actions initiated in response to a single event directly in a single step, to execute composite actions initiated in response to an event defined in terms of sub-actions initiated in response to events one of a) directly and b) indirectly resulting from the execution of the composite action, and to be responsive to a change in state of an object, to examine the corresponding object definition rule in the model to determine what events are required to be triggered, and to trigger those events to respond to an event in the subject system by initiating at least one action in the subject system which is dependent on the event, as defined by the rules of the model.

17. Apparatus as claimed in claim 16, in which the means for implementing a processor comprises at least one activator, at least one executor, at least one recorder, at least one internal channel and at least one interface.

18. Apparatus as claimed in claim 17, in which at least one recorder includes:

an event queue, configured to contain a number of triggered events;

an action queue, configured to contain a number of initiated actions; and an object queue, configured to contain references to a number of objects which are to be one of a) referenced and b) changed.

19. Apparatus as claimed in claim 18, in which at least one recorder further comprises:

an object queue register, configured to contain a reference to an item in the object queue;

an object register, configured to contain a reference to a current object; and an object type register, configured to contain a type of the current object.

20. Apparatus as claimed in claim 18, in which at least one activator includes:

an event queue register, configured to contain a reference to an item in the event queue;

an event register, configured to contain a reference to a current event; and an event type register, configured to contain a type of the current event.

21. Apparatus as claimed in claim 18, in which at least one executor includes:

an action queue register, configured to contain a reference to an item in the action queue;

an action register, configured to contain a reference to a current action; and an action type register, configured to contain a type of the current action.

22. Apparatus as claimed in claim 16, which comprises a single activator, a single executor, a single recorder, at least one internal channels and at least one interface together provided on one of a) a single processing unit and b) an integrated circuit.

23. Apparatus as claimed in claim 22, in which all of the components are located within a common housing.

24. Apparatus as claimed in claim 22, in which at least two of the components are distributed at different locations.

25. Apparatus as claimed in claim 16, which comprises a single activator, a single executor, a single recorder and at least one interface, each of these components being provided on one of a) a respective processing unit and b) an integrated circuit, the components being connected to each other via at least one channel.

26. Apparatus as claimed in claim 16, configured to manage each of plural resources of a computer system, each resource being managed by, and constituting a subject system of, a computing device according to claim 16.

* * * * *